US011691818B2

(12) United States Patent
Bacon-Maldonado, III et al.

(10) Patent No.: US 11,691,818 B2
(45) Date of Patent: Jul. 4, 2023

(54) METHOD AND SYSTEM FOR CONVEYING ARTICLES AND AN APPARATUS FOR DOING THE SAME

(71) Applicant: Multilift, Inc., Lakewood, CO (US)

(72) Inventors: Job Bacon-Maldonado, III, Littleton, CO (US); Robert D. Drost, Highlands Ranch, CO (US); Chris K. Miller, Denver, CO (US); Kenneth B. Drost, Denver, CO (US); Job Maldonado, Jr., Littleton, CO (US)

(73) Assignee: Multilift, Inc., Lakewood, CO (US)

( * ) Notice: Subject to any disclaimer, the term of this patent is extended or adjusted under 35 U.S.C. 154(b) by 0 days.

(21) Appl. No.: 17/380,993

(22) Filed: Jul. 20, 2021

(65) Prior Publication Data

US 2021/0347574 A1 Nov. 11, 2021

Related U.S. Application Data

(63) Continuation-in-part of application No. 16/675,105, filed on Nov. 5, 2019, now Pat. No. 11,066,243,
(Continued)

(51) Int. Cl.
*B65G 15/44* (2006.01)
*B65G 15/58* (2006.01)
(Continued)

(52) U.S. Cl.
CPC ............ *B65G 15/44* (2013.01); *B07C 5/3412* (2013.01); *B07C 5/36* (2013.01); *B65G 1/04* (2013.01);
(Continued)

(58) Field of Classification Search
CPC .... B65G 41/002; B65G 41/005; B65G 21/12; B65G 15/44; B65G 15/58
(Continued)

(56) References Cited

U.S. PATENT DOCUMENTS 1,029,758 A * 6/1912 Ladwig ..................... B62B 1/08
280/46
1,165,460 A * 12/1915 Steele .................. B65G 41/002
198/861.5
(Continued)

FOREIGN PATENT DOCUMENTS

JP          05278827      * 10/1993 ............. B65G 21/14
WO    WO 2010/048695      5/2010

OTHER PUBLICATIONS

Official Action for Canadian Patent Application No. 3,096,162, dated Nov. 2, 2021, 4 pages.
(Continued)

*Primary Examiner* — James R Bidwell
(74) *Attorney, Agent, or Firm* — Sheridan Ross P.C.

(57) ABSTRACT

A conveyor for transporting and elevating articles and a method and system for conveying articles up inclines is provided. The conveyor has a conveyor belt and at least one cleat disposed on an outer surface of the belt and configured to receive and move an object along the conveyor frame. The system may also include a portable base having a base frame and at least one wheel secured to the base frame. The conveyor may also be pivotably coupled to the portable base.

17 Claims, 52 Drawing Sheets

Related U.S. Application Data which is a continuation-in-part of application No. 16/119,804, filed on Aug. 31, 2018, now Pat. No. 10,464,754, which is a continuation of application No. 15/673,014, filed on Aug. 9, 2017, now Pat. No. 10,065,801, which is a continuation of application No. 15/041,668, filed on Feb. 11, 2016, now Pat. No. 9,745,133, which is a continuation of application No. 14/641,126, filed on Mar. 6, 2015, now Pat. No. 9,260,247, which is a continuation-in-part of application No. 14/154,141, filed on Jan. 13, 2014, now Pat. No. 9,061,830.

(60) Provisional application No. 63/165,533, filed on Mar. 24, 2021, provisional application No. 61/751,722, filed on Jan. 11, 2013.

(51) Int. Cl.
| | |
|---|---|
| *B65G 23/04* | (2006.01) |
| *B07C 5/34* | (2006.01) |
| *B07C 5/36* | (2006.01) |
| *B65G 15/28* | (2006.01) |
| *B65G 23/22* | (2006.01) |
| *B65G 1/04* | (2006.01) |
| *B65G 17/46* | (2006.01) |
| *B65G 41/00* | (2006.01) |
| *B65G 15/24* | (2006.01) |

(52) U.S. Cl.
CPC ............ *B65G 15/28* (2013.01); *B65G 15/58* (2013.01); *B65G 17/46* (2013.01); *B65G 23/04* (2013.01); *B65G 23/22* (2013.01); *B65G 41/008* (2013.01); *B65G 15/24* (2013.01); *B65G 41/002* (2013.01); *B65G 2201/0273* (2013.01)

(58) Field of Classification Search
USPC .............................................. 198/861.5, 632
See application file for complete search history.

(56) References Cited

U.S. PATENT DOCUMENTS

| | | | |
|---|---|---|---|
| 2,541,523 A | 2/1951 | Lang | |
| 2,809,743 A | 10/1957 | Hinchcliffe | |
| 2,813,618 A * | 11/1957 | Liston | B65G 41/002 |
| | | | 198/316.1 |
| 2,930,478 A | 3/1960 | Ruffino | |
| 2,947,408 A * | 8/1960 | Fowler | A01D 46/08 |
| | | | 198/861.5 |
| 2,987,169 A | 6/1961 | Hinchcliffe | |
| 3,085,676 A | 4/1963 | Hinchcliffe | |
| 3,100,566 A | 8/1963 | Hinchcliffe | |
| 3,334,895 A | 8/1967 | Daniels et al. | |
| 3,378,103 A | 4/1968 | Zwight et al. | |
| 3,542,299 A | 11/1970 | Sholl | |
| 3,822,526 A | 7/1974 | Black | |
| 3,876,060 A * | 4/1975 | Stease | B65G 13/12 |
| | | | 198/791 |
| 3,910,405 A | 10/1975 | Couperus et al. | |
| 3,974,908 A | 8/1976 | Keichinger | |
| 4,143,759 A | 3/1979 | Paradis | |
| 4,534,461 A | 8/1985 | Silverthorn et al. | |
| 4,582,193 A | 4/1986 | Larson | |
| 4,700,078 A | 10/1987 | Mizuno et al. | |
| 4,727,419 A | 2/1988 | Yamada et al. | |
| 4,832,183 A | 5/1989 | Lapeyre | |
| 5,092,946 A | 3/1992 | Okuyama et al. | |
| 5,172,804 A * | 12/1992 | Chersin | B65G 13/12 |
| | | | 198/861.5 |
| 5,194,107 A | 3/1993 | Okuyama et al. | |
| 5,205,395 A | 4/1993 | Bruno et al. | |
| 5,333,725 A * | 8/1994 | Douglas | B65G 21/14 |
| | | | 198/632 |
| 5,415,217 A | 5/1995 | Okuyama et al. | |
| 5,435,433 A | 7/1995 | Jordan et al. | |
| 5,568,857 A | 10/1996 | Chen et al. | |
| 5,685,687 A | 11/1997 | Frye | |
| 5,697,294 A | 12/1997 | Keller et al. | |
| 5,816,142 A | 10/1998 | Keller et al. | |
| 5,984,077 A | 11/1999 | Frye et al. | |
| 6,053,305 A | 4/2000 | Helmerson | |
| 6,142,290 A | 11/2000 | Tagliaferri | |
| 6,292,997 B1 | 9/2001 | Ollendick et al. | |
| 6,488,145 B1 | 12/2002 | Diego et al. | |
| 6,527,499 B2 | 3/2003 | Leimbach et al. | |
| 6,871,868 B2 | 3/2005 | Pogue | |
| 6,926,134 B2 | 8/2005 | Verdigets et al. | |
| 7,249,496 B2 | 7/2007 | Kunitake et al. | |
| 7,347,317 B2 | 3/2008 | Aizawa et al. | |
| 7,487,814 B2 | 2/2009 | Mizota | |
| 7,543,698 B2 | 6/2009 | Haskell | |
| 7,946,416 B2 | 5/2011 | Grose et al. | |
| 8,401,146 B2 | 3/2013 | Vorhees | |
| 8,690,514 B2 | 4/2014 | Marola | |
| 8,876,455 B2 | 11/2014 | Pogue | |
| 9,061,830 B2 | 6/2015 | Miller et al. | |
| 9,260,247 B2 | 2/2016 | Miller et al. | |
| 9,745,133 B2 | 8/2017 | Miller et al. | |
| 9,783,093 B1 | 10/2017 | Esch | |
| 9,856,087 B2 | 1/2018 | Beesley | |
| 10,065,801 B2 | 9/2018 | Miller et al. | |
| 10,150,660 B2 | 12/2018 | Koppelaar et al. | |
| 10,464,754 B2 | 11/2019 | Miller et al. | |
| 10,766,710 B2 | 9/2020 | Bacon-Maldonado, III et al. | |
| 10,906,744 B2 | 2/2021 | Grose et al. | |
| 10,913,381 B2 | 2/2021 | Bacon-Maldonado, III et al. | |
| 11,066,243 B2 | 7/2021 | Bacon-Maldonado, III et al. | |
| 2005/0040015 A1 | 2/2005 | Schlegel et al. | |
| 2005/0279616 A1 | 12/2005 | Pogue | |
| 2006/0182575 A1 | 8/2006 | Pogue | |
| 2007/0084275 A1 | 4/2007 | Gotou et al. | |
| 2007/0135960 A1 | 6/2007 | Shibao et al. | |
| 2007/0289847 A1 | 12/2007 | Nakamura | |
| 2008/0053796 A1 | 3/2008 | DePaso et al. | |
| 2008/0173521 A1 | 7/2008 | Hitch | |
| 2008/0253873 A1 | 10/2008 | Haskell | |
| 2008/0298940 A1 | 12/2008 | Cleasby et al. | |
| 2009/0010747 A1 | 1/2009 | Pogue | |
| 2009/0148260 A1 | 6/2009 | Leimbach et al. | |
| 2009/0294246 A1 | 12/2009 | Pogue | |
| 2010/0043952 A1 | 2/2010 | Terazono | |
| 2011/0013177 A1 | 1/2011 | Crim | |
| 2012/0092149 A1 | 4/2012 | Fujisawa | |
| 2012/0325903 A1 | 12/2012 | Takahashi | |
| 2014/0182070 A1 | 7/2014 | Clark | |
| 2014/0311868 A1 | 10/2014 | Pribyl | |
| 2016/0031650 A1 | 2/2016 | Petersen et al. | |
| 2018/0072517 A1 | 3/2018 | Girtman et al. | |
| 2021/0053766 A1 | 2/2021 | Bacon-Maldonado, III et al. | |
| 2021/0163230 A1 | 6/2021 | Bacon-Maldonado, III et al. | |

OTHER PUBLICATIONS

International Search Report and Written Opinion for International (PCT) Patent Application No. PCT/US2022/021733, dated Aug. 15, 2022, 16 pages.

"Econo-Cleat®," Flexco, 2015, retrieved from: http://www.flexco.com/products/mobile_econo_cleat.html, 2 pages.

"E-Z T050: E-Zmite Troughing Model," E-Zlift Conveyors, Archived Webpage dated Nov. 30, 2020, retrieved from https://web.archive.org/web/20201130190249/https://ezliftconveyors.com/wp-content/uploads/E-Z-T050-brochure.pdf, 1 page.

"Increase Productivity, Improve Versatility, Create Solutions," The Lowdown Conveying Important Information, 2005, vol. 4(1), retrieved from: http://www.flexco.com/filebase/en/src/Belt_Conveyor_Insights/IncreaseProductivityImprov.pdf, 2 pages.

(56) References Cited

OTHER PUBLICATIONS

"EXT-52 Conveyor," Cleasby Manufacturing, Date Unknown, retrieved from: http://www.cleasbyconveyors.com/ext-52-conveyor/ on Feb. 15, 2018, 6 pages.
"FBR Conveyor," Cleasby Manufacturing, Date Unknown, retrieved from: http://www.cleasbyconveyors.com/products/truck-mounted-conveyors/fbr-conveyor/ on Feb. 15, 2018, 3 pages.
"New On-Road & Off-Road Slinger Trucks and Equipment at CAS Slingers," CAS Slingers, Date Unknown, retrieved from: https://slingers.com/new-equipment/models/ on Feb. 15, 2018, 3 pages.
"Stone Slinger High-Speed Conveyor Trucks," Stone Slinger, 2017, retrieved from: http://stoneslinger.com/ on Feb. 15, 2018, 1 page.
Official Action for Canada Patent Application No. 3,096,162, dated Apr. 26, 2022, 3 pages.
Official Action for Canada Patent Application No. 3,096,162, dated Oct. 11, 2022, 3 pages.

\* cited by examiner

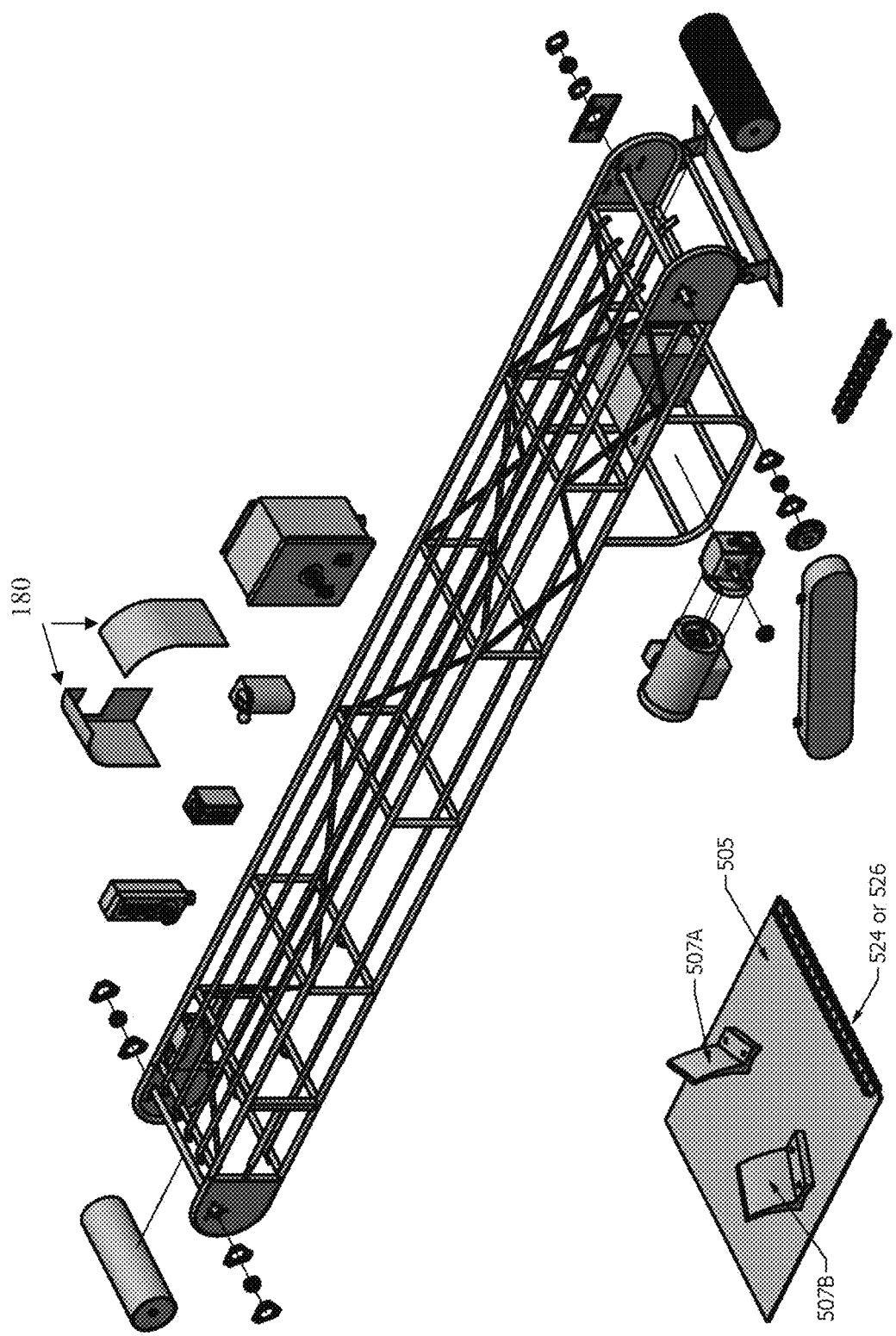

FIG. 21B
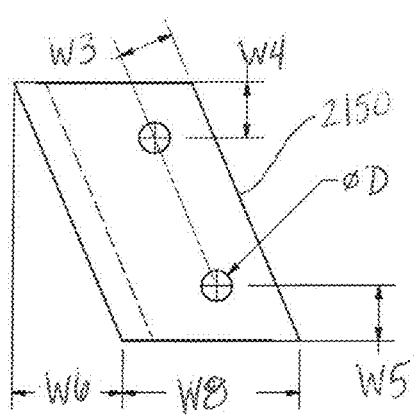
FIG. 21A
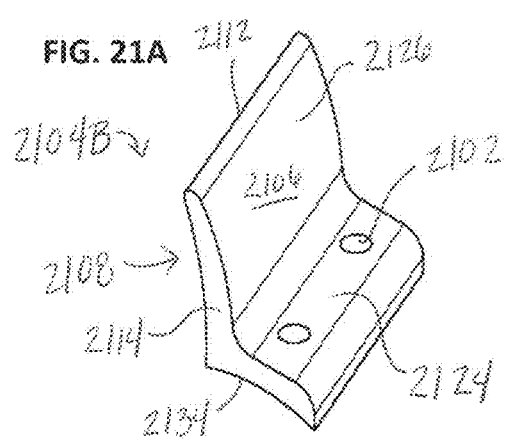
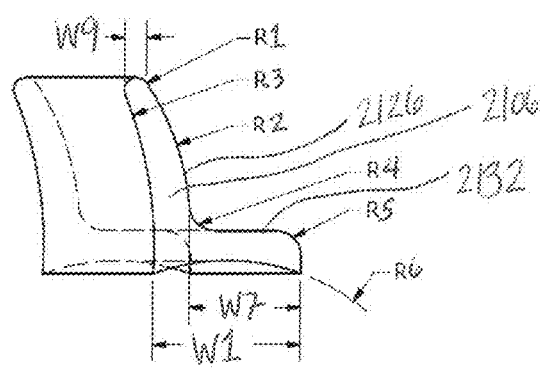
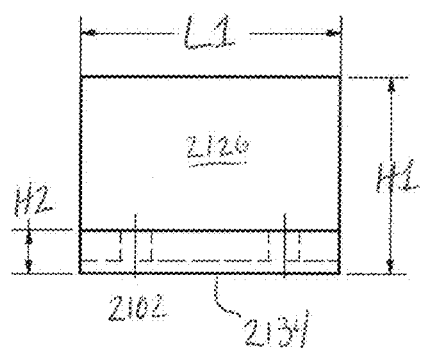
FIG. 21D
FIG. 21C

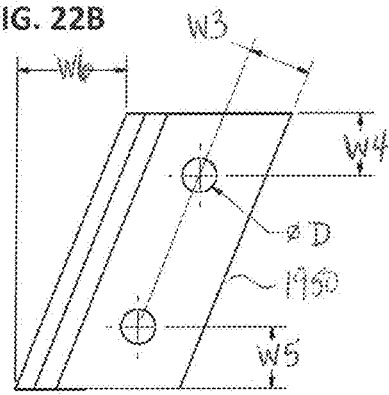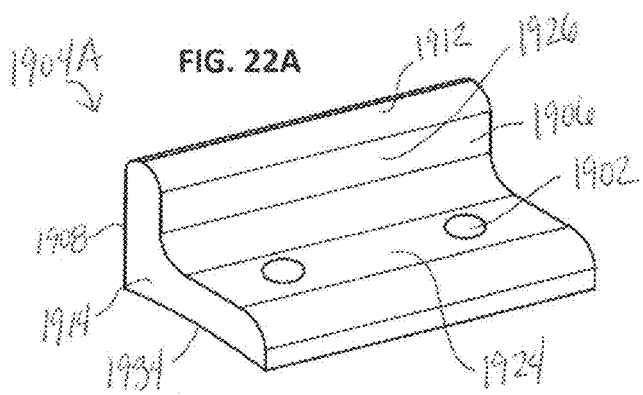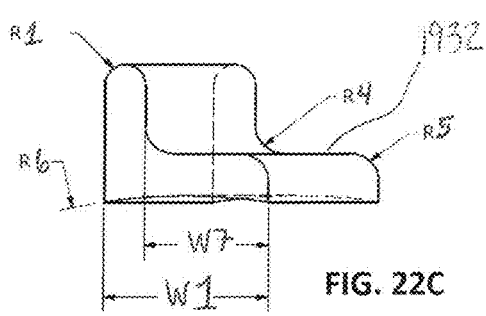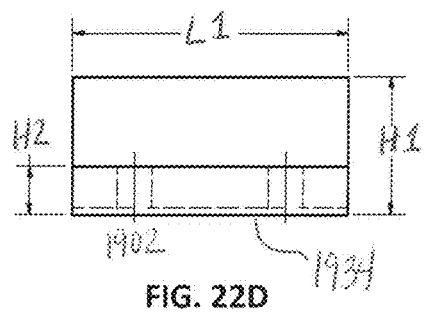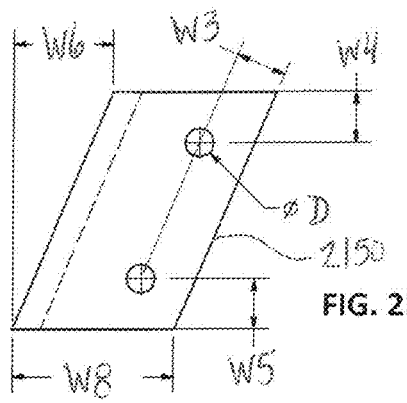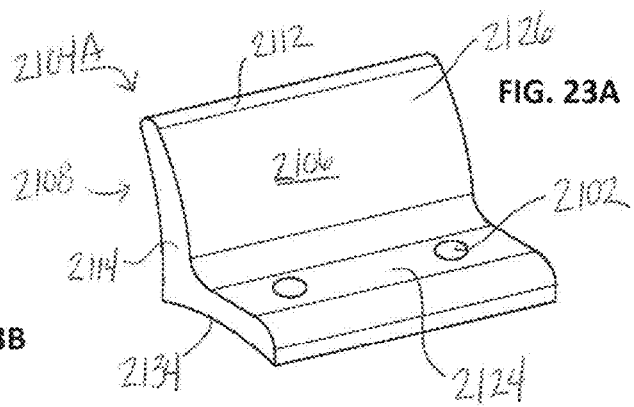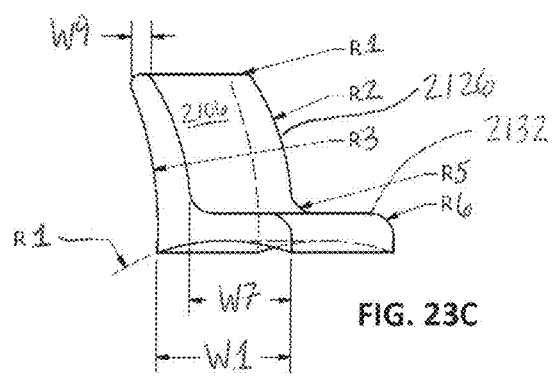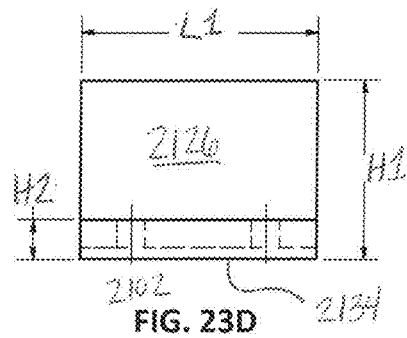
FIG. 22A FIG. 22B FIG. 22C FIG. 22D
FIG. 23A FIG. 23B FIG. 23C FIG. 23D

FIG. 24B FIG. 24A
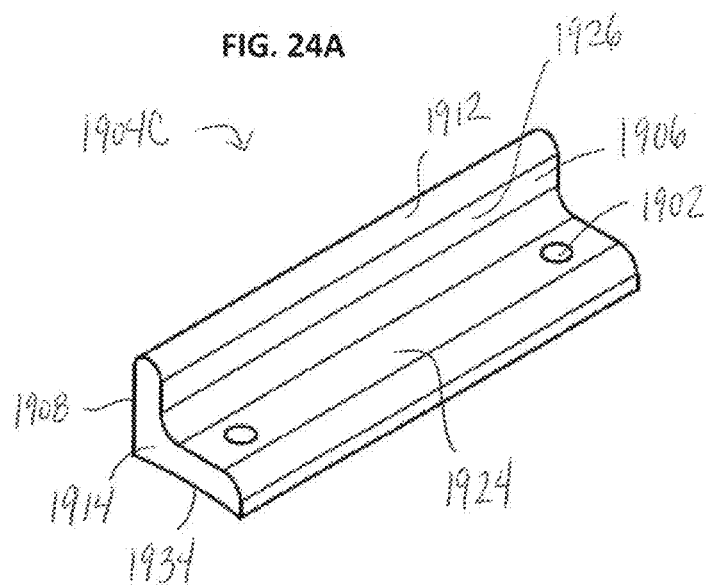
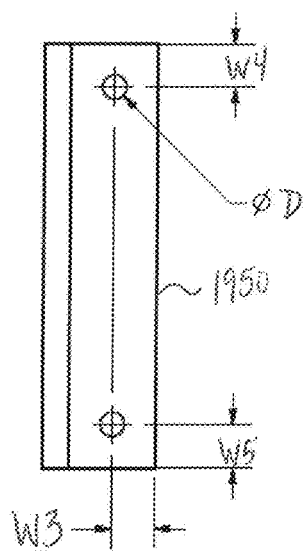
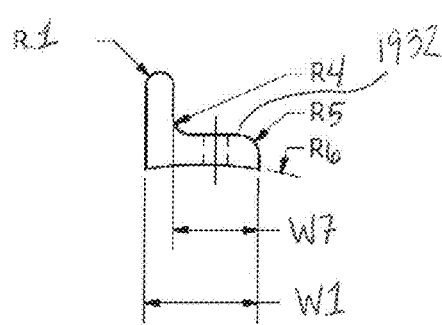
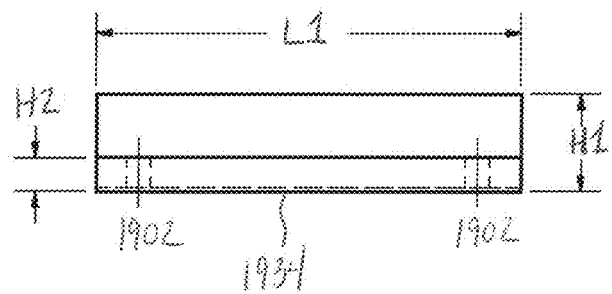
FIG. 24C
FIG. 24D

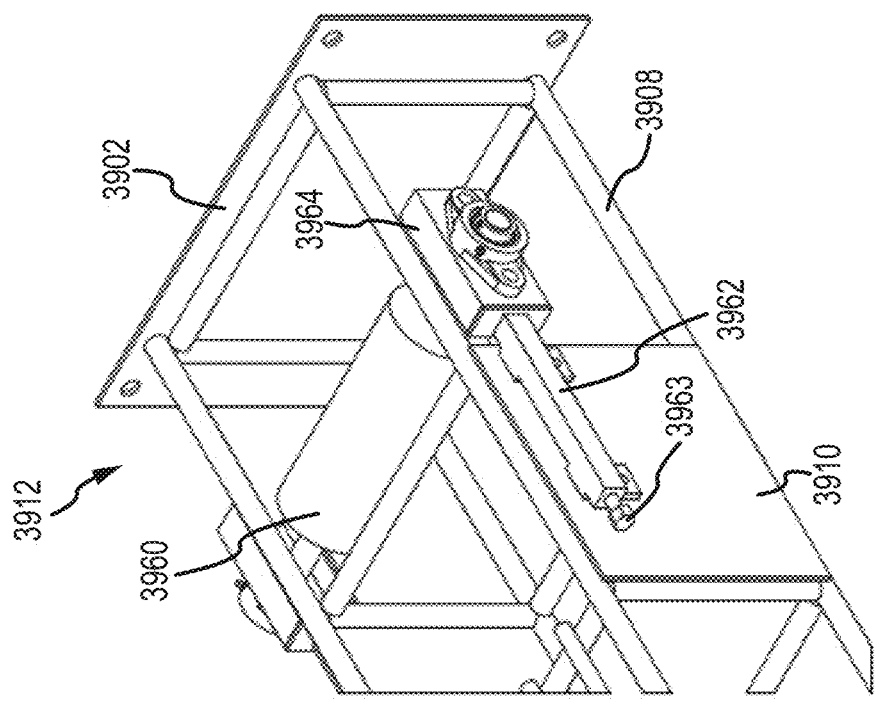
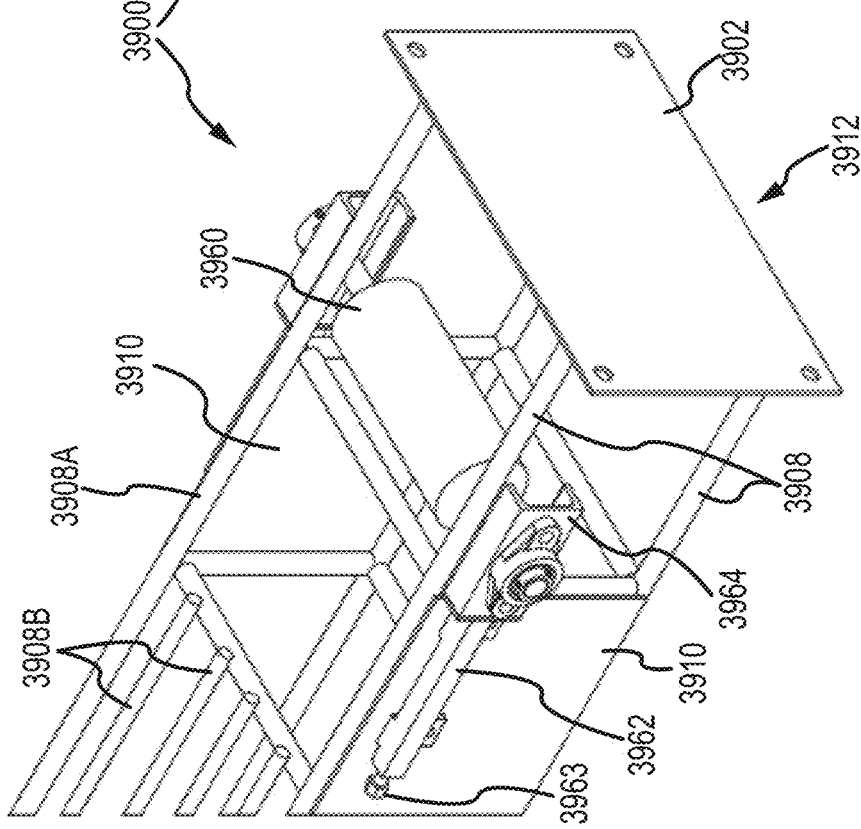

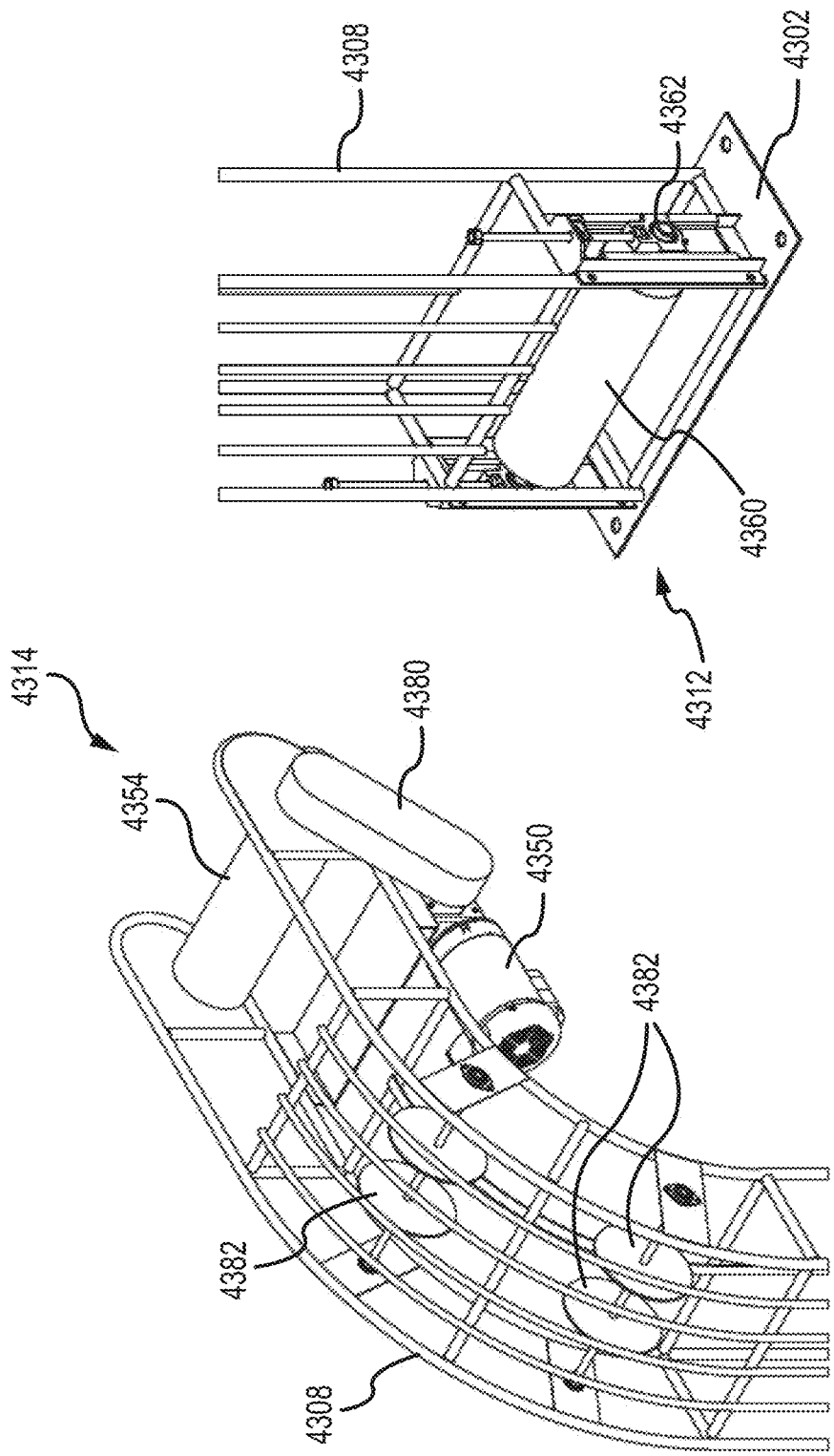

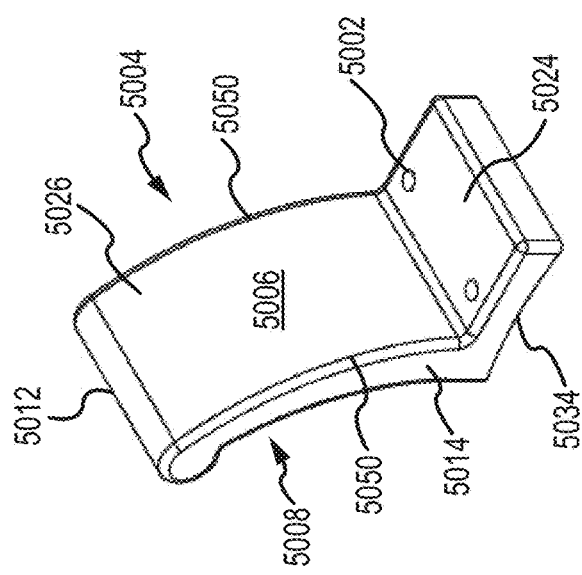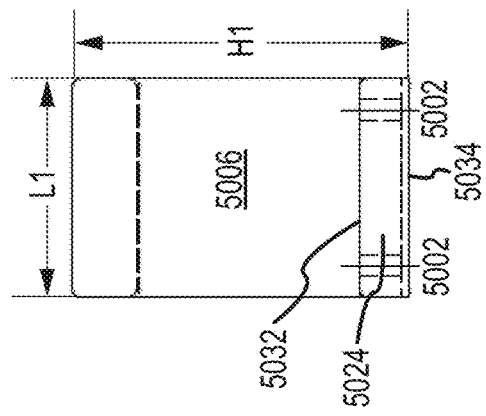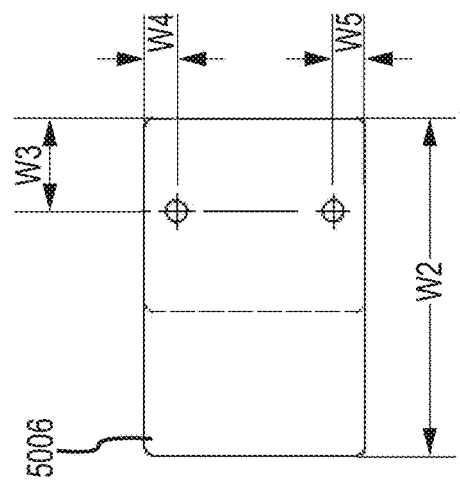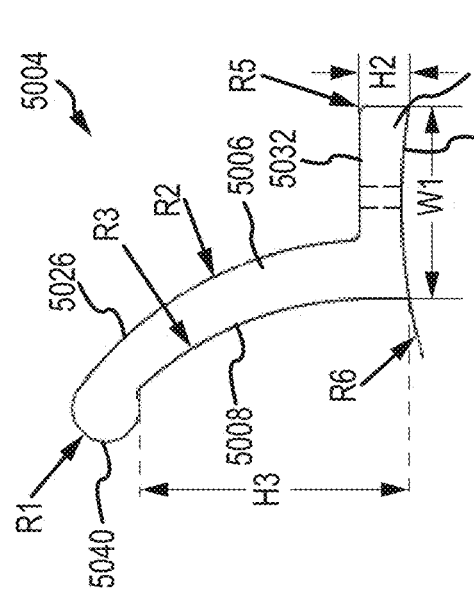

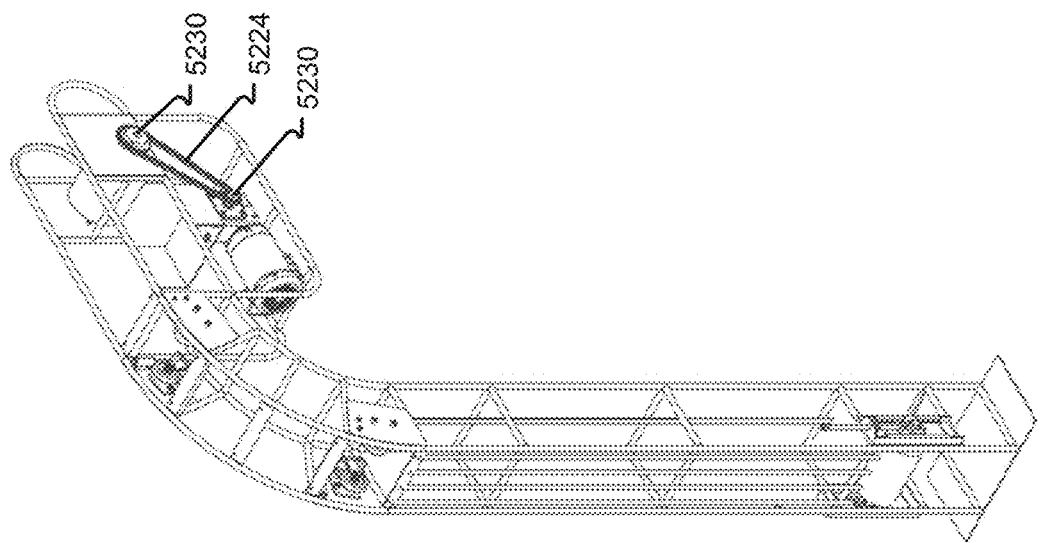
FIG. 56
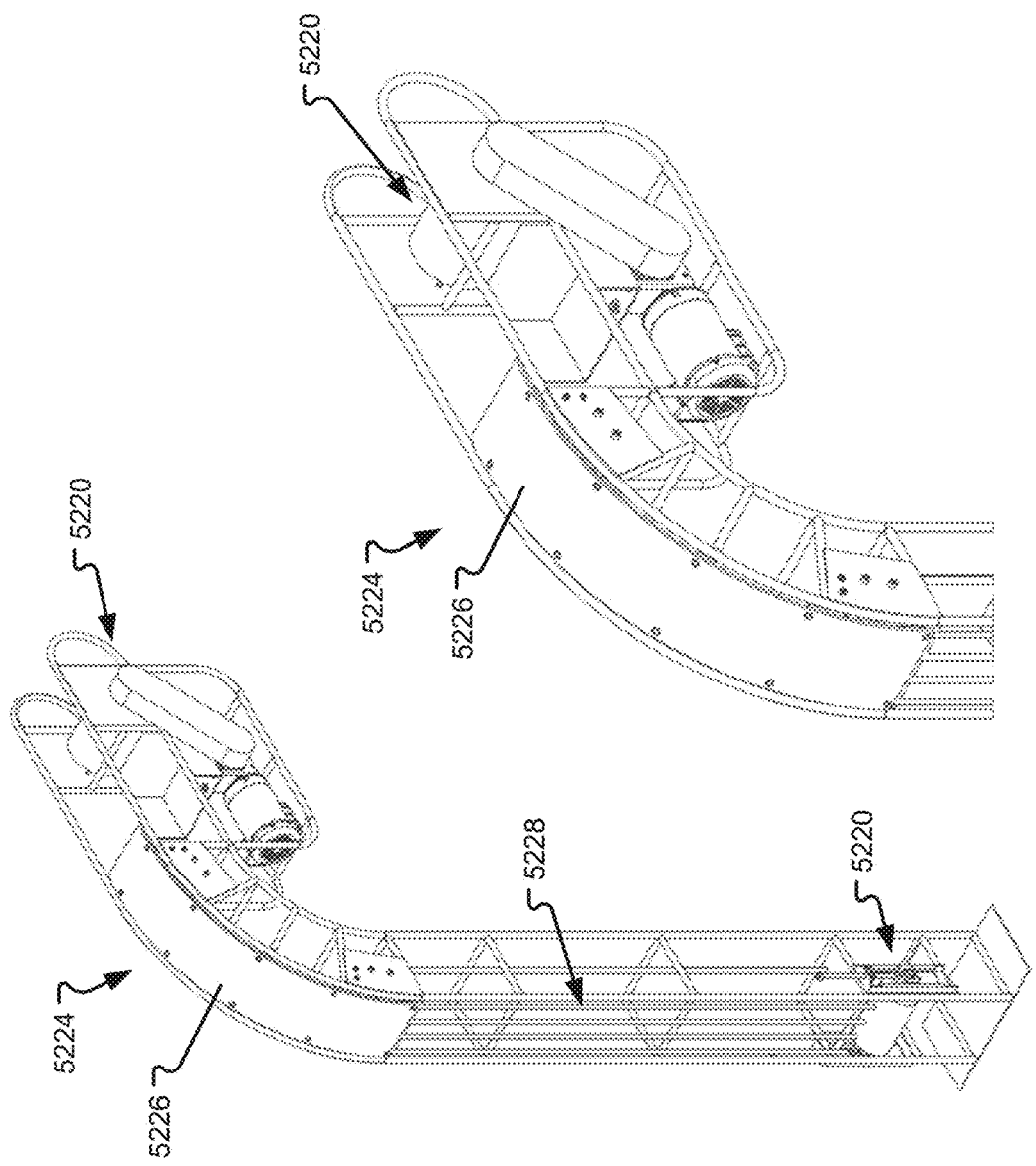
FIG. 55B
FIG. 55A

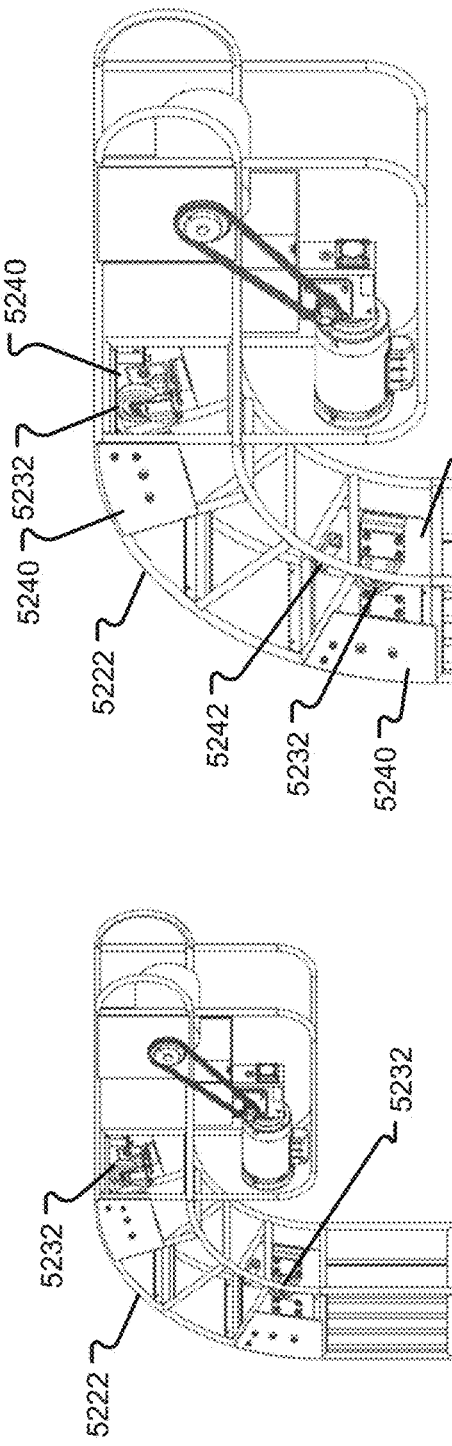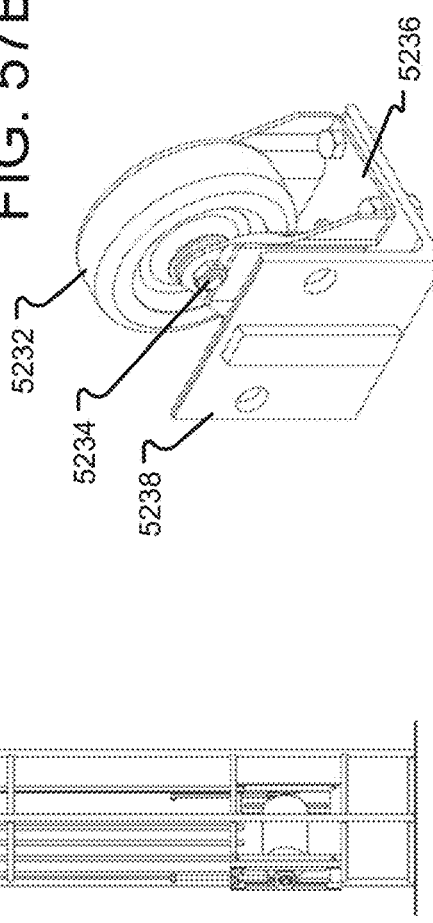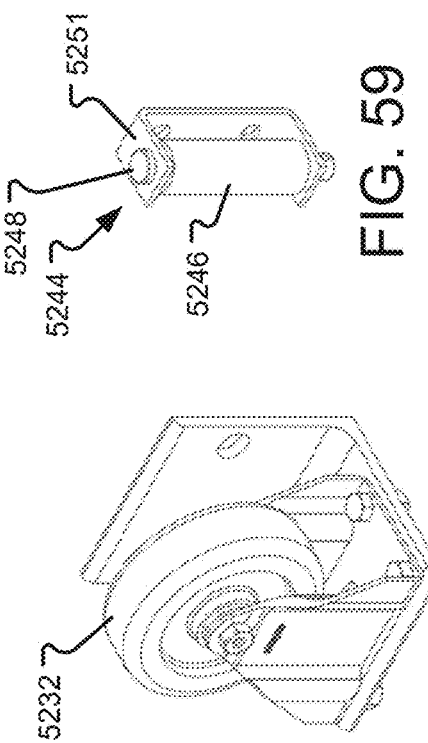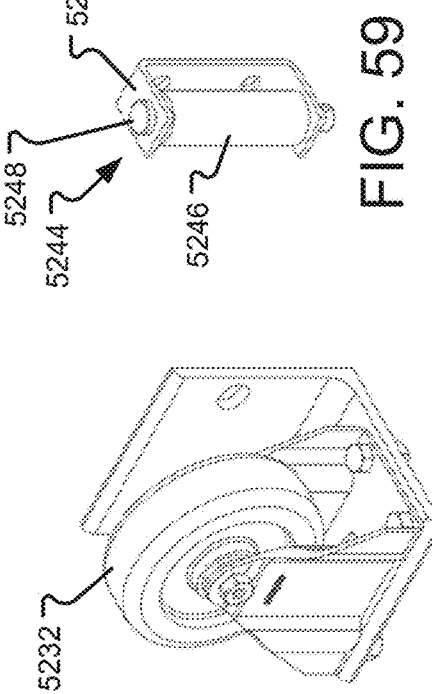

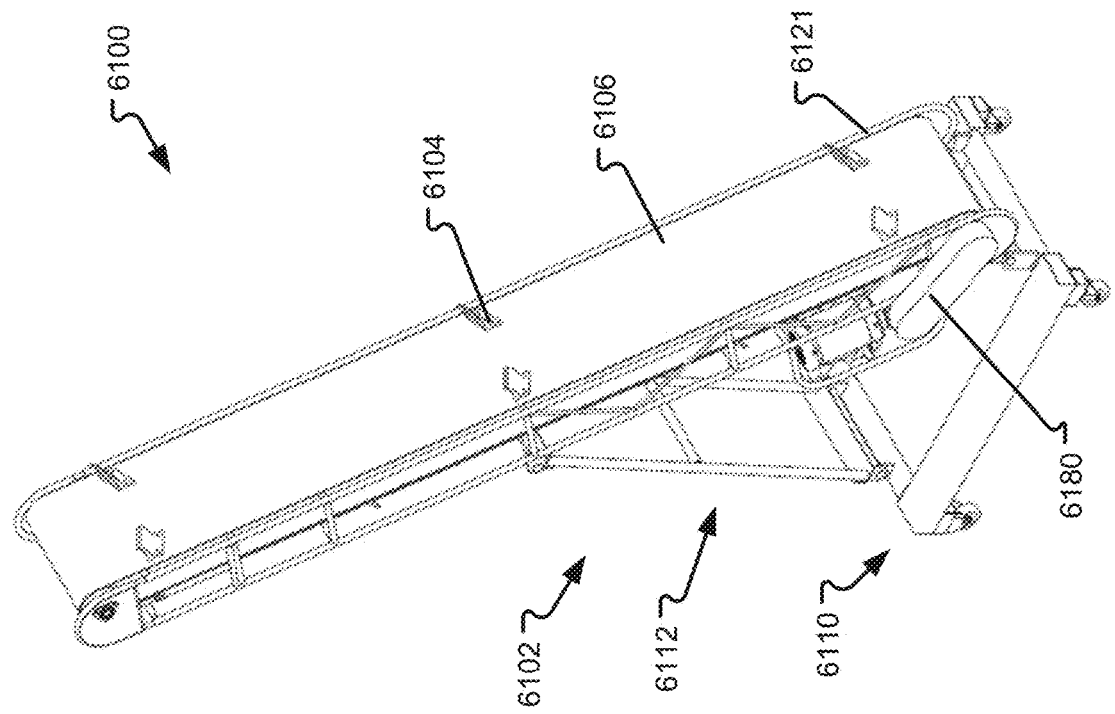
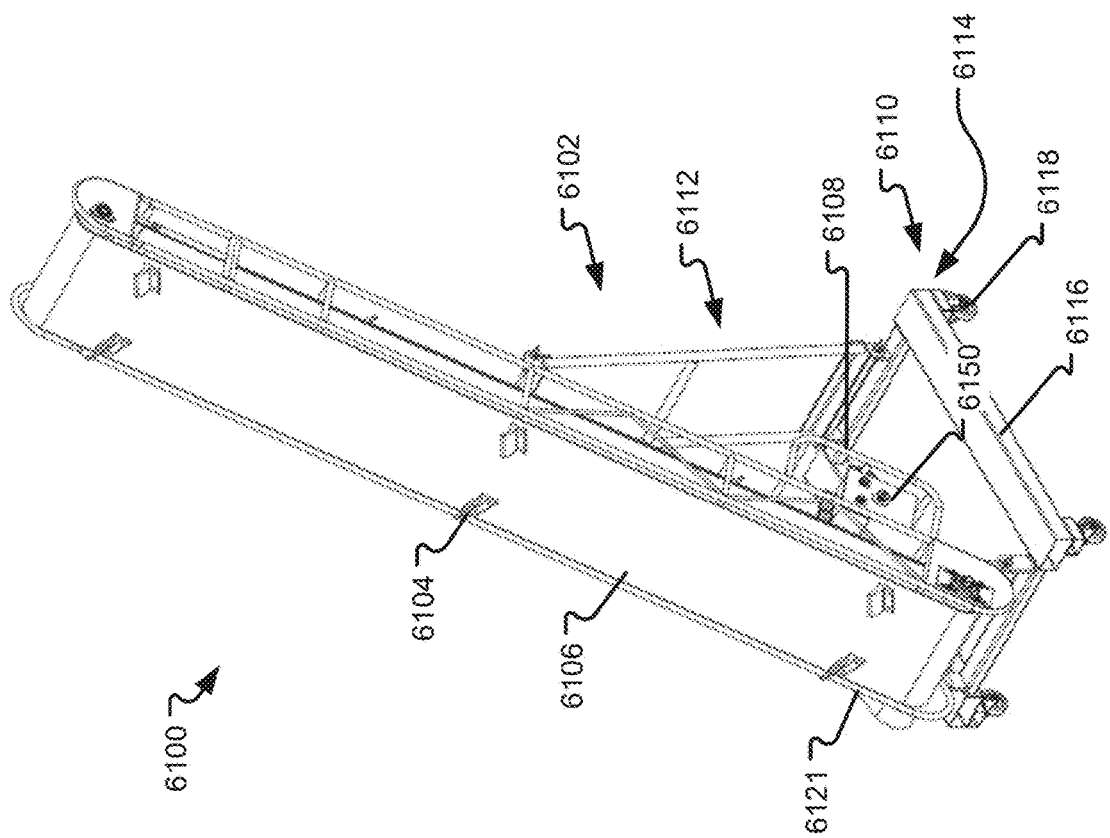

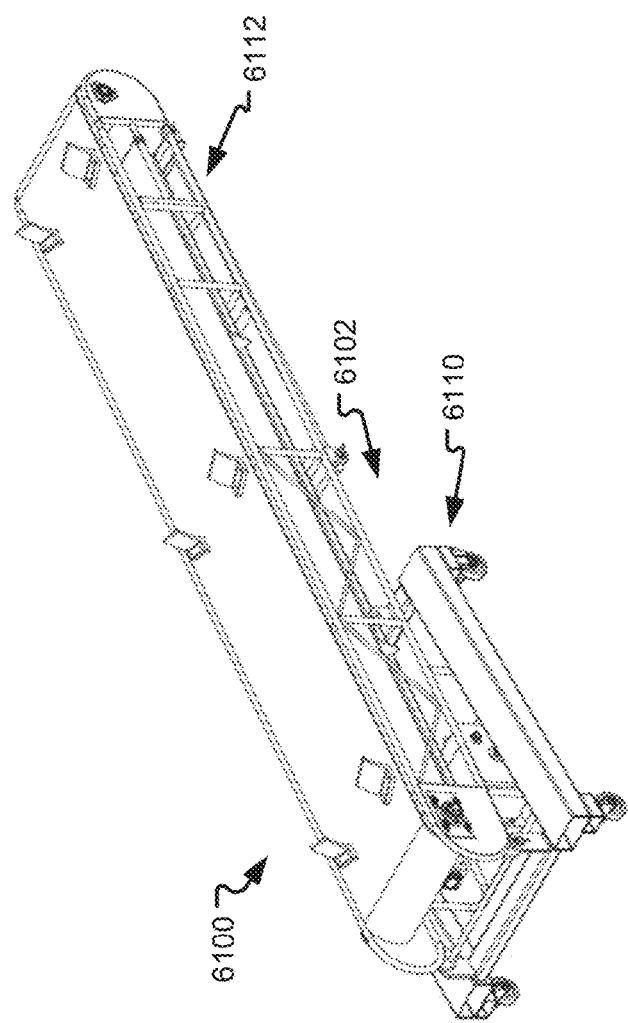
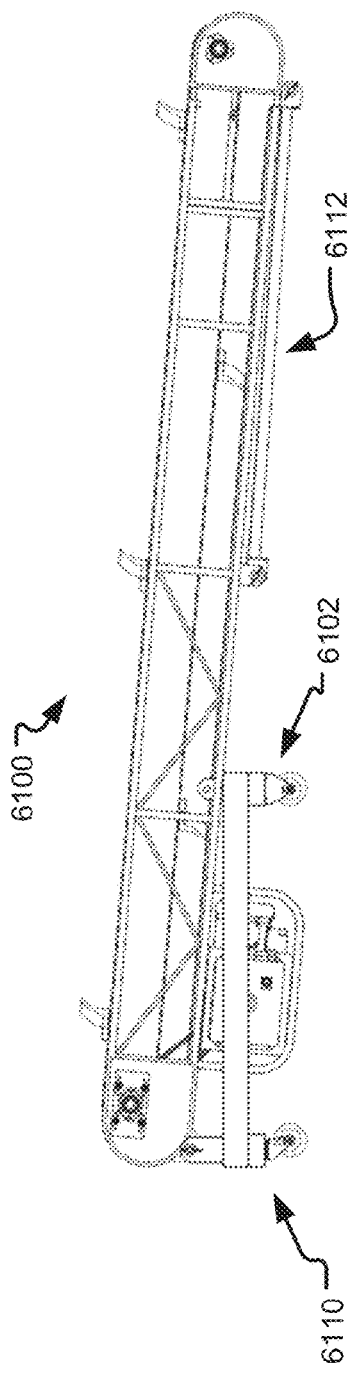
FIG. 62A
FIG. 62B

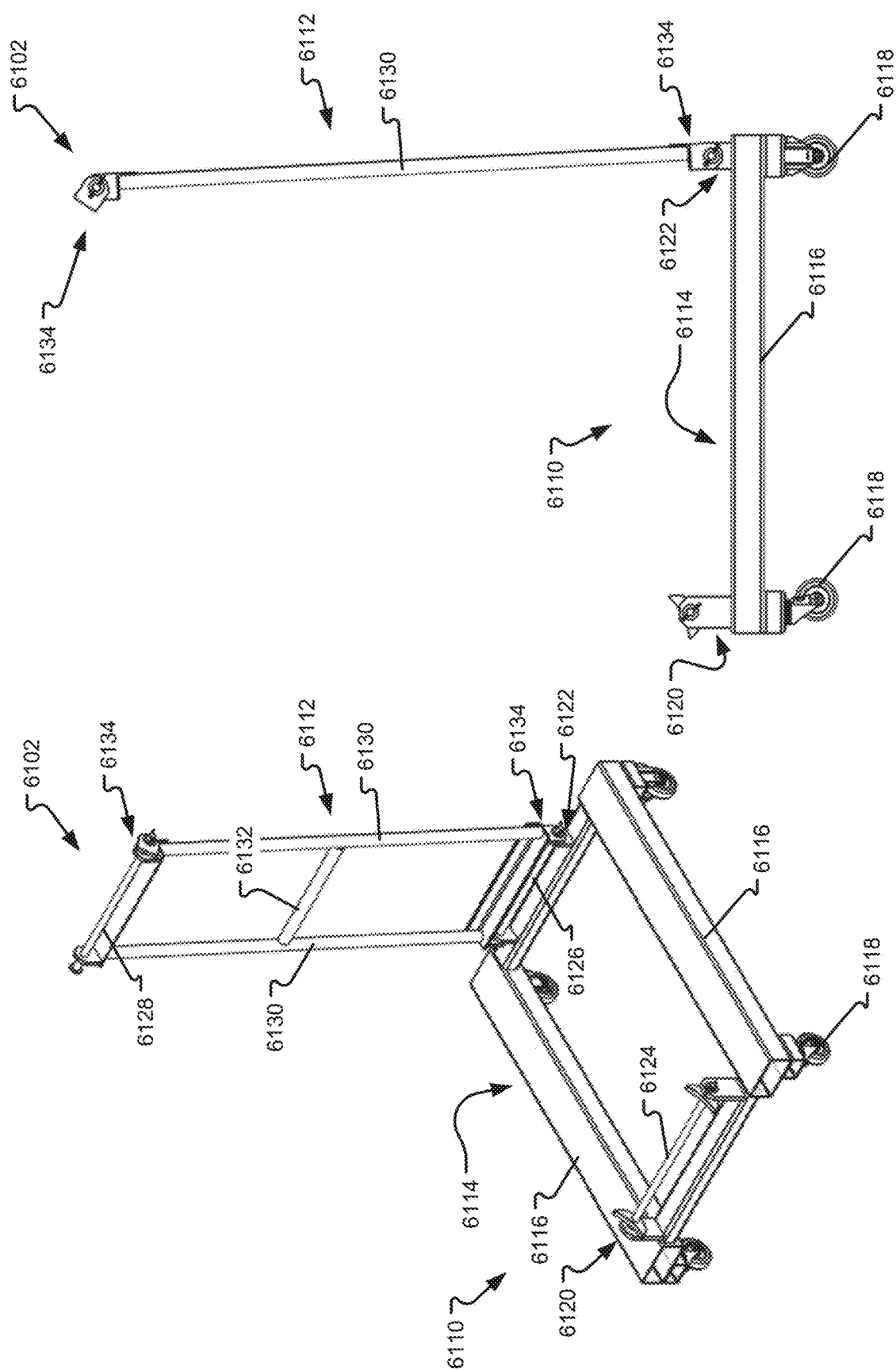

METHOD AND SYSTEM FOR CONVEYING ARTICLES AND AN APPARATUS FOR DOING THE SAME

CROSS-REFERENCE TO RELATED APPLICATIONS

This application is a Continuation-in-Part application of and claims the benefit of priority from U.S. patent application Ser. No. 16/675,105, filed on Nov. 5, 2019 (now U.S. Pat. No. 11,066,243), which is a Continuation-In-Part application of and claims the benefit of priority from U.S. patent application Ser. No. 16/119,804, filed Aug. 31, 2018 (now U.S. Pat. No. 10,464,754), which is a Continuation Application of and claims the benefit of priority from U.S. patent application Ser. No. 15/673,014, filed on Aug. 9, 2017 (now U.S. Pat. No. 10,065,801), which is a Continuation Application of U.S. patent application Ser. No. 15/041,668, filed on Feb. 11, 2016 (now U.S. Pat. No. 9,745,133, issued Aug. 29, 2017), which is a Continuation Application of U.S. patent application Ser. No. 14/641,126, filed on Mar. 6, 2015 (now U.S. Pat. No. 9,260,247, issued Feb. 16, 2016), which is a Continuation in Part application of U.S. patent application Ser. No. 14/154,141, filed on Jan. 13, 2014 (now U.S. Pat. No. 9,061,830, issued Jun. 23, 2015), which claims priority from U.S. Provisional Patent Application No. 61/751,722, filed on Jan. 11, 2013, the entire disclosures of which are incorporated by reference herein in their entireties. This application also claims priority from U.S. Provisional Patent Application No. 63/165,533, filed on Mar. 24, 2021, the entire disclosure of which is incorporated by reference herein in its entirety.

FIELD OF THE INVENTION

The invention relates generally to power-driven conveyors and, more particularly, to belt conveyors advancing on steep inclines to elevate articles, especially tires and loose and packaged materials.

BACKGROUND OF THE INVENTION

In a tire manufacturing plant, tires molded in rows of tires presses are deposited on a trench conveyor and transported to an inspection, balance, or trim station. Because trench conveyors are typically positioned below the presses at a relatively low elevation, incline conveyors are used to elevate the tires received from the trench conveyor to the level of the presses or higher for transport to subsequent finishing stations. Belt conveyors, such as modular plastic belt conveyors with high-friction conveying-surface characteristics, work well on shallow inclines. On steeper inclines, however, belts with conveying surfaces textured with inverted cones or other non-skid protrusions work well when new. As the protrusions wear, tires begin to slide down the conveying surface as the belt advances up a steep incline. Rubber-topped belts are not so susceptible to wear, but the slippery mold-release material used to ease ejection of the tires from the presses coats the rubber conveying surface of the belt, which then loses its effectiveness as a high-friction surface. Consequently, incline angles are limited to a maximum of about 25° off horizontal. Such shallow inclines have a large footprint, taking up valuable floor space. Even if tires could be prevented from sliding along the conveying surface on steep inclines, there must be provisions to prevent tires from falling away from the belt. A wall or other static structure in sliding contact with high-friction articles, such as tires, being lifted on the incline may damage the articles and will increase the load, requiring an oversized belt and drive system.

In tire warehouses or stores and service stations stocking large numbers of tires, the tires are usually stacked to great heights. Further, the tires may be stacked on shelves or second levels and thus begin to be stacked at heights over 6 feet. Conveyors may be used to elevate the tires to the level of the tire storage or higher for transport to additional floors. Traditional conveyors use friction or protrusions to prevent the tires from sliding down the inclined conveyor or from falling off of the side of the conveyor belt. However, friction and protrusions are not fail-safe methods and tires often fall off of the conveyor causing harm to people and property located near the conveyor.

The tire distribution process often includes transporting large quantities of tires from the plants where they are manufactured to the various facilities where tires are delivered to consumers and/or mounted on vehicles. The processes for transporting tires from these plants to wholesalers, retailers, and service centers typically involve the use of large vessels. For example, semi-trailers are used for transportation over the road, rail cars are used for transportation via rail, and shipping containers are used for transportation over water. Further, these vessels often provide storage of tires prior to and after transport.

To minimize the costs associated with such storage and transportation, it is desirable to pack tires into each storage and/or transportation vessel in such a manner as to maximize the density of tires within the vessel, while providing satisfactory stability of the loaded tires and avoiding permanent deformation of the loaded tires. Maintenance of tires under a compressive load has been found to improve the stability of the loaded tires. However, compression may lead to permanent deformation of tires in some stacking configurations.

Additionally, to minimize the costs associated with storing the tires once they arrive at their destination (e.g., facilities where tires are delivered to consumers and/or mounted on vehicles such as warehouses and car repair shops), it is desirable to pack tires into the storage location in such a manner as to maximize the density of tires within the storage location, while providing satisfactory stability of the stored tires to prevent injury and save space and avoiding permanent deformation of the stored tires, which may be stored for months or even years.

When the storage and/or transportation within the vessel is complete, tires are typically manually unloaded from the vessel onto a conveyor or pallet. A variety of implements exist for such handling of tires. For example, U.S. Pat. No. 3,822,526, issued to Black in 1974 and incorporated herein in its entirety, discloses a device for manipulating tires. However, a device does not exist that sufficiently eliminates the difficulties of manually stacking tires in a storage and/or transportation vessel, and unloading the compressed tires from the same vessel. Moreover, no sufficient device currently exists to eliminate the reliance on the vessel to maintain a compressive load on tires. Although loaders for tires exist, for example, a machine loader and a loader to create a straight stack of tires, the existing loaders are not designed to stack tires in a herringbone pattern. Further still, the current practice is to rest tires directly against the wall and floor of the trailer or boxcar. As a result, the weight of the stacks is unevenly distributed causing further compression and strain on tires. Thus, a lower-compression system for cradling tires during storage and shipping is desired.

Belt conveyors for tires have been produced to transport tires up to various heights. See U.S. Pat. Pub. No. 2008/0053796 to DePaso et al. ("DePaso"). The entire disclosure of DePaso is incorporated by reference in its entirety.

Thus, there is a need for an elevating conveyor capable of transporting articles, especially tires and solar panels, up steep inclines. Additionally, there is a need for an elevating conveyor capable of transporting large tires, such as tractor trailer tires and tractor tires, and solar panels.

SUMMARY OF THE INVENTION

Certain embodiments of the present invention relate to a conveyor embodying features that address these needs.

Although many of the embodiments are focused on conveyors for tires, the invention may be used in any application where articles are conveyed to different locations. For example, some embodiments are directed to a conveyor for tires while other embodiments are directed to conveyors for solar panels, boxes, wheels, large spools, large rings, rubber components, etc. Further, some embodiments are directed to a conveyor for traditional car and/or SUV tires while other embodiments are directed to a conveyor for tractor trailer (i.e., eighteen-wheelers, semi trucks, semi trailers, or semis) tires, tractor tires, and/or farm machinery tires. Typically, the size and shape of the tire changes depending upon the use of the tire. For example, tires for small cars and/or light trucks may range from about 24" to about 32" in diameter. Tires for a large trucks and/or semi trailers may range from about 32" to about 48" in diameter. Tires for tractors or other farm machinery may range from about 32" to about 74" in diameter.

One aspect of the present invention is to provide a conveyor to move tires or articles up to different heights. The height and angle of the conveyor may be adjustable in some embodiments.

On a conventional tire inspection line, tires brought on a conveyor or like equipment may be stopped at a midway point where information may be read from the barcode affixed to the tires. This is done to identify the type and size of the tires being inspected and sort them into the tires to be sent to the next process and elsewhere. Therefore, one aspect of the present invention is to provide a tire sorting apparatus capable of reliably reading information from a tire identifier, such as a barcode, formed on the surface of a tire without damaging the tire.

It is also an aspect of the present invention to provide a conveyor system comprising a conveyor belt, support elements to support the articles being conveyed, a support frame for the belt and to raise the conveyor belt upward, and a power source. The conveyor belt may include sections secured together, one or more pieces of belt material, strengthening mechanisms either below or between the one or more pieces of belt material to support the support elements, an upper surface, and an under surface. The power source may comprise electrical components and a motor. Note that the terms "cleat" and "support element" can be used interchangeably herein.

In some embodiments, the conveyor may be specially designed to move passenger car and light truck tires upwardly at incline angles up to 60 degrees. In other embodiments, the conveyor may be specially designed to move semi truck and tractor tires upwardly at incline angles up to 60 degrees. In still other embodiments, the conveyor is designed to convey tires of any size substantially vertically, i.e., at an incline of approximately 90 degrees relative to the horizontal.

In various embodiments, the features of the conveyor include: a 18" wide 2 ply rubber covered top belt sliding flat at 60 FPM, one or more 4" high urethane cleats bolted to the belt on approximately 60" centers, a curved cleat pattern to fit tire contour, one up/stop/down switch at the bottom end, a 1 hp 115V 13 FLA electric motor with speed reducer mounted under bottom end, a thermal overload motor protector, a rubber lagged conveyor belt drive pulley, a plain idler pulley with belt tensioner, a high strength steel tubing truss conveyor frame, and a base plate. In additional embodiments, the conveyor may include: an off switch at the top end, a portable stand with casters to hold the top end at a fixed height, a portable stand with casters with a hand-winch adjustable top end height, up/emergency and stop/down switches at both ends of the conveyor with UL listing, a 24" wide belt for tractor trailer size tires, a 6" high single cleat for vertical tire lift installation, straight cleats for handling boxes, bags, and general merchandise, and a smooth or rough top belt for shallow inclines. In some embodiments, the width of the belt is larger than 24" and in other embodiments the width of the belt is less than 24".

Advantages of a conveyor of one embodiment of the present invention include: specially designed to move tractor trailer tires up the conveyor at incline angles up to 55 degrees, available 10 feet long and longer in 1 foot increments, 24" wide, 2 ply rubber covered top belt sliding flat at 58 FPM, 6" high urethane cleats bolted to the belt on approximately 60" centers, a curved cleat pattern to fit tire contour, one up/stop/down switch at the bottom end, a 1½ hp 115V 18 FLA electric motor with speed reducer mounted under bottom end, a thermal overload motor protector, all electrical prewired, a rubber lagged conveyor belt drive pulley, a plain idler pulley with belt tensioner, a high strength steel tubing truss conveyor frame, and a base plate. To select the conveyor size, take the floor-to-floor vertical distance and add the overhang desired, usually 2-3 feet. This sum equals the Total Vertical Distance (TVD). Use the table below as a guide for the conveyor length required. In some embodiments, the maximum recommended incline of operation is 60 degrees.

| Floor to Floor Vertical Distance | Recommended Overhang | Total Vertical Distance (TVD) | Conveyor length required at a 55 degree incline |
| --- | --- | --- | --- |
| 8 ft. + | 2 ft. = | 10 ft. high | 12 ft. long conveyor |
| 10 ft. + | 2 ft. = | 12 ft. high | 15 ft. long conveyor |
| 12 ft. + | 2 ft. = | 14 ft. high | 17 ft. long conveyor |
| 14 ft. + | 2 ft. = | 16 ft. high | 20 ft. long conveyor |

In various embodiments, the cleats may be attached, secured, or interconnected to the belt using a set of two bolts. Further, the bolts may be ¼"×1¼" #1 elevator bolts with hardware. The cleats may also include holes for the bolts or other interconnection mechanisms.

In some embodiments, the cleats may flip up when going up the conveyor and flip down when going down the back of the conveyor. In one embodiment, the cleats may be hinged to the belt such that they can flip up and down. Other flip mechanisms may also be contemplated by one skilled in the art. In some embodiments, the cleats are permanently attached to the belt. In other embodiments, the cleats are removable. In one embodiment, the cleats are attached without the use of screws.

In some embodiments, the cleats may be flexible. Thus, each cleat may be constructed entirely from an elastomeric material that provides flexibility. In one embodiment, the cleat or support element is flexible along the length of cleat such that when a tire or article is positioned on the conveyor belt, the two cleats bend in a direction opposite the direction of belt travel along the conveying path. In other embodiments they may be rigid.

In various embodiments, the cleats or tire support elements have a unique shape to hold tires on a conveyor belt. Thus, the first and second tire support elements each has a front section having an tire-supporting face that has a first curve that is curved along the tire support element's length and toward the direction of belt travel. The tire support element also has a back section with a second curve that is curved along its length and in the direction of belt travel. The second curve is typically greater than the first curve. Additionally, each of tire engaging support elements has a flat conveyor contacting surface that engages the outer tire-conveying surface of the conveyor belt. The support element may also have a top surface that is positioned at an angle relative to the flat conveyor contacting surface.

In various embodiments, the system may comprise one or more motors, which may be changed out to use motors having different power capabilities. In further embodiments, the motor(s) may be detachable and removable.

In some embodiments, the conveyor is foldable for storage flat on the ground or flat against a wall. In other embodiments, the conveyor may be foldable and stored in the location of use. Therefore, when a user needs to use the conveyer, he or she just has to pull the conveyor down. The pull-down and storage motion may be similar to a Murphy bed in some embodiments. Further, the conveyor may be pulled down from a specific rack or other storage area.

In some embodiments, the support elements or cleats are bolted onto the belt. A gasket that can be rubber may also be used to increase the strength of the interconnection. Additionally, bolting the cleats onto the belts reduces the cost of the system.

In various embodiments, the conveyor may have rubber feet to help it stick to the ground/floor. The feet may be made of materials other that rubber in alternate embodiments. Thus, the bottom of the conveyor may contact the floor in one or more places depending on the embodiment. In other embodiments, the conveyor may be positioned on a rail such that the conveyor can slide along the rail to different storage areas. Thus, in an embodiment, the conveyor moves along the rails in a similar manner as library ladders. One skilled in the art can image a rail system similar to the rail systems described herein.

In various embodiments, the conveyor may include an endless conveyor belt looped around rotating drive elements, such as sprockets, drums, or pulleys, which advance the conveyor belt in a direction of belt travel along a conveying path. The endless conveyor belt may have an outer, article-conveying surface and an inner, drive surface engaged by the drive elements. On a steeply inclined elevating portion of the conveying path, the articles are conveyed vertically or at a steep angle. The articles are maintained in position and blocked from sliding down the outer surface of the conveyor belt on the steeply inclined portion of the conveying path by support elements or cleats that extend outwardly from the outer surface. The support elements are periodically spaced along the length of the conveyor belt to form individual bins for the articles. A steep incline for a given conveyor belt may be defined as a conveying path that is so steep that typical vibrations, jolts, or surges cause conveyed articles supported on support elements to fall from the conveyor belt advancing along the incline. In various embodiments, the conveyor may be inclined up to an angle of 60 degrees relative to the horizontal plane.

In some embodiments, the floor-to-floor vertical tire conveyor ("VTC") requires minimal ground floor space next to the mezzanine and is also capable of clearing existing structures, such as fire service lines. Although the term VTC is used herein, the VTCs can convey articles other than tires. In some embodiments, the VTC is substantially straight and a user must remove the tire from the top of the conveyor or the top of the conveyor must be interconnected to a mechanism or machine that removes the tire from the top of the conveyor. One disadvantage of the straight VTC is that a hole is typically cut into the mezzanine floor to accommodate the straight VTC. Having a hole in the mezzanine floor can be dangerous and can interfere with existing fire sprinkler water lines and electric lighting, both of which are typically positioned immediately underneath the mezzanine floor. Another disadvantage of the straight VTC design is that every single article or tire that goes up the conveyor must be removed from the conveyor manually when it arrives at the top end. With the inclined, but not vertical, conveyor, this is not necessarily the case because the articles can fall off of the top of the conveyor onto the floor or another (e.g., horizontal) conveyor.

Thus, a VTC that automatically discharges the articles/tires at the top end of the conveyor may be desired. Accordingly, in other embodiments of the VTC, the top end of the VTC has a nose-over portion that allows for easy unloading (or loading for descent) of tires and keeps the operator clear of both moving conveyor parts and the mezzanine edge. Here, the base of the conveyor could be positioned outside of the mezzanine structure and within the limited distance between service bays (or other constraints) and the edge of the mezzanine. Additionally, the nose-over VTC could avoid interference with existing fire sprinkler water lines and electric lighting, both of which are typically positioned immediately underneath the mezzanine floor. The cleat interconnected to the belt for the nose-over VTC may be shorter and of a different configuration than the cleat for the straight VTC. However, the same cleat may be used for both conveyors in various embodiments.

As discussed herein, the upper/outward-facing surface of the conveyor belt is typically referred to as the "article-conveying surface" and a forward and upward-oriented portion of the cleat is referred to as the "article-supporting face." This is because on an incline conveyor (i.e., non-vertical conveyor), the belt bears the brunt of the conveyed article's weight and the cleats act as supports to keep the articles (e.g., tires) from sliding backwards down the belt. However, when the conveyor is a vertical conveyor (for example, a VTC) the roles of the belt as an "article-conveying surface" and the cleat as a "article-supporting face" are reversed, meaning that on a VTC the cleat is the primary contact with the article (e.g., tire), but the weight burden is equally shared between the cleat and the belt.

In some embodiments of the VTC and other conveyors described herein, the conveyor frame is constructed of standard commercial quality ("CQ") steel tubing rather than the high strength ("HS") tubing generally used. This is advantageous because the CQ steel tubing is less expensive than HS tubing and the HS tubing is not necessary for all conveyors. However, some embodiments include HS tubing or a combination of CQ and HS tubing.

Various embodiments of the VTC and other conveyors described herein include two tubes or rails directly next to each other that are positioned between and substantially perpendicular to the longitudinal frame rails and proximate to a center of the frame length. The tubes/rails may be square or rectangular shaped such that they extend around the perimeter of the frame. These two rails or tubes permit the conveyor frame to be cut into two pieces, e.g., to facilitate installation, because the frame can be cut between the two tubes/rails and each piece will maintain its shape. Then, the two pieces are U-bolted back together to form one conveyor frame using U-bolts and fastening equipment.

In some embodiments of the VTC and other conveyors described herein, the frame comprises sheet metal paneling on all or a portion of the sides of the frame. The paneling can extend between about 1 ft. and about 8 ft. along the side of the conveyor from the end (either the top or bottom end). In preferred embodiments, the sheet metal paneling extends about 4 ft. from each end. The sheet metal paneling is typically provided for safety purposes, e.g., to keep people, heads, arms, hands, fingers, legs, feet, etc. out of the portions of the conveyor comprising moving parts and the portions of the conveyor where most injuries occur.

In various embodiments of the VTC and other conveyors described herein, the conveyor comprises a ½ hp motor or a ¼ hp motor. Alternatively, any of the conveyors described herein can be constructed with a motor that is smaller than ¼ hp or a motor that is larger than ½ hp.

In some embodiments of the VTC and other conveyors described herein, the conveyor comprises an 18"-wide rubber top cover belt with a friction-resistant bottom cover. Various embodiments include a 5 7/16" high/tall cleat that attaches to the outer face of the belt. The cleat may be interconnected to the belt via two bolt fasteners, flat washers, lock washers, and nuts, or any other attaching mechanism known in the art. The cleats may be urethane or other hard material, e.g., plastic, hard rubber, metal, etc.

In various embodiments of the VTC and other conveyors described herein, the cleat has various shapes and dimensions depending on the specific use by the user, the location of the conveyor, the items being conveyed, and the angle of the conveyor relative to the horizontal ground. In some embodiments, the cleat has a 5" overall height and features for careful handling of tires. For example, the cleat can have an extended radius of curvature opposite the article supporting/carrying surface radius and at the cleat tip (upper end) to deter tires or other articles from falling off. Some cleats have narrow widths and edges with radii of curvature to prevent damage to the tire's inner bead. Further, various cleats described herein are manufactured of a urethane composition. In some embodiments, the VTC cleat has a carrying surface (i.e., article-supporting face) that is more rounded than cleats of prior designs, in order to better fit the tire bead contour.

In some embodiments of the VTC, the conveyor is motor driven at the bottom end of the conveyor, meaning the motor is positioned at the bottom end of the conveyor. In other embodiments, the VTC comprises a motor at the top end of the conveyor.

Various portions of the conveyors described herein can vary depending on the specific use of the conveyor. For example, some conveyors may have tighter frame dimensions and features to facilitate installation within tight clearance restrictions. Further, there is a balance between the conveyor belt width, sufficient traction between the belt and the conveyor belt drive pulley to carry the conveyed article (e.g., tire load), and keeping overall dimensions as tight as possible. The conveyor belt width could be variable, but it has to be countered with the drive pulley diameter for sufficient traction. For example, the conveyor belt can be between about 18" wide and about 10" wide. Further, smaller diameter drive and idle drum pulleys are used in some embodiments.

In some embodiments of the VTC and other conveyors described herein, the conveyor comprises a 10"-wide, 2-ply rubber cover on both sides of the belt. In this embodiment, the conveyor belt drum drive pulley has rubber lagging wrapped around its circumference and a 4.5" outside diameter ("O.D."). The rubber contact between the belt and the drive pulley provides for maximum traction between the two.

Various embodiments of the VTC and other conveyors described herein have a high-efficiency, helical gearmotor mounted at the top end of the conveyor frame for maximum belt-to-pulley traction. The gearmotor plus the roller chain and sprockets are all enclosed within the conveyor frame for safety and to facilitate installation through tight clearances, in some embodiments.

Some embodiments of the VTC and other conveyors described herein comprise a low-profile, custom-design belt tension take-up adjustment to keep all dimensions of the adjustment below the highest point of the conveyor belt drum tail pulley.

In some embodiments, once the articles are conveyed up the incline, they may be transferred to an outfeed conveyor for transport to downstream finishing stations or other storage sections. Further details of exemplary slide-preventing cleats or pair of cleats may extend outwardly from the outer, article-conveying surface of the conveyor belt. In an embodiment, the cleats may be integrally formed with the belts. In another embodiment, the cleats may be secured to a threaded insert in the belt by a bolt or the like through a bore formed in a block of the cleat.

In some embodiments, the cleats are secured to the conveyor belt. In other embodiments, the cleats are secured to a metal drive belt provided under the conveyor belt. Thus, the conveyor belt may have apertures in the belt such that the cleats can extend upwardly from the drive belt and above the conveyor belt. In alternative embodiments, the cleats are secured to a metal (or other material) support within the conveyor belt (i.e., between two layers of the conveyor belt). The cleats may be secured or interconnected to a belt or other part of the conveyor through the use of screws, pins, rivets, bolts, nails, glue, adhesive, sewing, clamps, bonding, welding, or any other mechanism now known or later conceived.

In various embodiments, the cleats are various sizes and shapes depending on the tire or article to be conveyed. In one embodiment, the conveyor belt may include support elements or cleats of many different sizes. The cleats may fold up in order to support an article to convey or may fold down such that it does not inhibit or interfere with the articles being conveyed. Thus, in this embodiment, the cleats that are of a size not currently being utilized are folded down such that they are substantially flat against or within the belt. In other embodiments, the cleats that are of a size not currently being utilized may be folded into the center of the conveyor belt such that they do not interfere with the articles being conveyed.

In various embodiments, the conveyor belt may be a modular plastic conveyor belt constructed of a series of individual belt modules made of a thermoplastic polymer, such as polypropylene, polyethylene, acetal, or a composite material, in an injection molding process. A threaded metallic insert may be inserted into the module during or after molding to serve as an attachment point for a support element. The details of one such insert and its use are described in U.S. Pat. No. 6,926,134, "Plastic Conveyor Belt Module with Embedded Fasteners," which is incorporated by reference herein in its entirety. Of course, other methods may be used to fasten the support elements to the conveyor belt.

In some embodiments, the conveyor belt sections comprising cleats may be interconnected to one another and to other similar belt sections without cleats in a side-by-side orientation and end-to-end by hinge rods through hinge eyes to form an endless conveyor belt.

In one embodiment, the system may comprise two cleats that are spaced apart laterally across the width of the conveyor belt. The cleats may have article-supporting faces defining planes oblique to the direction of belt travel and intersecting at a point on the belt below or behind the cleats on the steep incline. The two cleats provide two points of support for round articles, such as tires, and the space between them allows debris or fluids to drop from the tire and off of the belt.

In one embodiment, the belt is replaced with rollers or a roller array. The rollers provide a low-friction, rolling restraining surface that is especially useful with high-friction articles, such as tires. Further, the conveyor belt described as a plastic conveyor belt may be a flat belt or a flat-top chain in other embodiments. Another embodiment of an elevating belt conveyor embodying features of the present invention may include a roller array to prevent conveyed articles from falling off the belt.

One skilled in the art will appreciate that the conveyor and its features may vary depending upon the combination of elements in various embodiments. In some embodiments, the cleats have a rounded shape such that the curve of the cleat matches the curve of the tire being conveyed or transported. Thus, the curve of the cleat is slightly larger than the curve of the tire so that the tire will sit in and fit into the cleat. In still other embodiments, the cleat may have a different shape. For example, the cleat may not be curved. Rather, the cleat may be flat like a wall or tile. The cleat may also be shaped like a post or rod. Still further, the cleat may be V-shaped or U-shaped and only one cleat may be used to support each tire or conveyed article.

In some embodiments, the cleat may only come up to the midpoint of the side of the tire. In other embodiments the height of the cleat is greater than the height of the tire lying on its side, i.e., the width of the tire. In still further embodiments, the height of the cleat is somewhere between the midpoint of tire's side height and the top of the tire's side when the tire is lying on its side.

In various embodiments, one cleat per tire or conveyed article may be used. In other embodiments, two cleats per tire or conveyed article may be used. In other embodiments, 3 or more cleats per tire or conveyed article may be used. Additionally, in some embodiments one cleat may be used for one tire or conveyed article and two or more cleats may be used for another tire or article. Thus, the number of cleats could change throughout the conveyor.

In still more embodiments, the position of the cleats may be varied depending upon the shape and size of the tire or article conveyed. For example, the cleats may be spaced further apart and positioned at less of an angle relative to horizontal if the radius of the tire is large, whereas the cleats may be positioned closer together and at a greater angle relative to horizontal if the radius of the tire is small.

Although the invention has been described with application to tires, the invention also finds application to transporting other articles. For example, boxes, solar panels, windows, construction equipment, car or automobile components, tractor components, pallets of products, etc. may be transported on the conveyors.

In some embodiments, the conveyor may be configured with a conveyor belt, roller bars, and/or any other mechanism for moving tires. The conveyor may be configured to be located at any height above a platform to facilitate access by a worker. In one embodiment, the conveyor may be configured about three feet above the platform. The conveyor may be configured to automatically move tires in one or more directions. For example, in one embodiment, the conveyor may be configured to move tires from a placement station to any desired location, such as, for example, a tire loading system, a tire unloading system, a forklift, a railcar, and/or a tire rack. In another embodiment, the conveyor may be configured to move tires to/from a location such as, for example, a tire unloading system, a forklift, a railcar, a tire rack, a tire storage location or the like to/from the placement station for manual loading of tires into racks or storage areas in the tire load station.

In some embodiments of the conveyor system, humans may load articles or tires onto the conveyor (typically the bottom of the conveyor) and unload articles or tires off of the conveyor (typically the top of the conveyor) as a part of the system. In various embodiments, one or more persons load the tires and a different one or more persons unload the tires or articles. In alternate embodiments, machines or robots may load and unload the articles and tires. In additional embodiments a combination of humans, robots, and machines may be used to load and unload the articles or tires.

Lean manufacturing principles may be applied throughout embodiments of the invention to facilitate efficiency in tire loading, unloading, and/or storage. For example, in one embodiment, value stream mapping is used to analyze logistics data provided by a company to create Pareto analysis to identify high volume, high turn-over tire SKUs (i.e., stock control units). A manufacturing plant analysis is implemented to determine the capacity and production rate of a given customer to determine the size, capacity, number, and/or breadth of tire loading, unloading and/or storage needed to fulfill capacity and production goals. For example, for higher customer inventory levels, fully-automated loading, unloading and/or storage systems may be desired. However, for lower inventory levels, customers may use partially-automated loaders, unloaders, and/or storage systems to maximize efficiency and lower overall costs.

In yet other embodiments, the systems and methods of the present invention are facilitated by one or more human and/or computerized operators. For example, an operator monitors robot loaders and/or unloaders, monitors system settings and/or identifies racks that require replacement or repair. Operators also drive forklifts, load/unload tires, and/or the like to facilitate overall system usage.

One aspect of embodiments of the present invention is to provide a system capable of handling all sizes of vehicle tires, providing maximum compression of tires, and minimizing the manual labor required for loading, unloading, stacking, and/or storing the articles or tires.

In some embodiments of the system, tires are ricked or stacked in a herringbone pattern to facilitate compression and/or space management. The system and method also includes the stacking of tires in any other suitable arrangement that would allow the transport rack to perform similar functions. Moreover, the system and method may include any variation or angle of herringbone patterns that would allow the transport rack to perform similar functions as disclosed herein.

As one with ordinary skill in the art appreciates, the proper alignment of tires in the herringbone pattern depends upon the geometry of tires being stacked. Thus, the system contemplates and accommodates incorporation of an automated system for control of the loader system. The control system automatically senses tire geometry based on sensors located at an upstream position on the conveyor, or alternatively, accommodates the manual input of information. In both cases, however, the control system uses information that is indicative of tire geometry, such as outside diameter, inside diameter, and/or tread width, to determine the rotation and translation of each tire to produce the desired stacking pattern. With respect to herringbone stacking patterns, the relevant output variables may include the angle of deviation from vertical associated therewith the axis of rotation of tires in successive rows as well as the number of tires in each row and the number of rows in each stack. Furthermore, the control system may determine the appropriate amount of compression to apply to the stacked load, and the corresponding number of rows in the stack, to avoid permanent deformation of tires. The control system may consider a variety of factors in determining the appropriate compressive loads to apply. In one embodiment, these factors include the material properties and/or hardness of tires (usually rubber), tire geometry and stacked orientation, and the time and temperature environment to which compressed tires will be subjected. In addition, empirical data and experience may be incorporated to optimize the control of the system.

As used herein, warehouse racks include any type of rack that is distinct, including for example, pallets, racks such as those manufactured by Ohio Rack, Inc., or the like.

In some embodiments, the conveyor system may comprise one or more scanners to facilitate identifying each tire or article. For example, in one embodiment, the system comprises two scanners configured on both sides of a two-lane conveyor. The scanners may be configured both above and below the conveyor and/or articles to facilitate reading the articles' labels/SKUs. In alternate embodiments, the scanner may be a barcode scanner, a radio-frequency scanner, optical scanners, vision systems and/or any other type of scanner for reading and/or identifying tire or article labels and/or SKUs. The scanner may be configured with a CPU and/or any other computing system or unit. The scanner may also be configured to communicate with the rack loading system, conveyor, and/or any other part of the system or any other system described herein. Alternatively, RFID tags and readers may be used with the system.

In one embodiment, each tire on a conveyor and/or a warehouse storage area is the same type, size, and/or SKU number, or may be designated for the same destination or storage area. Tires may be delivered to storage areas and/or a warehouse rack on a conveyor. In additional or alterative embodiments, articles and tires may be delivered to storage areas and/or a warehouse rack on two or more conveyors. Further, the tire or article may be scanned and identified then loaded on to the appropriate conveyor for storage in the appropriate area. Thus, one type of tire may be loaded onto one conveyor to be stored in a first area and a different type of tire or article may be loaded onto a second conveyor to be stored in a second area that is different from the first area.

In some embodiments, the conveyor system and the rack loading system may also be configured to stack tires or articles based upon identification information received from the scanner. For example, in one embodiment, the rack loading system may be configured to receive tire identification information from the scanner and to use the tire identification information to determine what tire stacking configuration to use. That is, for smaller diameter tires, the rack loading system may stack tires in layers of five tires, for example. For larger diameter tires, the rack loading system may stack tires in layers of four tires, for example.

In various embodiments, the one or more conveyors may elevate the tires to a stop position in front of one or more position pick-and-place loaders. The pick-and-place loaders may each comprise a support-mounted actuator system, each of which controls an extendable/retractable arm that is adapted to seize the tire or article from the conveyor.

In some embodiments, the system is configured to sort and queue tires horizontally. For example, the system comprises one or more tire transportation devices, such as, access conveyors that connect to one or more sub-conveyors. In an embodiment, an access conveyor may move the tires from the main unloading conveyor to various sub-conveyors. The sub-conveyors, in turn, may move tires to/from towers. Some conveyors may be configured to be computer-controlled devices to facilitate sorting, queuing and/or routing of the tires. In one embodiment, the tires are loaded randomly and scanners are used to sort, queue and/or route the tires when they are unloaded from towers.

In another embodiment, some conveyors may be configured with one or more scanners to obtain tire identifying information to facilitate sorting and queuing the tires. The scanners may be configured like scanners and communicate with the conveyors to facilitate directing each SKU of tire to a different sub-conveyor for loading into a particular tower. Each tower is configured to hold between 10 and 30 tires of a single SKU.

In one embodiment, a queuing system may comprise an inbound queue of tires or articles that have been unloaded from a trailer, railcar, forklift and/or other transportation mechanism. For example, a number of tires or articles are queued on each side of the queuing system.

In various embodiments, the system may also be configured with a control panel to facilitate worker operation of the conveyor. For example, the worker may use a panel to raise or lower the conveyor in order to facilitate access to tires, storage areas, and racks. In another embodiment, a load station may be configured with one or more scanners or cameras to detect the height of rack, storage floor, storage area, tires, and the conveyors and raise or lower the conveyor based on whether the height of the racks, tires, storage floor, storage area, or conveyor meets a predetermined height.

The scanner computing unit or any other computing unit used or described herein may be connected with each other via a data communication network. The network may be a public network and assumed to be insecure and open to eavesdroppers. In the illustrated implementation, the network is embodied as the Internet. In this context, the computers may or may not be connected to the Internet at all times. For example, the customer computer may employ a modem to occasionally connect to the Internet, whereas the bank computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors (Sybex 1999); Deborah Ray and Eric Ray, "Hosting HTML 4.0" (1997); Loshin, "TCP/IP Clearly Explained" (1997). All of these texts are incorporated by reference herein in their entireties.

It may be appreciated that many applications of the present invention may be formulated. One skilled in the art may appreciate that a network may include any system for exchanging data or transacting business, such as the Internet, an intranet, an extranet, DSL, WAN, LAN, Ethernet, satellite communications, and/or the like. It is noted that the network may be implemented as other types of networks, such as an interactive television (ITV) network. The users may interact with the system via any input device such as a keyboard, mouse, kiosk, smart phone, e-reader, tablet, laptop, Ultrabook™, personal digital assistant, handheld computer (e.g., Palm Pilot®), cellular phone, or the like. Similarly, embodiments of the invention could be used in conjunction with any type of personal computer, network computer, workstation, minicomputer, mainframe, smart phone, etc. Moreover, although the invention is frequently described herein as being implemented with TCP/IP communications protocols, it may be readily understood that the invention may also be implemented using IPX, Appletalk, IP-6, NetBIOS, OSI or any number of existing or future protocols. Moreover, the present invention contemplates the use, sale or distribution of any goods, services or information over any network having similar functionality described herein.

In accordance with various embodiments of the invention, the Internet Information Server, Microsoft Transaction Server, and Microsoft SQL Server, may be used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

A system user may interact with the system via any input device such as, a keypad, keyboard, mouse, kiosk, smart phone, e-reader, tablet, laptop, Ultrabook™, personal digital assistant, handheld computer (e.g., Palm Pilot®, Blackberry®, iPhone®, iPad®, Android®), cellular phone, or the like. Similarly, the invention could be used in conjunction with any type of personal computer, network computer, work station, minicomputer, mainframe, smart phone, tablet, or the like running any operating system such as any version of Windows, MacOS, iOS, OS/2, BeOS, Linux, UNIX, Solaris, MVS, tablet operating system, smart phone operating system, or the like, including any future operating system or similar system.

In one embodiment of the present invention, a tire sorting apparatus that includes a mounting means for mounting a tire in a plane perpendicular to the center axis of the tire, a tire grip means for gripping the inner periphery of the tire and positioning the center axis of the tire, an identifier reading means for reading a tire identification marking formed on the surface of the tire, and a holding means for holding the identifier reading means. The tire grip means may further include three grip arms arranged at the vertexes of a triangle within a plane perpendicular to the center axis of the tire and extending in a direction parallel to the center axis of the tire and an arm opening and closing mechanism for opening the three grip arms concentrically around the circle circumscribing the triangle. The holding means may further include a holding unit for holding the identifier reading means and a rotation drive unit for rotating the holding means around a rotating axis parallel to the center axis of the tire. And the center of the circumscribing circle is aligned with the rotating axis of the holding unit.

Some embodiments of the system of the present invention may further include a tire inside diameter detecting means for detecting a tire inside diameter from positional data or travel distance data of the three grip arms when the grip arms are gripping a tire. This allows not only acquisition of information from a tire identifier of a tire but also accurate measurement of the inside diameter of the tire. Hence, the possibility of rechecking the information on the tire identifier may further improve the accuracy of tire sorting.

Some embodiments of the system of the present invention may include a rotation radius changing means for changing the distance between the identifier reading means and the rotation axis of the holding unit and a detecting position control means for controlling the rotation radius changing means in such a manner as to move the identifier reading means to the position of the tire identifier based on the data of the tire inside diameter detected by the tire inside diameter detecting means. Thus, the rotation radius of the identifier reading means may be changed according to the tire size. Therefore, information may be read from the tire identifier even when there is a change in tire size.

Additional embodiments of the system of the present invention may provide a tire sorting apparatus that has a mounting means having a plurality of rotating bodies rotating in contact with the lower surface of the tire and a through hole through which the three grip arms may be extended toward the inner periphery of the tire.

In some embodiments of the system, devices to help in the compression of the tire stacks may be included. Some tire stacking systems, however, continue to rely heavily upon manual labor to accomplish the stacking of tires. For example, U.S. Pat. No. 5,697,294 issued to Keller et al. on Dec. 16, 1997, ("Keller I") discloses an exemplary tire compression device and U.S. Pat. No. 5,816,142 issued to Keller et al. on Oct. 6, 1998, ("Keller II") discloses another tire compression device intended for use with a forklift. Both Keller I and Keller II are incorporated by reference herein in their entireties. The Keller I and Keller II devices allow a preset load to compress a stack of tires as the stack is loaded into a truck trailer. Initially, the forklift elevates and supports the preset load. Then, once tires are stacked beneath the elevated load, the forklift allows the load to be lowered against a stack of tires. As a result, the load exerts a downward pressure on the stack of tires, thereby compressing the tires. Once the initial stack is compressed, additional uncompressed tires are loaded on top of the stack until the stack reaches the ceiling of the truck trailer. Then, the forks of the forklift are raised, partially releasing the pressure applied against the compressed portion of the stack and allowing it to expand, while compressing the previously uncompressed portion until the entire stack is equally compressed. This process is repeated, stack by stack, until the entire trailer is full of stacked, compressed tires. Other devices exist that load tires into a truck trailer and similarly compress tires within the trailer. In each of these cases, tires are maintained in compression by the storage and/or transportation vessel itself. However, no assurance exists that the vessel was designed or is suitable to maintain such loads. In fact, vessels are frequently damaged as a result of such use.

Various embodiments of the present invention include an apparatus for loading a tire onto a rack. The apparatus includes an automated tire conveyor, one or more scanners, and one or more robots to pick the tires off of the conveyor. The system may additionally include an apparatus for unloading a rack of tires, which includes a load station configured with a lift. The lift raises a rack of tires to a platform, where an unloader may manually or automatically move tires from the rack to a conveyor.

Further, some embodiments of the present invention include methods and systems for sorting and unloading tires into a store or warehouse for storage and sale as well. For example, the systems for sorting and unloading tires may include one or more automated conveyors, scanners, and storage structures. For example, in the sorting system, the scanner may read information off of incoming tires and communicate the tire information to a system of conveyors, which in turn directs each tire to a specific storage structure based upon the tire information (e.g., size, type, etc.).

In various embodiments, drive-in storage may also be included in the conveyor system configured with one or more computing systems, such as those described herein, to communicate with other loading or unloading systems of the system disclosed herein. For example, an unloading system within the system disclosed herein may communicate with drive-in storage when a first rack, which is being unloaded, is all or partially-empty such that a second rack may be delivered from the drive-in storage to the unloader. In another embodiment, an unloader or loader communicates with the drive-in storage when daily customer orders show that there is additional demand for a specific tire SKU (i.e., stock control unit). The rack may then be pulled from the drive-in-storage using, for example, a pull system applying lean manufacturing principles.

In some embodiments, the conveyor system may also include a system for loading, sorting, or unloading tires. The system may be automated or computer controlled. The system may be used in a plant that manufactures tires, and sorts and stores tires coming off the assembly line, and then dispenses tires in a desired order for shipment. Further, the system may also be used for loading and unloading articles or tires at a final destination, such as a tire shop or warehouse, where tires may be stored.

One aspect of the invention is a method for conveying articles up steep inclines. In one embodiment, the method for conveying articles up steep inclines comprises: (a) conveying articles on the conveying surface of an endless conveyor belt along a steep incline in a direction of belt travel; (b) blocking conveyed articles from sliding down the conveying surface of the conveyor belt on the steep incline; and (c) restraining conveyed articles leaning away from the conveying surface with a restraining surface moving in the direction of belt travel to prevent the leaning articles from falling away from the conveying surface of the conveyor belt on the steep incline.

The present invention includes a method of packing tires that includes placing one or more rows of tires against a bottom frame, adding an intermediate frame on top of the one or more rows of tires, compressing the tires, and attaching a vertical member to the intermediate frame. The method additionally includes adding one or more additional rows of tires on top of the intermediate frame, adding a top frame, compressing the one or more additional rows of tires, and attaching a vertical member to the top frame.

By way of providing additional background, context, and to further satisfy the written description requirements of 35 U.S.C. § 112, the following references are incorporated by reference in their entireties for the express purpose of explaining the nature of conveyors and to further describe the various tools, pieces, and other apparatuses commonly associated therewith:

U.S. Pat. Pub. No. 2012/0325903 to Takahashi describes a tire sorting apparatus for reliably reading information from a tire identifier, such as a barcode, formed on the surface of a tire without damaging the tire. Placed under a tire-mounting table is a tire grip that has three grip arms arranged circularly in a plane perpendicular to the tire center axis and link mechanisms for spreading the grip arms. Placed above the mounting table is a barcode reader rotating means for rotating a barcode reader held by a barcode reader holder. The rotation axis of the barcode reader is aligned with the center of the circle formed by the grip arms of the tire grip.

U.S. Pat. Pub. No. 2009/0148260 to Leimbach et al., which is incorporated herein by reference in its entirety, discloses a tire loading apparatus and method of packing tires that includes placing the tires in a rack, compressing the tires, and assembling the rack. The apparatus includes one or more conveyors, scanners, and robots that load tires from a conveyor to a rack. A tire unloading apparatus is also disclosed. The unloading apparatus includes a scissor mechanism to rise and lower tire racks to an unloading platform. The unloading apparatus additionally includes one or more unloaders and conveyors. The sorting and unloading of tires is accomplished with one or more automated conveyors, scanners, and storage structures for reading information from incoming tires and using the tire information to sort and store the tires. A rack to improve compression and support of tires during storage and shipment is also disclosed.

U.S. Pat. No. 6,527,499, issued to Leimbach, et al. on Mar. 4, 2003, ("Leimbach") discloses an example of a tire loading system. The unloading system and method described herein may include features or steps (which may be in any order) described in Leimbach, which is incorporated by reference in its entirety.

U.S. Pat. Pub. No. 2010/0043952 to Terazono discloses bead core and a bead filler and is incorporated by reference in its entirety.

U.S. Pat. Pub. No. 2012/0092149 to Fujisawa discloses an inspection apparatus arranged with a plurality of cameras located at relatively displaced circumferential positions and set for the respective shooting positions different from each other in the axial direction of the tire. Thus the images of the inner circumferential surface of the tire are shot by the plurality of cameras as the tire is rotated circumferentially relative to the plurality of cameras. Fujisawa is incorporated herein by reference in its entirety.

U.S. Pat. Pub. No. 2011/0013177 to Crim discloses an apparatus and method for verifying a laser etch on a rubber sample. In one embodiment, the apparatus includes a tire production line, a sample holding device, a laser having a diode, and a servo-assembly. The laser of the apparatus is configured to etch indicia on a sidewall of a tire on the tire production line and is further configured to etch at least one line in a rubber sample on the sample holding device. Crim is incorporated herein by reference in its entirety.

U.S. Pat. No. 7,249,496, issued to Kunitake, et al. on Jul. 31, 2007, ("Kunitake") discloses an uniformity inspection line with a decision-only line having first UF machines exclusive for the measurement of the uniformity of a tire sorted and distributed on an automatic sorting line and a correction-only line having second UF machines for the correction and re-measurement of the uniformity characteristics of a tire having uniformity characteristics outside specific values measured on the above decision-only line. Kunitake is incorporated herein by reference in its entirety.

U.S. Pat. No. 7,340,946, issued to Gotou, et al. on Mar. 11, 2008, and U.S. Pat. Pub. No. 2007/0084275 to Gotou, et al. disclose a method and a device for inspecting a tire, the method comprising the steps of, in a rim assembly station separated from an inspection station having a tire inspector installed thereon, forming a rim/tire assembly in a setup by assembling one side and the other side rims and with an inspected tire and, when an inspection is performed, transforming the rim/tire assembly from the rim assembly station to the tire inspector on the inspection station, whereby a preparatory operation time in the tire inspector can be shortened to shorten a cycle time. The Gotou patent and Gotou publication are incorporated herein by reference in their entireties.

U.S. Pat. No. 7,487,814, issued to Mizota on Feb. 10, 2009, discloses an object to provide a tire reinforcing layer forming device which can form, by a single device, plural reinforcing layers whose cord directions intersect one another. A reinforcing material piece, which is distributed to an upper conveying path, is affixed from a left end side of a drum toward a right side, while the drum is rotated in a direction of arrow CW. Mizota is incorporated herein by reference in its entirety.

U.S. Pat. No. 7,347,317, issued to Aizawa, et al. on Mar. 25, 2008, discloses methods and devices for measuring elongation, wear, and internal temperature of a conveyor belt to catch signs of conveyor belt failure such as breakage by detecting a magnetic field from a magnetic body by using a magnesium sensor, as well as a rubber magnet sheet as a magnetic body and a method of producing the sheet, the rubber magnet sheet being able to be used while it is embedded in the conveyor belt. Aizawa is incorporated herein by reference in its entirety.

U.S. Pat. No. 7,543,698, issued to Haskell on Jun. 9, 2009, and discloses an article elevator for moving lightweight open ended containers from a first level to a second level vertically spaced from the first level and is incorporated herein by reference in its entirety. The article elevator includes an input section at the first level for receiving container bodies. An elevator section is positioned for receiving container bodies from the input section. A discharge section is located at the second level for receiving container bodies from the elevator section. A plurality of arms is movably mounted above the input section, the elevator section, and the discharge section. Each of the arms moves a group of container bodies from the input section over the elevator section to the discharge section so that successive groups of container bodies are moved to the discharge section from the input section.

U.S. Pat. No. 3,910,405, issued to Couperus, et al. on Oct. 7, 1975, and discloses a belt elevator for elevating loose bulk material from one level to another. The belt elevator comprises a pair of cooperating endless belt conveyors whose forward runs are juxtaposed to face one another with an edge of one in sealing engagement with the other, the material being retained therebetween. A first belt conveyor is provided with raised edges which engage and seal with the edges of the other. The first conveyor is also provided with generally evenly spaced transversely positioned cleats or raised portions which, together with the raised edges, forms pockets to contain material being elevated. The stiffness of the first belt conveyor is greater than that of the second belt conveyor. The second belt conveyor is troughed at the entry portion for receiving the material to be elevated which material is discharged from the first belt conveyor at a discharge point at the higher level. The belts are maintained in tension to insure edge engagement and the retention of material therebetween. Couperus is incorporated herein by reference in its entirety.

Receiving hoppers and varying numbers of cleats may be used to convey loose material such as dirt, stones, etc. Additionally, the cleats may be about 20 to 30 inches apart in the direction of belt travel, or preferably 24 inches apart. In an alternate embodiment, the cleats may be about 50 to 70 inches apart in the direction of belt travel, or preferably 60 inches apart. If an article is conveyed, the cleats may be spaced apart between about 1.0 and about 2.0 times the length of the article conveyed, or preferably between about 1.25 and about 1.75 times the length of the article conveyed, or more preferably about 1.5 times the length of the article conveyed.

The conveyor may include handles and a dolly with wheels to promote movability of the conveyor. The handles can be any size, shape, or material known in the art. For example, the handles may be metal or metal with rubber coatings. The handles may be bar-like, round, or square. The dolly can contain one or more wheels and will have at least one leg or axel.

Different numbers of cleats or support elements can be used together to convey an article. Typically, the taller the cleat is, the fewer cleats need to be used. For example, one tall (8.0 inch) cleat can be used to convey an article, whereas two or three short (1.25 inch) cleats may be needed to convey an article.

U.S. Pat. Pub. No. 2007/0135960, to Shibao et al., discloses a production evaluation managing system in a factory including facilities in a plurality of production processes from materials to products and a means for evaluating the products based on at least one of inspection and testing characterized by comprising a network connecting the facilities in respective production processes with the evaluating means, and a means for collecting through the network field data of the facility in a production process pertaining to the production of a product corresponding to the information of evaluation results, based on the information of evaluation results of the products outputted from the evaluating means. By this, when a nonconformity is found from the information of evaluation results based on at least one of inspection and testing of the product, field data of the facility in a production process pertaining to production of a product corresponding to the information of evaluation results can be collected and analyzed immediately and the problem with the production process can be investigated immediately in a short time. Shibao is incorporated herein by reference in its entirety.

U.S. Pat. Pub. No. 2007/0289847 to Nakamura is incorporated herein by reference in its entirety and discloses a rubber member conveying device and a rubber member supplying system. The device and the system rapidly promote the shrinkage of the rubber member, thereby avoiding the length variation of the rubber member in the processing step for the rubber member. A rubber member supplying system comprises a belt conveyor which supplies a to-be-cut material having an internal strain, a cutter which cuts the to-be-cut material supplied by the belt conveyor to form a rubber member, and a rubber member conveying part which conveys the rubber members. The rubber member conveying part comprises an endless belt, and rollers supported by supporting parts that are provided at the endless belt. The rubber member is conveyed on the rollers while exposed to vibrations. Accordingly, the shrinkage in the rubber member caused by the internal strain thereof is substantially completed in the conveying operation.

U.S. Pat. No. 4,534,461, issued to Silverthorn, et al. on Aug. 13, 1985, and discloses a conveyor construction for conveying materials, such as grain, to an elevated location.

The conveyor construction comprises a base or supporting structure and an auger conveyor is mounted horizontally on the base. Grain is fed into a hopper at one end of the auger and the discharge end of the auger is provided with a pair of kicker paddles which propel the grain laterally into the lower end of a vertical endless belt conveyor. The endless belt conveyor includes a plurality of integrally molded cleats that convey the grain upwardly within a vertical passage in the conveyor housing and the grain is discharged from the upper end of the housing. The vertical conveyor is mounted for pivoting movement relative to the auger conveyor to adjust the angularity of the vertical conveyor. Silverthorn is incorporated herein by reference in its entirety.

U.S. Pat. No. 4,727,419, issued to Yamada, et al. on Feb. 23, 1988, and is incorporated herein by reference in its entirety. Yamada discloses a system in case of detecting tire information marks engraved in a side wall portion of tire in the form of protrusion or recess, width and inner diameter of tire are detected to provide a tire size signal, after a first camera head is driven into a given position in accordance with the tire side signal, an identification mark engraved in the size wall portion of tire is optically detected by the first camera head to derive a position signal, and after a second camera head is driven into a given position in accordance with the position signal, the tire information marks are optically detected by the second camera head to derive a tire information signal. In this manner, the tire information marks can be detected in a rapid and accurate manner.

U.S. Pat. No. 4,700,078, issued to Mizuno, et al. on Oct. 13, 1987, and discloses a method and system for detecting tire information marks. Tire information marks for denoting tire kind, tire size, etc. formed in a surface of side wall of a tire as a protrusion or groove having a triangular cross section are optically detected by illuminating the surface of side wall of the tire from a first direction substantially perpendicular to the surface of the side wall of the tire and a second direction inclined with respect to the surface of the side wall of the tire, and picking up an image of the surface of the side wall of the tire thus illuminated from the two different directions to derive an image signal. The image signal thus derived is converted into a bivalent signal, and is thinned to produce a mark pattern. Then the mark pattern is compared with a thick standard mark pattern. When a substantial part of the detected mark pattern is included in the standard mark pattern, the detected mark pattern is recognized to be identical with the standard mark pattern. Mizuno is incorporated herein by reference in its entirety.

U.S. Pat. No. 5,092,946, issued to Okuyama, et al. on Mar. 3, 1992, U.S. Pat. No. 5,415,217, issued to Okuyama, et al. on May 16, 1995, and U.S. Pat. No. 5,194,107, issued to Okuyama, et al. on Mar. 16, 1993. The Okuyama patents disclose a method and an apparatus for sticking a belt-like member, wherein a belt-like member prepared by cutting a raw material of the belt-like member on a conveyor at two front and rear locations, is conveyed by the conveyor, wrapped around a cylindrical drum and stuck to the drum. The inclination angle of the cut line at the leading end of the belt-like member is measured at the time of cutting, the inclination angle of the cut line at the trailing end is measured at the time of cutting, and by comparing the inclination of the cut line at the trailing end with the inclination angle at the leading end, an amount of connection for the inclination angle is calculated. The three Okuyama patents are incorporated by reference herein in their entireties.

In one embodiment, the conveyor comprises an endless conveyor belt having an outer article-conveying surface. The conveyor belt advances in a direction of belt travel along a conveying path that includes a steeply inclined portion. The conveying belt also includes support elements that extend outward from the outer article-conveying surface of the conveyor belt at periodically spaced positions and retention means are disposed along the steeply inclined portion proximate the support elements prevent conveyed articles from falling away from the conveyor belt on the steeply inclined portion.

In various embodiments, the conveyor system comprises an endless conveyor belt having an outer article-conveying surface. The conveyor belt advances in a direction of belt travel along a conveying path that includes a steeply inclined portion. The conveying belt further includes support elements that extend outward from the outer article-conveying surface of the conveyor belt. An article-restraining surface facing the article-conveying surface of the conveyor belt is positioned outward of the support elements across gaps along the steeply inclined portion of the conveying path. The article-restraining surface engages outwardly leaning conveyed articles moving upward on the steeply inclined portion of the conveying path in low-friction contact. The article-restraining surface may be the outer surface of a belt advancing in the direction of belt travel or the outer surfaces of an array of rollers rotating in the direction of belt travel on contact with outwardly leaning conveyed articles.

In one embodiment, the conveyor for conveying articles up inclines comprises: an endless conveyor belt having an outer article-conveying surface and advancing in a direction of belt travel along a conveying path including an inclined portion; a plurality of support elements extending outwardly from the outer article-conveying surface of the conveyor belt and spaced apart at an increment approximately equal to about 1.5 times a length of the article conveyed, where the plurality of support elements comprises pairs of two support elements and each support element in the pair is positioned proximate to the other support element in the pair and with a space between the two support elements, where each support element comprises: curved section having an article-supporting face, which is curved at a first radius of curvature and is positioned in the direction of belt travel, and a back side opposite the article-supporting face, the back side is curved with a second radius of curvature, where the first radius of curvature is smaller than the second radius of curvature; a block-like bottom section with a flat bottom that engages the outer article-conveying surface of the conveyor belt; and a top opposite the bottom, where the top is positioned at an angle relative to the flat bottom; two securing mechanisms for each support element to secure the support elements on the conveyor belt; a support frame with a support stand positioned proximate to a floor surface and support bars; a drive pulley interconnected to the support frame and positioned at the bottom of the support frame, where an underside of the conveyor belt engages an outer surface of the drive pulley; a tail pulley interconnected to the support frame and positioned at the top of the support frame, where an underside of the conveyor belt engages an outer surface of the tail pulley; and a motor for moving the conveyor belt around the drive pulley and tail pulley.

In a further embodiment, a first support element in one pair of support elements has an article-supporting face defining a first plane oblique to the direction of belt travel and a second support element in the pair of support elements has an article-supporting face defining a second plane oblique to the direction of belt travel. The first plane and the second plane intersect at a point on the conveyor belt below the first support element and the second support element. In another embodiment, the support elements are contoured in shape to mate with the conveyed article. In one embodiment, the support elements are made of an elastomeric material that conforms to the shape of a conveyed article on the inclined portion of the conveying path. In additional embodiments, the conveyor further comprising a retention mechanism for preventing the conveyed articles from falling off of the conveyor belt, said retention mechanism positioned along the inclined portion of the conveying path. The conveyor may alternatively comprise an article-restraining surface positioned above and facing the article-conveying surface of the conveyor belt, where the article-restraining surface is spaced away from the support elements, and where the article-restraining surface engages outwardly leaning conveyed articles moving upward on the inclined portion of the conveying path in low-friction contact. In one embodiment, the inclined portion of the conveying path is approximately 60 degrees as measured from a horizontal plane. In some embodiments, the inclined portion of the conveying path is approximately 90 degrees as measured from a horizontal plane. The conveyor may be positioned at an inclined angle relative to the horizontal ground, i.e., between about 5° and 85° or the conveyor can be substantially vertical, i.e., about 90° relative to the horizontal ground. In some embodiments, the conveyor may be positioned at an inclined angle relative to the horizontal ground, i.e., between about 5° and substantially vertical or about 85° to 95° or the conveyor can be relative to the horizontal ground.

One embodiment of a tire conveyor for conveying tires up an incline comprises: an endless conveyor belt having a lateral extent and a longitudinal extent, and an outer tire-conveying surface that is designed to advance in a direction of belt travel along a conveying path including an inclined portion; a first pair of first and second tire support elements, with each of said first and second tire support element having a same width (w), length (l) and height (h), with said first tire support element spaced a distance along said lateral extent of said conveyor belt from said second tire support element by at least twice the width, where said pair of first and second tire support elements are each interconnected to said outer tire-conveying surface by two independent fasteners that penetrate through said outer tire-conveying surface, said first tire support element being fastened to said outer tire-conveying surface at a first angle with respect to said lateral extent of said conveyor belt, and said second tire support element being fastened to said outer tire-conveying surface at a second angle with respect to said lateral extent of said conveyor belt, said first angle and said second angle being commensurate and opposite each other, where when a tire is placed in contact with said first and second tire support elements, the first tire support element is between a 4 o'clock and 5 o'clock position of the tire and the second tire support element is between a 7 o'clock and 8 o'clock position of the tire, where each of said first and second tire support elements has a front section having an tire-supporting face that has a first curve that is curved along its length and toward the direction of belt travel and a back section that has a second curve that is curved along its length and in the direction of belt travel, said second curve being greater than said first curve, each of said pair of tire engaging support elements having a flat conveyor contacting surface that engages the outer tire-conveying surface of the conveyor belt, each of said tire support elements constructed entirely from an elastomeric material that provides flexibility along said length of said tire support elements such that when a tire is positioned on said conveyor belt, said first and second tire support elements bend in a direction opposite the direction of belt travel along a conveying path; a second pair of first and second tire support elements spaced apart from said first pair of tire support elements by at least a distance of 1.5 times a length of a tire conveyed on said conveyor belt; a support frame with a support stand, said support frame having two, longitudinally extending side bar supports extending parallel to each other and connected to each other by a plurality of support struts; a drive pulley operably connected to said support frame that engages said conveyor belt; a tail pulley operably connected to said support frame that engages said conveyor belt; and a motor operably connected to said drive pulley.

The tire conveyor may further comprise a tire-restraining mechanism interconnected to the support frame and positioned above and facing the tire-conveying surface of the conveyor belt, where the tire-restraining mechanism comprises at least one bar arranged in the direction of belt travel and at least two bars positioned perpendicular to the direction of belt travel, where the tire-restraining surface is spaced away from the support elements, and where the tire-restraining surface engages outwardly leaning conveyed tires moving upward on the inclined portion of the conveying path. In some embodiments, the tire conveyor comprises an array of rollers having outer surfaces forming the tire-restraining surface facing the tire-conveying surface, where the rollers are arranged to rotate in the direction of belt travel on contact with outwardly leaning conveyed tires. In additional embodiments, the tire conveyor further comprises a tire sorting apparatus comprising: a mount, where the mount positions a tire in a plane perpendicular to the center axis of the tire; a tire grip, where the tire grip grips the inner periphery of the tire and positions the center axis of the tire; an ID reader, where the ID reader reads a tire identification marking formed on the surface of the tire; and a holder, where the holder holds the ID reader, where the tire grip further includes three grip arms arranged at the vertexes of a triangle within a plane perpendicular to the center axis of the tire, where the holder further includes a holding unit for holding the ID reader, and a rotation drive unit for rotating the holder around a rotation axis parallel to the center axis of the tire, and where the center of the circumscribing circle is aligned with the rotation axis of the holding unit. Still further, the conveyor may comprise an apparatus for loading the tire onto a rack, the apparatus comprising: a first scanner configured to provide information regarding said tire; a tire conveyor configured to transport said tire; a robot configured to automatically move the tire from the tire conveyor onto the rack; and a computer configured to control the robot using the information from the first scanner.

In one embodiment, the conveyor for conveying articles up inclines comprises: an endless conveyor belt having an outer article-conveying surface and advancing in a direction of belt travel along a conveying path including an inclined portion; a plurality of support elements extending outwardly from the outer article-conveying surface of the conveyor belt and spaced apart at a predetermined distance, wherein the plurality of support elements comprises groups of two or more support elements and each support element in the group is positioned proximate to the other support elements in the group and with a space between each support element in the group, wherein each support element comprises: a upright section having an upper portion and an article-supporting face generally positioned in the direction of belt travel; a block-like bottom section with at least one hole and a curved bottom having a first radius of curvature, wherein the curved bottom engages the outer article-conveying surface of the conveyor belt; and a top positioned at the upper portion of the upright section and opposite the bottom, wherein the top has a curved surface having a second radius of curvature, wherein the second radius of curvature is different than the first radius of curvature; at least one securing mechanism for each support element to secure the support elements on the conveyor belt, wherein a portion of the securing mechanism is positioned in the hole of the block-like bottom section of the support element; a gasket positioned between a bottom portion of the securing mechanism and the conveyor belt; a support frame with a support stand positioned proximate to a floor surface and support bars; a drive pulley interconnected to the support frame and positioned at the bottom of the support frame, wherein an underside of the conveyor belt engages an outer surface of the drive pulley; and a tail pulley interconnected to the support frame and positioned at the top of the support frame, wherein an underside of the conveyor belt engages an outer surface of the tail pulley.

In one embodiment, a conveyor for conveying articles up inclines is provided, the conveyor comprising: an endless conveyor belt having an outer article-conveying surface and advancing in a direction of belt travel along a conveying path including an inclined portion; a plurality of support elements extending outwardly from the outer article-conveying surface of the conveyor belt and spaced apart at least a distance between about 1.0 and 2.0 times a length of the article conveyed on said conveyor belt, wherein each support element In further embodiments of the conveyor, the conveyor includes a motor for moving the conveyor belt around the drive pulley and tail pulley. Additionally, the predetermined distance is approximately equal to between about 1.25 and 1.75 times a length of the article conveyed. In some embodiments, the article is a loose material that is granular based. Further, the predetermined distance is approximately equal to between about 50 inches and 70 inches. In one embodiment, the article-supporting face of the support elements is curved at a third radius of curvature, wherein the upright section further comprises a back side opposite the article-supporting face, said back side is curved with a fourth radius of curvature, and wherein the third radius of curvature is smaller than the fourth radius of curvature. In some embodiments, a first support element in the two or more support elements has an article-supporting face defining a first plane oblique to the direction of belt travel and a second support element in the two or more support elements has an article-supporting face defining a second plane oblique to the direction of belt travel, wherein the first plane and the second plane intersect at a point on the conveyor belt below the first support element and the second support element. In additional embodiments, a third support element in the two or more support elements has an article-supporting face defining a third plane substantially perpendicular to the direction of belt travel. In alternative embodiments, the support elements are made of an elastomeric material that conforms to the shape of a conveyed article on the inclined portion of the conveying path.

In still further embodiments, the inclined portion of the conveying path is approximately 90 degrees as measured from a horizontal plane. In some embodiments, the support frame comprises a substantially vertical portion connected on a top end to a curved portion, which is connected to a horizontal portion, and/or the conveyor further comprises a solid belt-carrying anti-friction surface positioned at the curved portion of the support frame. In some embodiments, the conveyor further comprises four separate return wheels to carry the conveyor belt over a return curved portion and back to a bottom of the support frame.

In one embodiment of a conveyor for conveying articles up inclines, the conveyor comprises: an endless conveyor belt having an outer article-conveying surface and advancing in a direction of belt travel along a conveying path including an inclined portion; a plurality of support elements extending outwardly from the outer article-conveying surface of the conveyor belt and spaced apart at least a distance between about 1.25 and 1.75 times a length of the article conveyed on said conveyor belt, wherein each support element comprises: a upright section having an upper portion and an article-supporting face generally positioned in the direction of belt travel; a block-like bottom section with at least one hole and a curved bottom having a first radius of curvature, wherein the curved bottom engages the outer article-conveying surface of the conveyor belt; and a top positioned at the upper portion of the upright section and opposite the bottom, wherein the top has a curved surface having a second radius of curvature, wherein the second radius of curvature is different than the first radius of curvature; at least one securing mechanism for each support element to secure the support elements on the conveyor belt, wherein a portion of the securing mechanism is positioned in the hole of the block-like bottom section of the support element; a gasket positioned between a bottom portion of the securing mechanism and the conveyor belt; a support frame with a support stand positioned proximate to a floor surface and support bars; one or more handles extending outwardly from at least one of a lower portion of the support frame and an upper portion of the support frame; a drive pulley interconnected to the support frame and positioned at the bottom of the support frame, wherein an underside of the conveyor belt engages an outer surface of the drive pulley; and a tail pulley interconnected to the support frame and positioned at the top of the support frame, wherein an underside of the conveyor belt engages an outer surface of the tail pulley.

In additional embodiments, the inclined portion of the conveying path is approximately 60 degrees as measured from a horizontal plane. Additionally, the plurality of support elements comprises a first support element extending horizontally across the belt and perpendicular to the direction of belt travel and spaced apart from a second support element extending horizontally across the belt and perpendicular to the direction of belt travel. In some embodiments, the conveyor further comprises a receiving hopper at a lower portion of the conveyor, the receiving hopper comprising at least three sides forming a funnel-like shape. In one embodiment, the plurality of support elements are made of an elastomeric material that conforms to the shape of a conveyed article on the inclined portion of the conveying path.

One embodiment of a method for conveying articles up steep inclines is provided, the method comprising: providing a conveyor for conveying articles up an incline, said conveyor comprising: an endless conveyor belt having a lateral extent and a longitudinal extent, and an outer article-conveying surface that is designed to advance in a direction of belt travel along a conveying path including an inclined portion; a plurality of support elements, with each support element having a same width (w), length (l), and height (h), where each support element of said plurality of support elements is interconnected to said outer conveying surface by two independent fasteners that penetrate through said outer article-conveying surface, where each of said support elements has a front section having an article-supporting face that oriented in the direction of belt travel, each of said support elements having a flat conveyor contacting surface that engages the outer article-conveying surface of the conveyor belt, each of said support elements constructed of urethane material that provides strength along the supporting elements such that when a conveyed article is positioned on said conveyor belt, said first and second supporting elements, where a second support element in the plurality of support elements is spaced apart from a first support element in the plurality of support elements by at least a distance of 1.5 times a length of an article conveyed on said conveyor belt; a support frame with a support stand, said support frame having two, longitudinally extending side bar supports extending parallel to each other and connected to each other by a plurality of support struts; a drive pulley operably connected to said support frame that engages said conveyor belt; a tail pulley operably connected to said support frame that engages said conveyor belt; and a motor operably connected to said drive pulley; moving said endless conveyor belt in the direction of belt travel using the motor, the drive pulley, and the tail pulley; conveying articles on the outer article-conveying surface of the conveyor belt; advancing the conveyed articles in the direction of belt travel along a conveying path including the inclined portion; blocking conveyed articles from sliding down the conveying surface of the conveyor belt on the inclined portion by using said plurality of support elements; and removing the conveyed articles from the conveyor belt.

The method may, in some embodiments, further comprise sorting the conveyed articles using a sorting apparatus; and depending on the sorting step, loading a first type of conveyed article onto the conveyor belt. Additionally, the method comprises a method of unloading conveyed articles from a rack, the method comprising: moving the conveyed articles from the rack to the sorting apparatus; reading identification information on the conveyed articles using a computer-controlled vision system; removing the conveyed articles from the conveyor belt using a robot, where the identification information facilitates control of the second robot; and placing the conveyed articles in one of a loader and a storage structure.

In one embodiment of a method for conveying articles up steep inclines, the method comprises: providing a conveyor for conveying articles up an incline, said conveyor comprising: an endless conveyor belt having a lateral extent and a longitudinal extent, and an outer article-conveying surface that is designed to advance in a direction of belt travel along a conveying path including an inclined portion; a plurality of support elements, with each support element having a same width (w), length (l), and height (h), wherein each support element of said plurality of support elements is interconnected to said outer conveying surface by two independent fasteners that penetrate through said outer article-conveying surface, wherein each of said support elements has a front section having an article-supporting face that is oriented in the direction of belt travel, each of said support elements having a conveyor contacting surface that engages the outer article-conveying surface of the conveyor belt, each of said support elements constructed of urethane material that provides strength along the supporting elements, wherein a second support element in the plurality of support elements is spaced apart from a first support element in the plurality of support elements by a predetermined distance; a support frame with a support stand, said support frame having two, longitudinally extending side bar supports extending parallel to each other and connected to each other by a plurality of support struts; at least one handle extending from a lower portion of said support frame; at least one handle extending from an upper portion of said support frame; at least one pulley operably connected to said support frame that engages said conveyor belt; a motor operably connected to said at least one pulley; moving said endless conveyor belt in the direction of belt travel using the motor, the drive pulley, and the tail pulley; conveying articles on the outer article-conveying surface of the conveyor belt; advancing the conveyed articles in the direction of belt travel along a conveying path including the inclined portion; blocking conveyed articles from sliding down the conveying surface of the conveyor belt on the inclined portion by using said plurality of support elements; and removing the conveyed articles from the conveyor belt.

In further embodiments, the predetermined distance is between about 1.25 and 1.75 times a length of an article conveyed on said conveyor belt. The method can further comprise sorting the conveyed articles using a sorting apparatus; and depending on the sorting step, loading a first type of conveyed article onto the conveyor belt. Additionally, the method can include moving the conveyed articles from the rack to the sorting apparatus; reading identification information on the conveyed articles using a computer-controlled vision system; removing the conveyed articles from the conveyor belt using a robot, wherein the identification information facilitates control of the second robot; and placing the conveyed articles in one of a loader and a storage structure. In some embodiments, the conveyor contacting surface of said support elements has a curved shape with a first radius of curvature. In one embodiment, the conveyed articles are tires.

In some embodiments, the predetermined distance is between about 1.25 and 1.75 times a length of an article conveyed on said conveyor belt. In various embodiments, the conveyed articles are tires and/or the inclined portion of the conveying path is approximately 90 degrees as measured from a horizontal plane.

A portable conveyor system for conveying articles up inclines according to at least one embodiment of the present disclosure comprises a conveyor comprising: a conveyor frame; a first pin disposed at an end of the conveyor frame; a pair of pulleys disposed at opposite ends of the conveyor frame; a belt configured to revolve around the two pulleys; and at least one cleat disposed on an outer surface of the belt and configured to receive and move an object along the conveyor frame; a support arm having two frame members disposed opposite each other and a pair of brackets at the end of each of the two frame members, the support arm including a second pin and a third pin, the second pin received by one of the pair of brackets and the third pin received by another of the pair of brackets, wherein the third pin pivotably connects the support arm to the conveyor frame; and a portable base having a frame, at least one wheel secured to the frame, a first pair of brackets secured to the frame and a second pair of brackets secured to the frame and opposite the first pair of brackets, the first pair of brackets configured to receive the first pin thereby pivotably coupling the conveyor to the portable base and the second pair of brackets configured to receive the second pin thereby pivotably connecting the support arm to the base.

In some embodiments, the at least one wheel is rotatable 360 degrees. In various embodiments the frame of the base comprises at least one hollow tube configured to receive a fork of a forklift. In some embodiments, the conveyor and the support arm are each configured to move between a first position and a second position. In some embodiments, wherein the support arm is substantially parallel to the conveyor frame and the conveyor frame is substantially parallel to the portable base when in the second position. In various embodiments, the second pin is unconnected from the base when the support arm is in the second position. In some embodiments, wherein the third pin pivotably couples the support arm to the conveyor frame near a mid-section of the conveyor frame.

A method for moving a portable conveyor system according to at least one embodiment comprises: removing a portable conveyor system from a shipping container, the portable conveyor system in a second position, the portable conveyor system having a conveyor, a support arm, and a portable base, the conveyor comprising a conveyor frame; a first pin disposed at an end of the conveyor frame; a pair of pulleys disposed at opposite ends of the conveyor frame; a belt configured to revolve around the two pulleys; and at least one cleat disposed on an outer surface of the belt and configured to receive and move an object along the conveyor frame; the support arm comprising two frame members disposed opposite each other and a pair of brackets at the end of each of the two frame members, the support arm including a second pin and a third pin, the second pin received by one of the pair of brackets and the third pin received by another of the pair of brackets, wherein the third pin pivotably connects the support arm to the conveyor frame; and the portable base comprising a frame, at least one wheel secured to the frame, a first pair of brackets secured to the frame and a second pair of brackets secured to the frame and opposite the first pair of brackets, the first pair of brackets configured to receive the first pin thereby pivotably coupling the conveyor to the portable base and the second pair of brackets; locking the at least one wheel to prevent movement of the base; lifting the conveyor, thereby pivoting the conveyor upwards from the base at the first pin and causing the support arm to pivot downwards from the conveyor at the third pin; removing the second pin; aligning the second pair of brackets and one of the pair of brackets of the frame members; inserting the second pin through the second pair of brackets and the one of the pair of brackets of the frame members; and securing the second pin to secure the portable conveyor system in a first position.

In some embodiments, the pin is securing using one or more cotter pins. In some embodiments, the at least one wheel is rotatable 360 degrees. In some embodiments, the frame of the base comprises at least one hollow tube configured to receive a fork of a forklift. In various embodiments, the support arm is substantially parallel to the conveyor frame and the conveyor frame is substantially parallel to the portable base when in the second position. In some embodiments, the second pin is unconnected from the base when the support arm is in the second position. In various embodiments, the third pin pivotably couples the support arm to the conveyor frame near a mid-section of the conveyor frame.

A portable stand according to at least one disclosure of the present embodiment comprises: a support arm having two frame members disposed opposite each other and a pair of brackets at the end of each of the two frame members, the support arm including a second pin and a third pin, the second pin received by one of the pair of brackets and the third pin received by another of the pair of brackets, wherein the third pin pivotably connects the support arm to a conveyor frame of a conveyor; and a portable base having a frame, at least one wheel secured to the frame, a first pair of brackets secured to the frame and a second pair of brackets secured to the frame and opposite the first pair of brackets, the first pair of brackets configured to receive the first pin thereby pivotably coupling a conveyor to the portable base and the second pair of brackets configured to receive the second pin thereby pivotably connecting the support arm to the base.

In various embodiments, the at least one wheel is rotatable 360 degrees. In some embodiments, the frame of the base comprises at least one hollow tube configured to receive a fork of a forklift. In some embodiments, the support arm is configured to move between a first position and a second position. In various embodiments, the support arm is substantially parallel to a conveyor frame when in the second position. In some embodiments, the second pin is unconnected from the base when the support arm is in the second position. In various embodiments, the third pin pivotably couples the support arm to a conveyor frame near a mid-section of a conveyor frame.

While various configurations of the conveyor are herein specified, this description is only exemplary and is not intended to limit or otherwise narrow the invention. The conveyor may include any number of components in any potential combination thereof as desired for achieving the desired function for desired article shape and size and incline.

One or ordinary skill in the art will appreciate that embodiments of the present invention may be constructed of materials known to provide, or predictably manufactured to provide the various aspects of the present invention. For example, materials used in the support structure of the conveyor may include, for example, metal, composites, plastics, and other synthetic and natural materials. Further, the belt of the conveyor may be comprised of rubber, latex, synthetic rubber, synthetic materials, polymers, and natural materials.

As used herein, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The phrases "device", "apparatus", "conveyor", "conveyor apparatus", and "conveyor device" are used herein to indicate the invention device.

The phrase "removably attached", "removable", and/or "detachable" is used herein to indicate an attachment or connection of any sort that is readily releasable or disconnected.

This Summary of the Invention is neither intended nor should it be construed as being representative of the full extent and scope of the present invention. The present invention is set forth in various levels of detail in the Summary of the Invention as well as in the attached drawings and the Detailed Description, and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the claims set forth herein, taken in conjunction with this Summary of the Invention, define the invention.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the disclosure given above and the Detailed Description of the drawings given below, serve to explain the principles of the disclosures.

FIG. 6 is an exploded view of the embodiment of the conveyor shown in FIG. 3;

FIG. 7 is a perspective view of a section of a belt with cleats;

FIGS. 21A-D show various views of a sixth embodiment of a cleat

FIGS. 22A-D show various views of a seventh embodiment of a cleat

FIGS. 23A-D show various views of a eighth embodiment of a cleat

FIGS. 24A-D show various views of a ninth embodiment of a cleat

FIGS. 39A-B show the idle end of a conveyor (without the belt) according to embodiments of the present invention;

FIG. 45 shows the top end of the nose-over vertical tire conveyor of FIGS. 43A-44 without the belt;

FIG. 46 shows the bottom end of the nose-over vertical tire conveyor of FIGS. 43A-44 without the belt;

FIGS. 50A-D show an embodiment of a cleat for a vertical tire conveyor according to embodiments of the present invention;

FIG. 55A is a front perspective view of the conveyor of FIG. 52 shown without the conveyor belt;

FIG. 55B is a zoomed in view of the upper or top end of the conveyor of FIG. 55A;

FIG. 56 is a front perspective view of the conveyor of FIG. 55A shown with the solid belt-carrying anti-friction surface removed to show the belt return carrying surface;

FIGS. 57A-B are rear perspective views of the conveyor of FIG. 53 shown without the conveyor belt such that the mechanism by which the belt returns inside the conveyor frame can be seen;

FIGS. 58A-B show the standalone return wheel assembly;

FIG. 59 shows a belt tracking aid, also called a belt liner;

FIG. 61A is front perspective view of a conveyor on a portable stand in a first position according to at least one embodiment of the present disclosure;

FIG. 61B is another front perspective view of the conveyor on the portable stand of FIG. 61A;

FIG. 62A is a front perspective view of the conveyor on the portable stand of FIG. 61A in a second position;

FIG. 62B is a side view of the conveyor on the portable stand of FIG. 61A in the second position;

FIG. 63A is a front perspective view of the portable stand of FIG. 61A; and

FIG. 63B is a side view of the portable stand of FIG. 61A.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The invention described herein relates to a conveyor used in any application where an article (such as a tire) may need to be transported or lifted more than five feet. Such applications include moving tires and articles during manufacture, after manufacture to be shipped, loading tires and articles on the shipping vessels, unloading the tires and articles off of the shipping vessels, and moving the tires and articles within stores and warehouses to their final storage place.

It should be appreciated that the particular implementations and embodiments shown and described herein are illustrative of the invention and are not intended to otherwise limit the scope of the present invention in any way. Indeed, for the sake of brevity, trivial and conventional features and aspects of the present invention are not described in extensive detail herein. It should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Furthermore, the connecting lines shown in the various figures shown herein are intended to represent exemplary functional relationships and/or physical couplings between the various elements of the system. It should be noted that many alternative or additional functional relationships or physical connections may be present in a practical conveyor apparatus, conveying system, conveying method, tire sorting system, and tire loading system.

Figure 1:
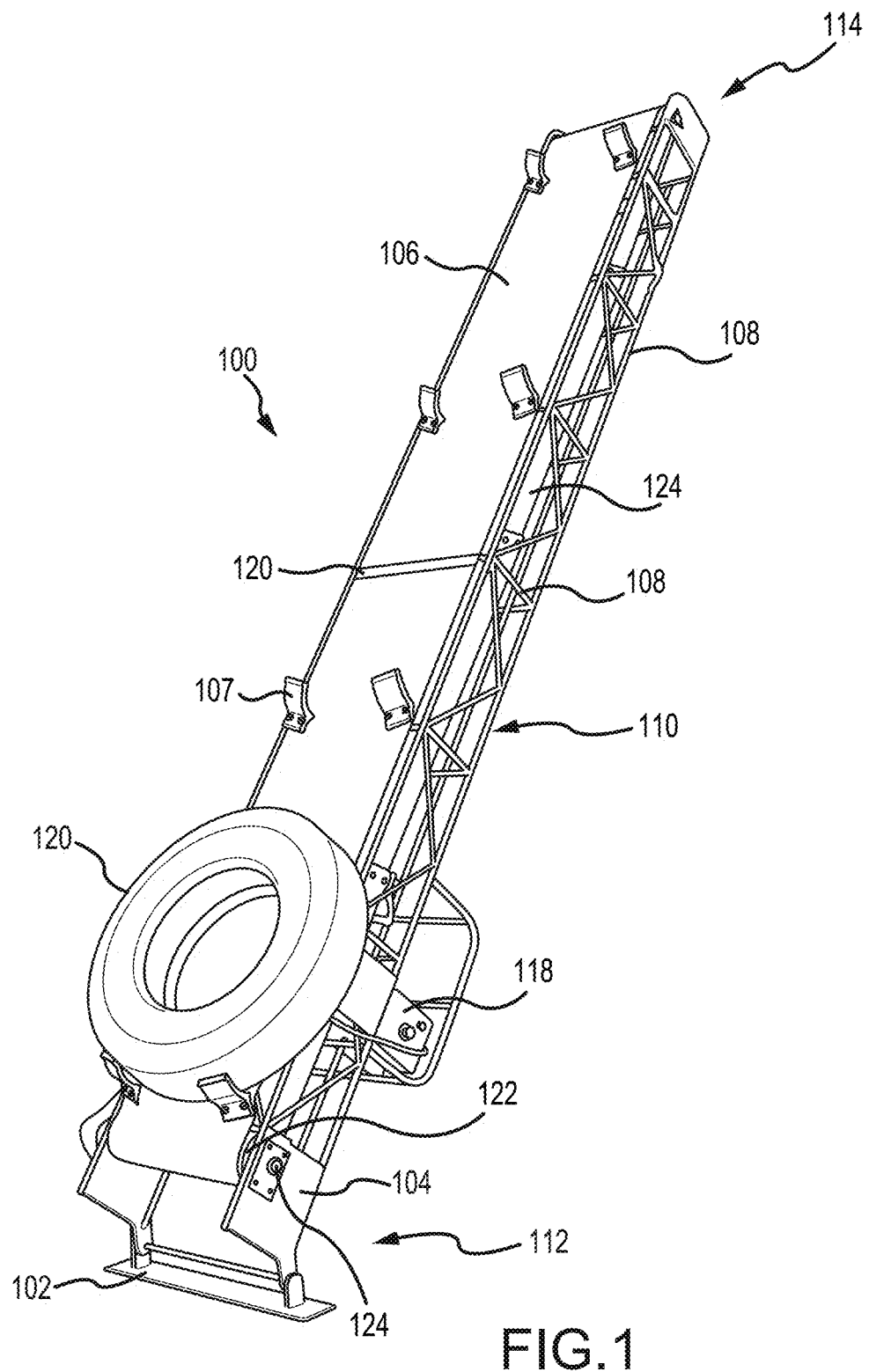
FIG. 1 is a perspective view of an embodiment of a tire conveyor.

Referring now to FIG. 1, an embodiment of the conveyor 100 of the present invention is shown. The embodiment of the conveyor 100 shown in FIG. 1 may convey tires 120 and comprise a belt 106, rounded cleats 107, an electrical box 118, and a support frame 110. The support frame 110 may comprise a support stand 102, side panels 104, support bars 108, a drive pulley 122 interconnected to the support frame 110 at a point with a pin or other connecting mechanism 124, a tail pulley, and a side plate 124. The conveyor 100 has a lower end 112, and an upper end 114. The support stand 102 and side panels 104 may be any metal material. In other embodiments, the support stand 102 and side panels 104 may be composites or durable plastics. The tires 120 may be any tire of any shape or size. The belt 106 may have one or more seams 120.

In some embodiments, the support stand 102 may be replaceable and may be replaced with various support stands or wheels to move the conveyor from location to location. The support stand 102 may also be secured to the ground or to a floor surface to prevent movement of the conveyor 100.

Figure 2:
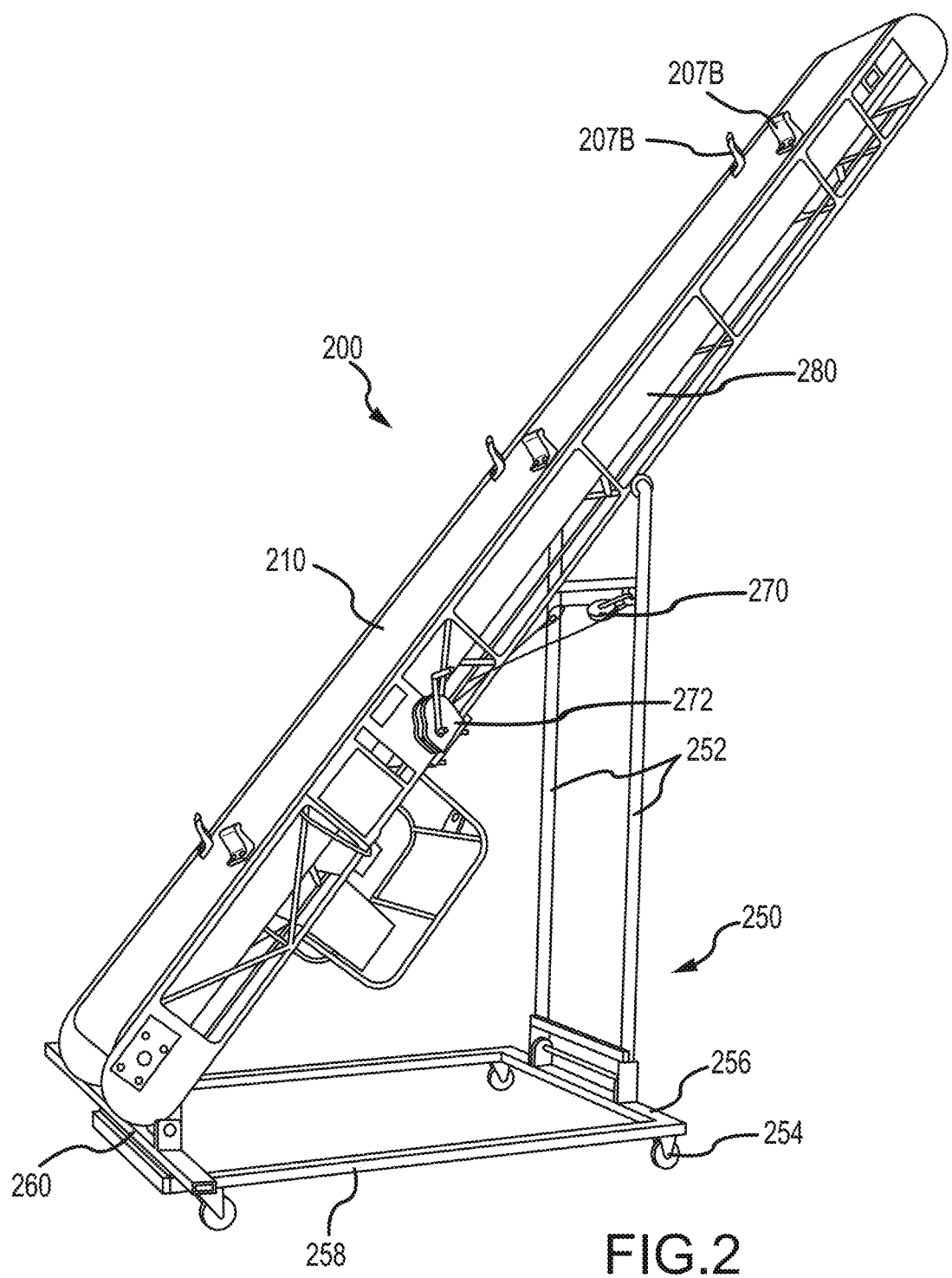
FIG. 2 is a perspective view of an embodiment of a moveable elevating belt conveyor.

FIG. 2 shows an embodiment of an elevating belt conveyor 200. The conveyor 200 may comprise cleats 207A, 207B, a belt 210, and a stand 250 with wheels 254. The stand 250 may comprise rear tall support bars 252, a rear horizontal support bar 256, side horizontal support bars 258, a front horizontal support bar 260, and wheels 254. In various embodiments, the stand 250 may be configured in ways other than that shown in FIG. 2. One skilled in the art will contemplate other configurations known now or in the future.

In various embodiments, the stand 250 may have wheels 254. In other embodiments, the stand may not have wheels 254. Further, the stand 250 may be removable and the conveyor may be secured to the ground or floor to prevent movement. In some embodiments, the wheels are detachable to prevent movement of the conveyor. Alternatively or additionally, the wheels may be lockable to prevent movement of the conveyor.

The conveyor 200 may also comprise a pulley 270, a crankshaft 272 or other means for tightening the pulley 270 and/or the belt 210. In some embodiments the underside 280 of the belt may be visible. The side of the conveyor 200 may have a side support or shield. The pulley 270 may be a plain idler pulley with a belt tensioner 272. The lower pulley 122 may also be a drive pulley for a rubber lagged conveyor belt. The electrical system may comprise an electrical box 218 with a motor. The motor may have a thermal overload motor protector to protect the motor from overheating.

Figure 3:
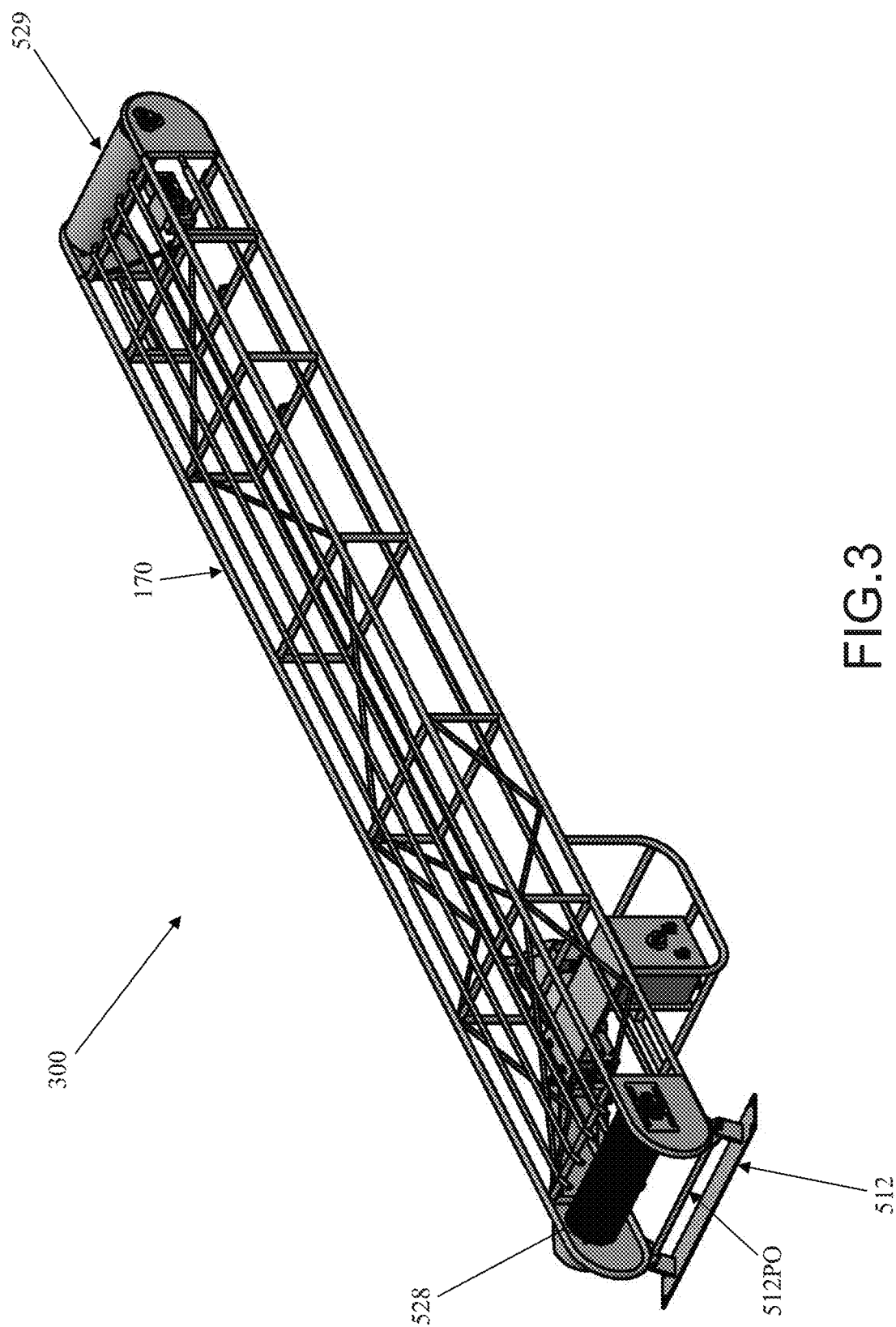
FIG. 3 is a perspective view of an embodiment of a conveyor.
Figure 4:
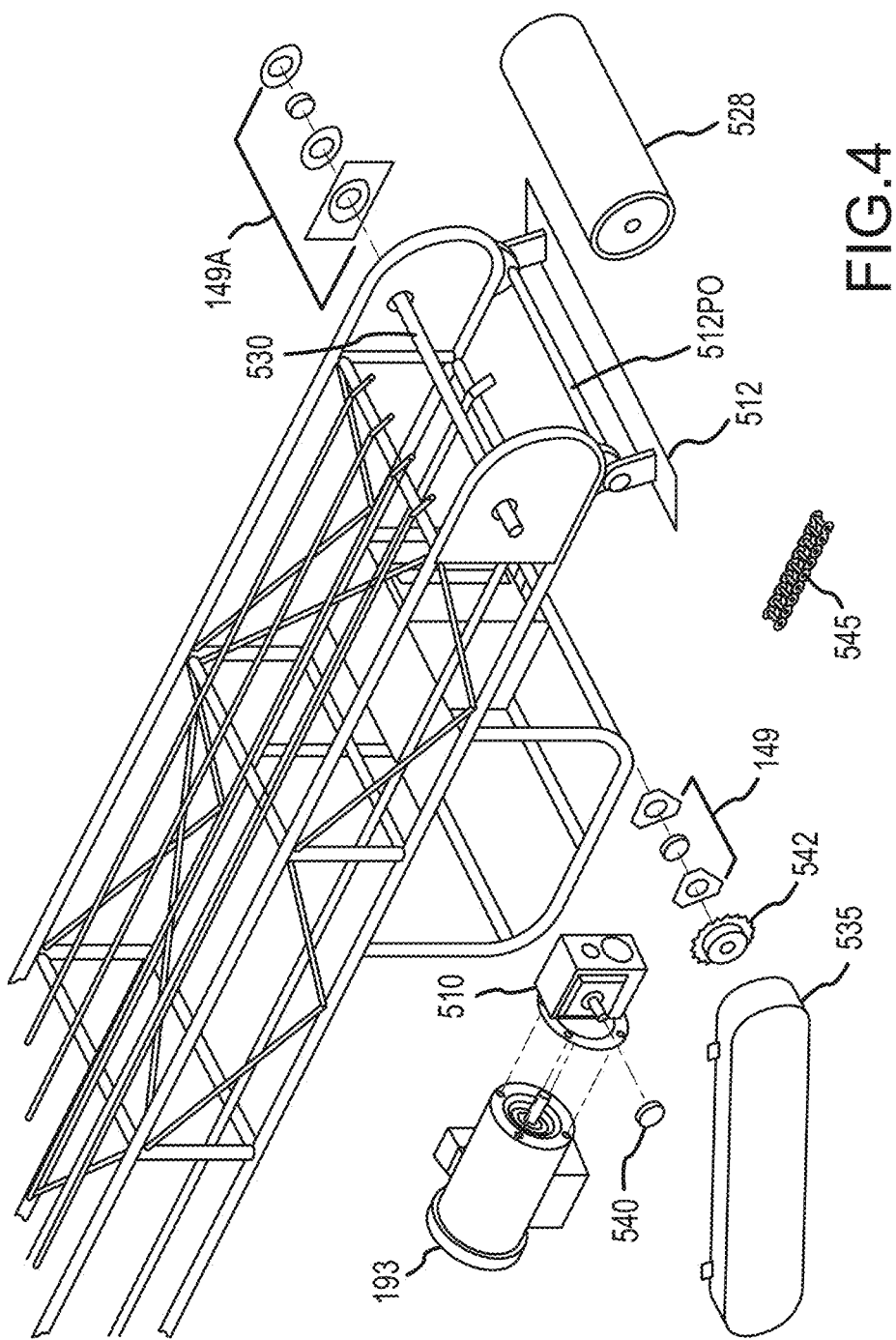
FIG. 4 is an exploded view of the lower end of the conveyor shown in FIG. 3.
Figure 5:
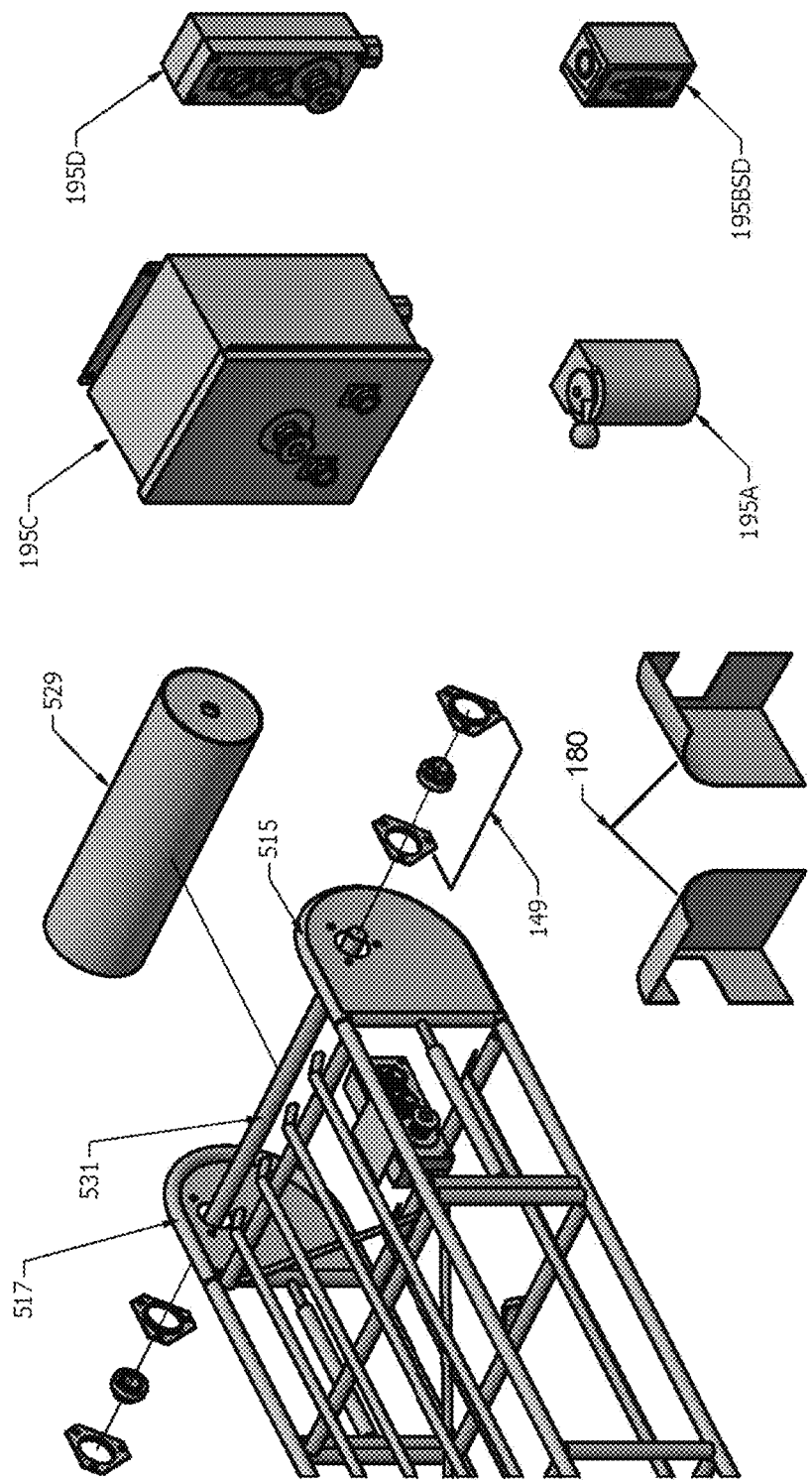
FIG. 5 is an exploded view of the upper end of the embodiment of the conveyor shown in FIG. 3.

Referring now to FIGS. 3-7, different components of an embodiment of a conveyor are shown. FIG. 3 is a perspective view of an embodiment of a conveyor 300. FIG. 4 is an exploded view of the lower end of the embodiment of the conveyor shown in FIG. 3. FIG. 5 is an exploded view of the upper end of the embodiment of the conveyor shown in FIG. 3. FIG. 6 is an exploded view of the embodiment of the conveyor shown in FIG. 3. FIG. 7 is a perspective view of a section of a belt with cleats.

FIG. 3 shows a conveyor 300 with the conveyor belt removed to show other components. In some embodiments the conveyor belt is also included. The conveyor 300 may comprise side bars 170, a tail pulley 529, a drive pulley 528, a base plate 512 with a pin, and pin only hardware 512PO.

The lower end of the conveyor 300 is shown in FIG. 4. The lower end of the conveyor 300 may comprise a bearing with 3-hole triangular flangettes 149A, a motor 193, a speed reducer 510, abase plate 512, a drive pulley 528, a drive shaft 530, a chain guard 535, a 12 tooth sprocket 540, a 30 tooth sprocket 542, and a section of roller chain 545.

The bearing with 3-hole triangular flangettes 149A may comprise a 1" bearing. In one embodiment, the motor 193 may be a 1 hp 115V 56C TEFC motor. In one embodiment, speed reducer 510 may include a ⅞" O.D. shaft. In one embodiment, base plate 512 may include a pin and pin only hardware 512PO. In an embodiment, the drive pulley 528 may include a 1" bore. In an embodiment, the drive shaft 530 may include a 1" O.D. In one embodiment, the 12 tooth sprocket 540 may include a ⅞" bore. In one embodiment, the 30 tooth sprocket 542 may include a 1" bore. In an embodiment, the section of roller chain 545 may be #40 roller chain (137 pitches+connecting link).

The upper end of the conveyor 300 is shown in FIG. 5. The upper end of the conveyor 300 may comprise a bearing with 3-hole triangular flangettes 149, a take-up frame 515 with a screw (right hand side), a take-up frame 517 with a screw (left hand side), a tail pulley 529, a tail shaft 531, a forward/reverse drum switch 195A, an ON/OFF motor rated toggle switch 195BSD, a main E-stop starter station 195C, a remote E-stop station 195D, an E-stop switch (Red), a reverse switch (black), a forward switch (green), and a set of (2) nose wings 180 with hardware.

In some embodiments, the bearing with 3-hole triangular flangettes 149 may be a 1" bearing. In an embodiment, the tail pulley 529 may comprise a 1" bore. In an embodiment, the tail shaft 531 may comprise a 1" O.D. (outside diameter).

The conveyor 300 is shown in FIG. 6. FIG. 7 shows a piece of the belt 505 with cleats 507A, 507B. In an embodiment, the belt 505 may be about 18" wide and about ⅟₃₂" thick. Further, there may be a set of two bolts on each cleat. In embodiments, the cleats may be a set of two cleats where one cleat 507A is the right hand side cleat with hardware and the other cleat 507B is the left hand side cleat with hardware. Further, the belt 505 may comprise a set of #20×18" long hammer-on lacing 524 or a set of #RS125×18" long staple lacing 526.

Figure 8:
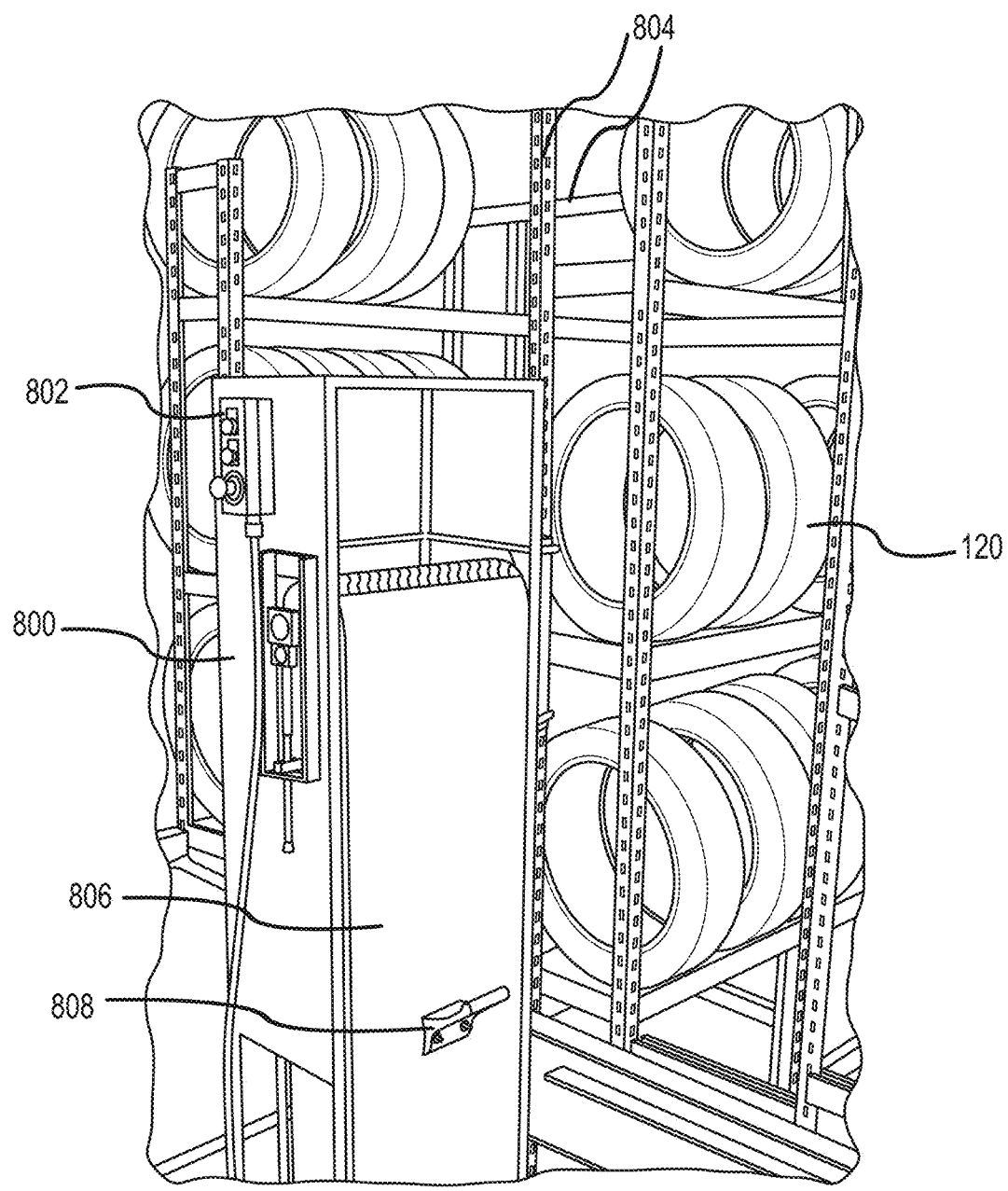
FIG. 8 is a perspective view of a vertical conveyor.

FIG. 8 shows a perspective view of a vertical conveyor 800 comprising a control switch 802 to turn the conveyor 800 on and off, a belt 806, and a cleat or supporting element 808. One embodiment of a tire rack 804 for holding tires 120 is also shown in FIG. 8. The vertical conveyor 800 conveys tires 120 or other articles upward to high levels or high shelves of the rack 804 and conveys tires 120 downward from high levels or shelves of the rack 804 to the ground for use or transport. The conveyor 800 conveys items in a substantially vertical direction.

Figure 9:
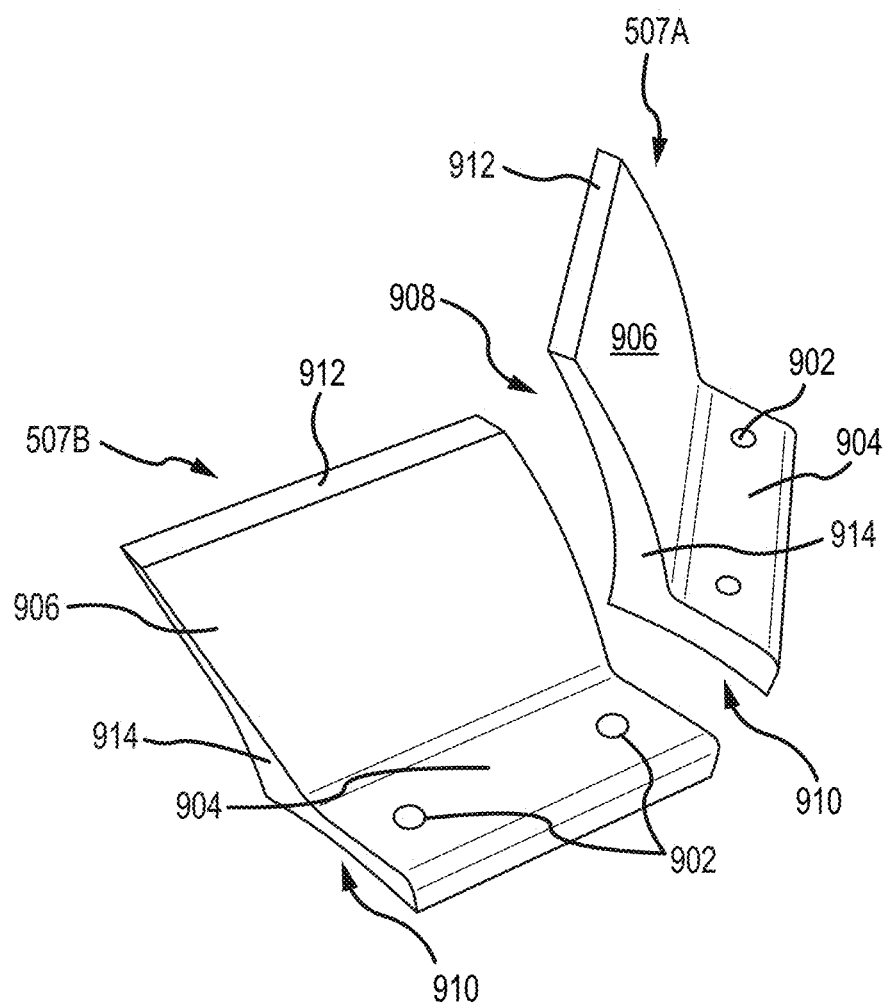
FIG. 9 is a perspective view of two curved cleats.

FIG. 9 shows a perspective view of two curved cleats 507A, 507B. In some embodiments, the cleats are 4" cleats 507A, 507B. In an embodiment, the cleats 507A, 507B may include a set of two bolts. Further, the bolts may be ¼"×1¼" #1 elevator bolts with hardware. The cleats 507A, 507B may also include holes 902 for the bolts or other attachment/connection mechanisms. The cleats 507A, 507B may have a flat lower area 904 (also called a "block" herein) and a curved section 906. The curved section 906 has a back side (i.e., the side showing and the side facing away from the tire or article) and an article-supporting face 908 (not shown, and is positioned opposite the back side). The cleats 507A, 507B also have a top 912, a bottom 910, and sides 914.

Figure 10:
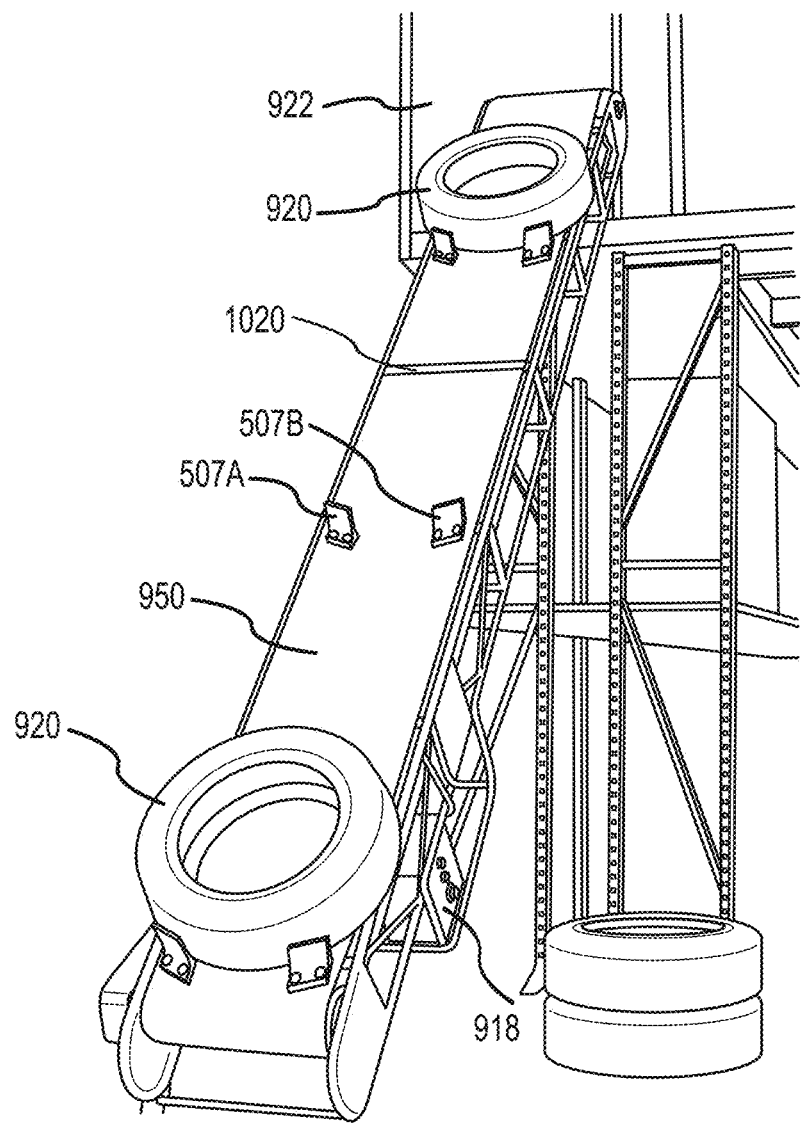
FIG. 10 is a perspective view of an embodiment of an elevating belt conveyor conveying tires.

FIG. 10 is a perspective view of an embodiment of an elevating belt conveyor conveying tires 920 to an upper floor 922. The conveyor may comprise a belt 950 and cleats 507A, 507B. The belt 950 may have a seam 1020 and an upper surface and a lower surface. The conveyor may also have an electrical box 918 with power buttons, and an emergency stop button, etc.

Figure 11:
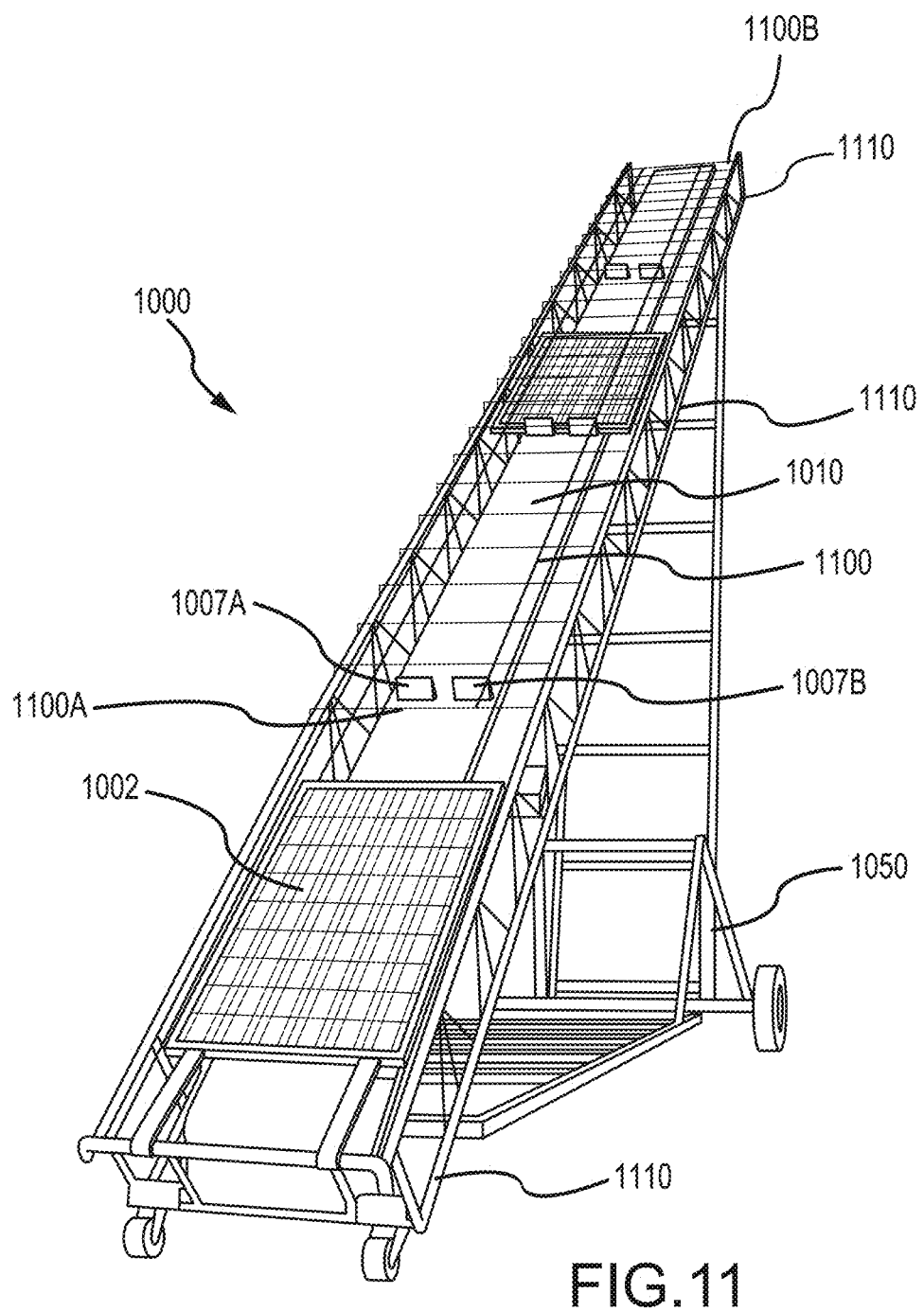
FIG. 11 is a perspective view of an embodiment of an elevating belt conveyor conveying panels.

FIG. 11 shows an embodiment of an elevating conveyor 1000 conveying solar panels 1002. The conveyor may comprise a conveyor belt 1010, a support frame 1110, cleats 1007A, 1007B, a stand 1050, and a retention mechanism 1100. The retention mechanism 1100 has a lower end 1100A and an upper end 1100B. The retention mechanism 1100 is interconnected to the support frame 1110 and does not run the entire length of the support frame 1110 such that articles may be loaded onto the conveyor belt 1010 at the bottom of the elevating conveyor 1000 and removed at the top of the elevating belt conveyor 1000. In one embodiment, the retention mechanism 1100 is a set of bars made of the same material or a similar material to the support frame 1110. Articles, such as solar panels 1002, do not touch the retention mechanism 1100 unless the article falls away from the conveyor belt 1010. At that point, the retention mechanism 1100 keeps the article from completely falling off of the conveyor 1000. In some additional embodiments, the retention mechanism may also prevent the articles from moving from side to side on the conveyor 1000 or from falling off of the side of the conveyor 1000.

Figure 12:
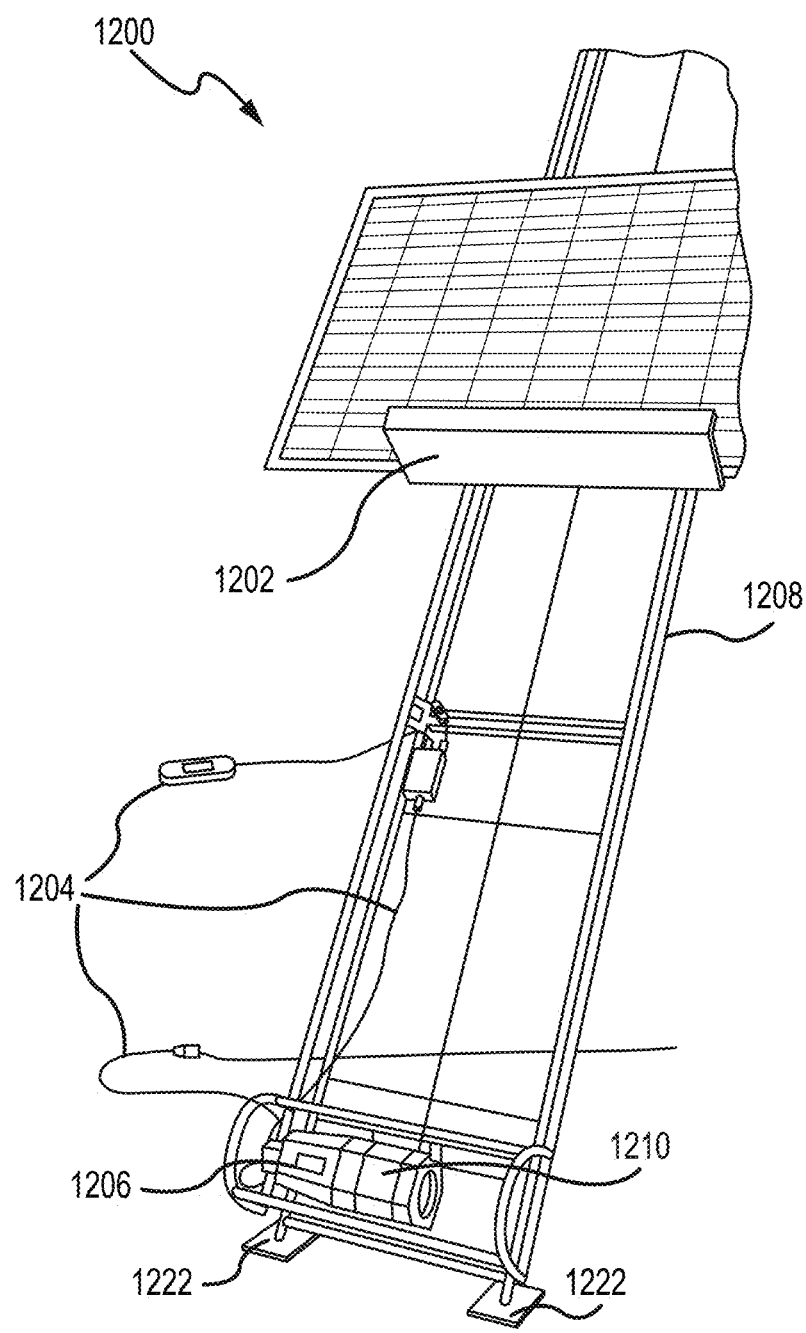
FIG. 12 is a perspective view of an embodiment of an elevating conveyor.

FIG. 12 shows an embodiment of an elevating conveyor 1200 used in industrial uses. The elevating conveyor 1200 may comprise a support frame 1208, motor 1206, pulley 1210, electrical system 1204, drive pulley 1210, and one or more cleats 1202. In some embodiments, the support frame 1208 may comprise support feet 1222 (alternative to a single support stand as shown in FIG. 1 as element 102). Either a support stand or support feet (even more than two feet) maybe be used in the various embodiments described herein.

Figure 13:
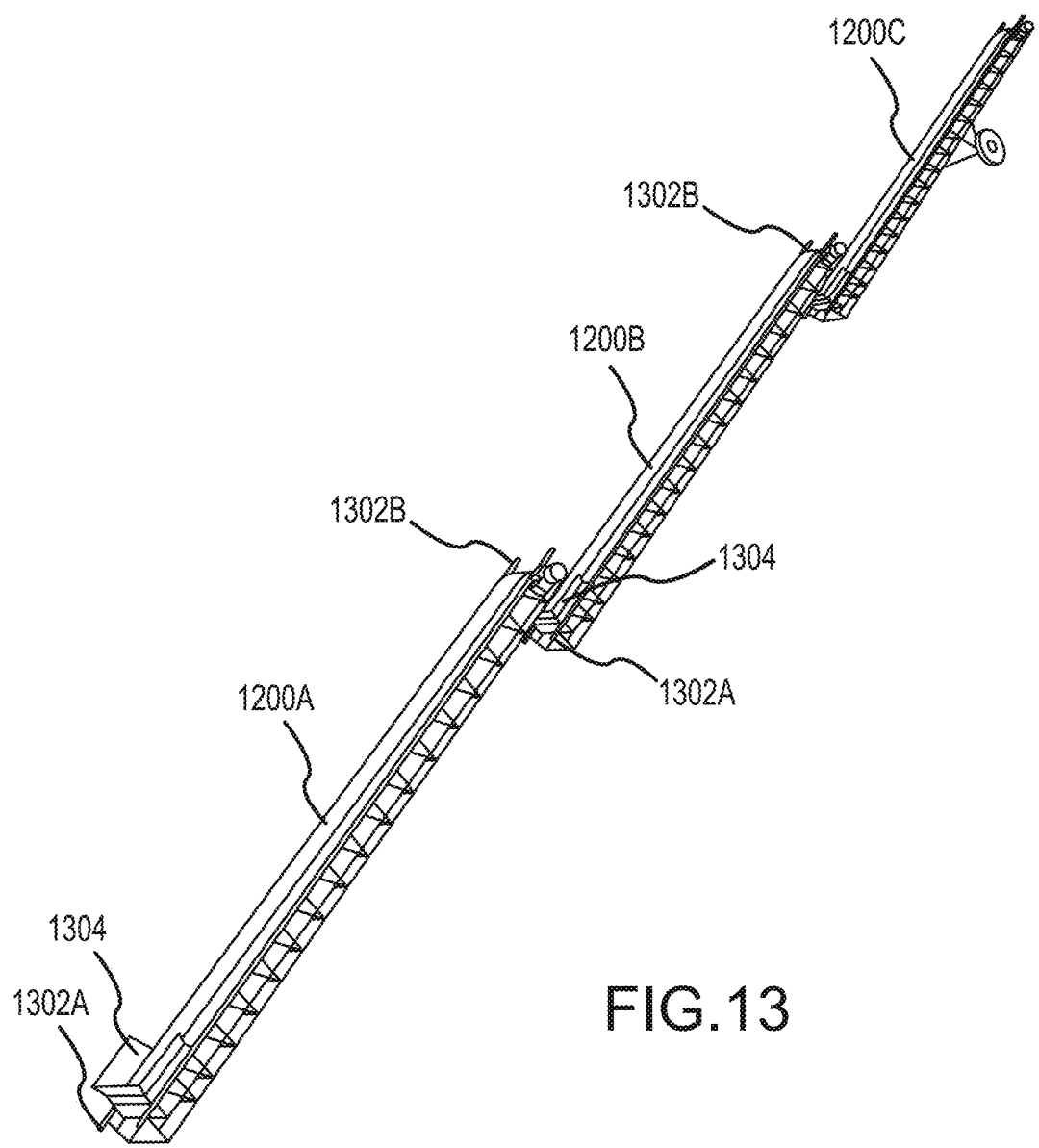
FIG. 13 is a perspective view of an embodiment of a system of multiple elevating conveyors.

FIG. 13 shows an embodiment of a system of multiple elevating conveyors 1200A, 1200B, 1200C stacked one on top of another. Each conveyor 1200A, 1200B, 1200C includes a set of lower handles 1302A, and a set of upper handles 1302B, and a receiving hopper 1304.

Figure 14A:
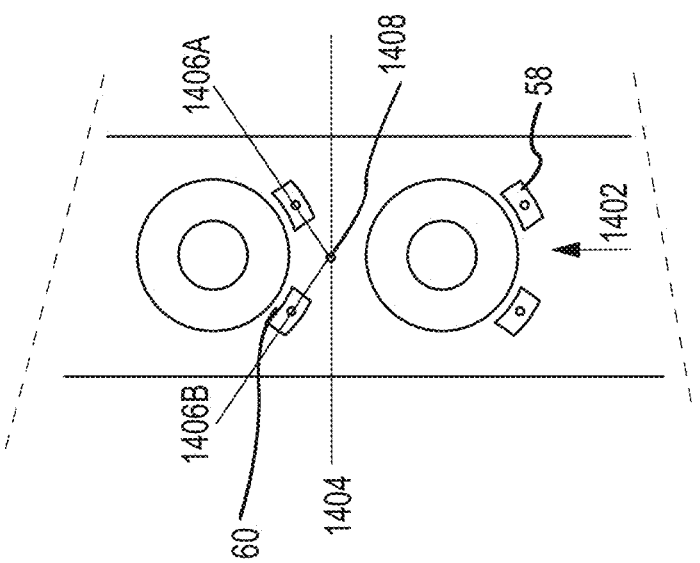
FIG. 14A is a top elevation view of an embodiment of cleats on a conveyor.
Figure 14B:
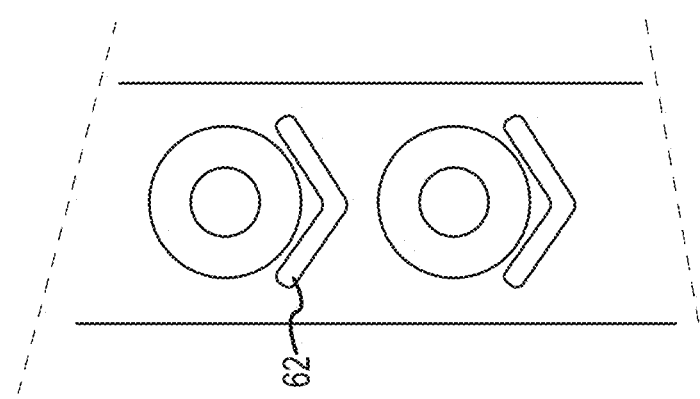
FIG. 14B is a top elevation view of a second embodiment of cleats on a conveyor.
Figure 14C:
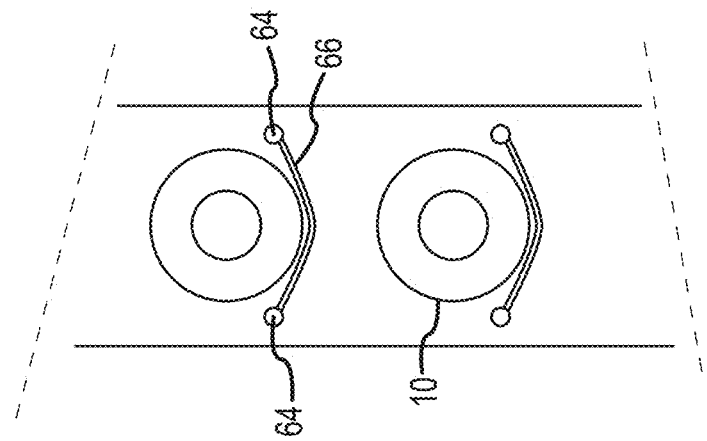
FIG. 14C is a top elevation view of a third embodiment of cleats on a conveyor.

Other embodiments of cleats or support elements are shown in FIGS. 14A-14C. Note that the term "cleat" and the term "support element" may be used interchangeably herein. FIG. 14A shows an embodiment of cleats holding a tire on a conveyor. The cleats in FIG. 14A are posts 58 that have article-supporting faces 60 contoured to complement the shape of and to mate with a conveyed article. The posts or cleats 58 also have article-supporting faces 60 that define a plane 1406A, 1406B oblique to the direction of belt travel 1402 and intersecting at a point 1408 below the posts or cleats 58 on the belt. The angle defined by the cleats or posts 58 may also be measured from the horizontal line 1404. The cleats in FIG. 14B are chevron-shaped flights 62 serving as pockets for conveyed articles. Each flight may be a single piece or segmented. In FIG. 14C, each cleat constitutes a pair of pins 64 between which an elastomeric band 66 is strung. The weight of the conveyed article pushing on the elastomeric band stretches the band to conform to the outer surface of the conveyed article 10. These are just a few additional examples of cleats that are usable in the conveyors of FIGS. 1-13. Other support elements, such as buckets, transverse flights, or arrays of pins, could alternatively be used.

Figure 15:
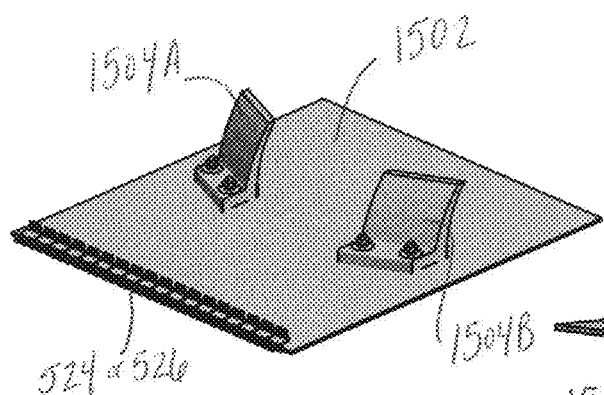
FIG. 15 shows a portion of a conveyor belt with cleats.
Figure 16:
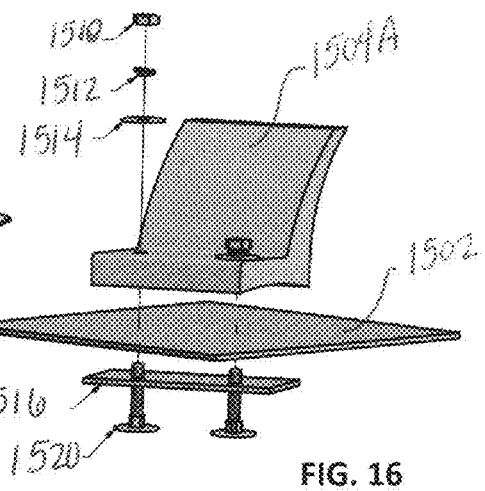
FIG. 16 shows a portion of a conveyor belt with a cleat.

FIGS. 15 and 16 show a portion of the conveyor belt 1502 with cleats 1504A, 1504B. In one embodiment, the cleats 1504A, 1504B are about 4" tall and are used in pairs. In other embodiments, the cleats 1504A, 1504B are between about 1" and about 3.5" tall and are used in pairs or as single support elements to move items along a conveyor belt. In one embodiment, the belt 1502 is between about 12" and 20" wide and between about ¹⁄₃₂" and about ⅛" thick. The belt 1502 can comprise a set of #20×18" long hammer-on lacing 524 or a set of #RS125×18" long staple lacing 526. Further, each cleat 1502A, 1502B may be interconnected to the belt 1502 via a set of two bolts 1520. The bolts 1520 can be positioned upwardly or downwardly through holes in the base of the cleat 1520A, 1502B. Additionally, a gasket 1516 can be positioned between the bolt 1520 head and the belt 1502 or between the belt 1502 and the cleat 1504A, 1504B. The gasket 1516 can be comprised of an elastic material, such as rubber, or any other strong material known in the art. Further, the gasket 1516 can be a single piece of material or it can be a 2-ply gasket in some embodiments. Various embodiments include a washer 1514 positioned between an upper surface of the base of the cleat 1504A, 1504B and a nut 1510. The washer 1514 is a fender washer in one embodiment. In a further embodiment, a lock washer 1512 is positioned between the washer 1514 and the nut 1510.

Figure 17A:
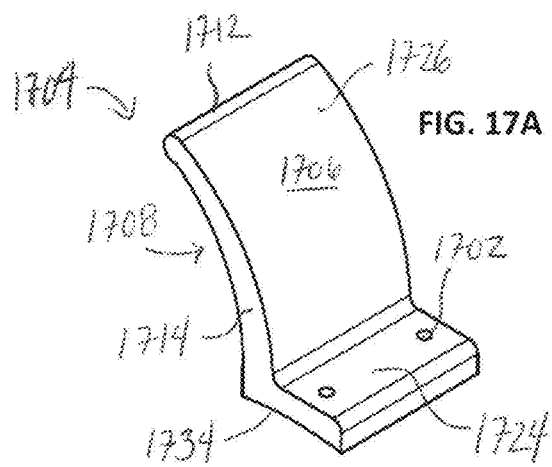
FIGS. 17A-D show various views of a fourth embodiment of a cleat.
Figure 17B:
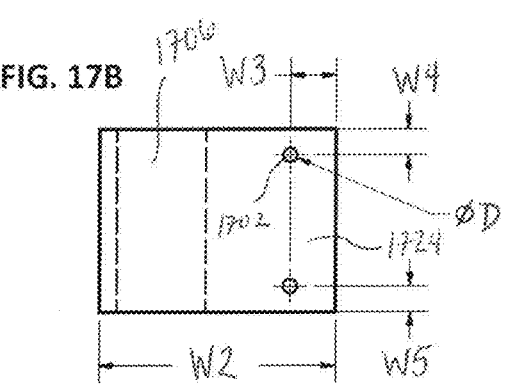
Figure 17C:
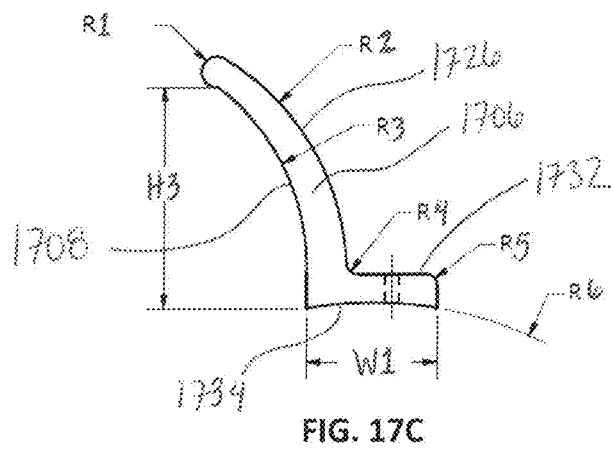
Figure 17D:
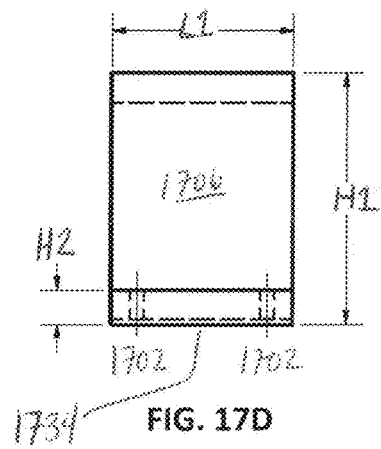

FIGS. 17A-D show various views of one embodiment of a cleat 1704 (also called a support element herein). FIG. 17A is a perspective view of the cleat 1704. FIG. 17B is a top plan view of the cleat 1704. FIG. 17C is a side elevation view of the cleat 1704. FIG. 17D is a front elevation view of the cleat 1704. In some embodiments, the cleat 1704 is a 6.0" cleat. In other embodiments, the cleat 1704 is a 1.25" cleat, a 2.0" cleat, a 4.0" cleat, a 5.0" cleat, or an 8.0" cleat. The cleat 1704 may also include holes 1702 for bolts or other attachment or interconnection mechanisms. In one embodiment, the holes 1702 have a diameter between about ¼" and 1". In a preferred embodiment, the holes 1702 have a diameter of about ⁵⁄₁₆". The cleat 1704 can have a flat lower area 1724 (also called a "block" herein) or a curved block 1724. In one embodiment, the under surface 1734 of the block 1724 has a radius of curvature R6 between about 5" and about 10" and the block 1724 has a width W1 between about 2" and about 4". In a preferred embodiment the under surface 1734 of the block 1724 has a radius of curvature R6 of about 8.5" and the block 1724 has a width of 2⅞". The block can have a flat or a curved upper surface 1732. In one embodiment, the height H2 of the block 1724 (i.e., from the under surface 1734 to the upper surface 1732) is between about ½" and about 1.0". In a preferred embodiment, the height H2 of the block 1724 (i.e., from the under surface 1734 to the upper surface 1732) is about ¾". The outer edge of the block 1724 can have a square corner or a rounded corner. In one embodiment, the radius of curvature R5 of the corner of the block 1724 is between about ¹⁄₁₆" and about ½". In a preferred embodiment, the radius of curvature R5 of the corner of the block 1724 is about ¼".

In some embodiments, the cleat 1704 also has a curved section 1706. The curved section 1706 has a back side 1726 (i.e., the side facing away from the article conveyed) and an article-supporting face 1708 positioned opposite the back side 1726. In one embodiment, the article-supporting face 1708 has a smaller radius of curvature R3 than the radius of curvature R2 of the back side 1726. Thus, the radius of curvature R3 of the article-supporting face 1708 may be between about 4" and about 6" and the radius of curvature R2 of the back side 1726 may be between about 4.5" and about 6.5" in some embodiments. In a preferred embodiment, the radius of curvature R3 of the article-supporting face 1708 is about 5" and the radius of curvature R2 of the back side 1726 is about 5.5". The back side 1726 can be interconnected to the upper surface 1732 of the block 1724 via a radius of curvature R4. The radius of curvature R4 can be between about ⅛" and about ½" in some embodiments.

In a preferred embodiment, the radius of curvature R4 is about ¼". The cleat 1704 also has a top 1712 and sides 1714. In one embodiment, the height H1 from the under surface 1734 to the top of the top 1712 is between about 4" and about 6.5". In a preferred embodiment, the height H1 from the under surface 1734 to the top of the top 1712 is about 5.5". In one embodiment, the length L1 from one side 1714 to the other side is between about 2" and about 6". In a preferred embodiment, the length L1 from one side 1714 to the other side is about 4". Additionally, the top 1712 may be flat or curved. In one embodiment, the radius of curvature R1 of the top 1712 is between about ³⁄₁₆" and about ½". In a preferred embodiment, the radius of curvature R1 of the top 1712 is about ⁵⁄₁₆".

In one embodiment, the entire width W2 of the cleat 1704 is between about 5" and about 6". In a preferred embodiment, the width W2 of the cleat 1704 is about 5³⁄₁₆". Further, the holes 1702 are positioned a distance W3 from the edge of the block 1724, where the distance W3 is between about 0.5" and about 2". In a preferred embodiment, the holes 1702 are positioned a distance W3 from the edge of the block 1724, where the distance W3 is about 1.0". Additionally, the holes 1702 are positioned a distance W4, W5 from the side 1706, where the distance W4, W5 is between about ¼" and about 1". In a preferred embodiment, the holes 1702 are positioned a distance W4, W5 from the side 1706, where the distance W4, W5 is between about ⁹⁄₁₆".

Figure 18:
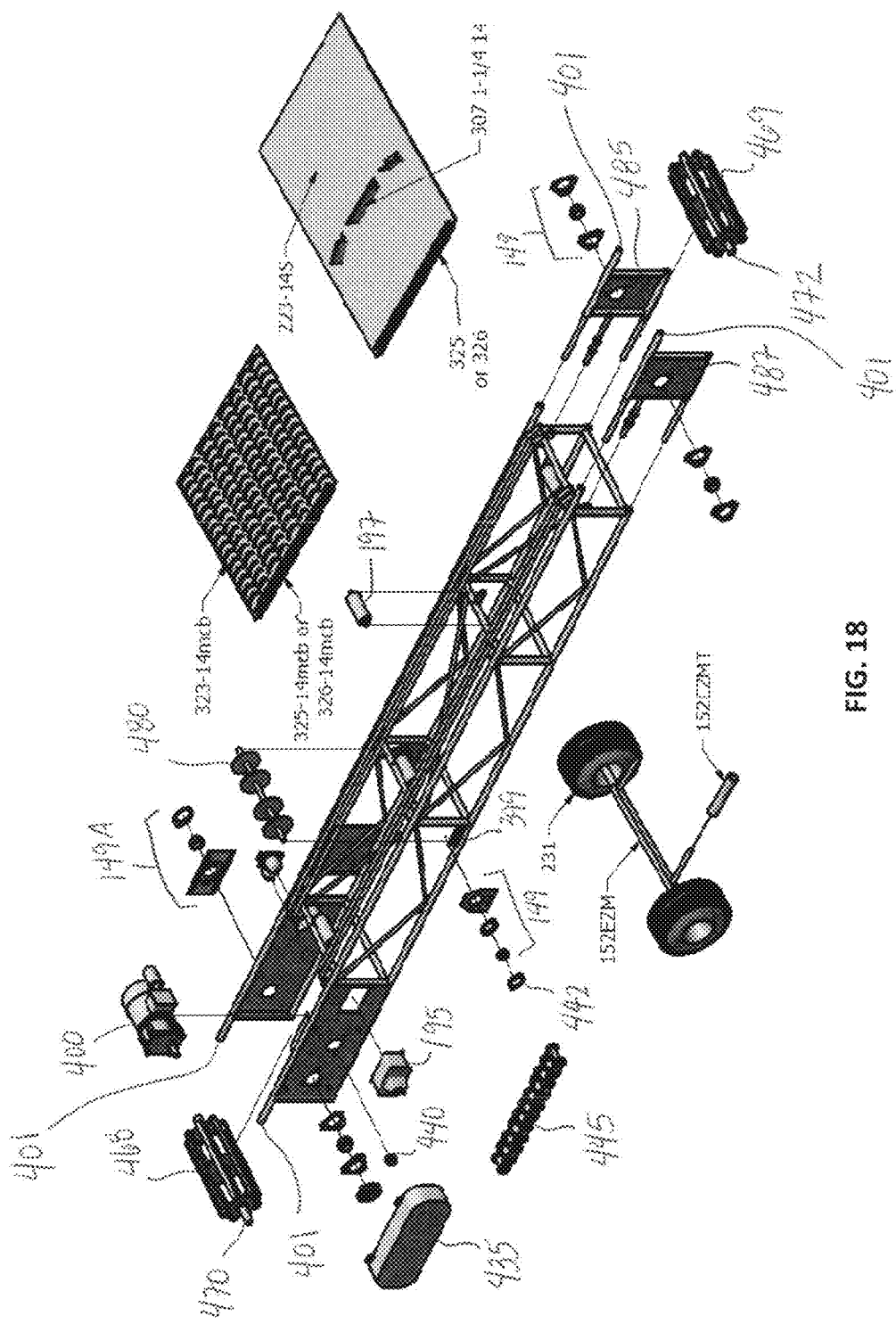
FIG. 18 shows an exploded view of an embodiment of a conveyor.

FIG. 18 is an exploded view of one embodiment of a conveyor. The conveyor can comprise and combination of the following parts, or equivalents thereof: handles 401, a 1" bearing with 3-hole triangular flangettes 149, a start/stop switch 195BHRLUW, a ¼ hp 115V gearmotor 400, a drive pulley 428 with a 1" bore, a drive shaft 430 with a 1" O.D., a chain guard 435, a 12-tooth Sprocket 440 with a ¾" bore for a #40 chain, a 20-tooth Sprocket 442 with a 1" bore for a #40 chain, a section of #40 roller chain 445 (which can include 49 pitches and connecting links), a 1" bearing with rectangle/oval flangettes 149A, a ⅝" bearing with 2-hole oval flangettes 153A, a mounting bracket for return wheels 399, a return wheel/roller weld-on bracket 399, an electrical inlet (male—not shown), an electrical outlet (female—not shown), a thermal overload reset button (not shown), return wheels 480 with ⅝" shaft, a tail pulley 469, with a 1" bore, a tail shaft 472 with a 1" O.D., a right-hand side take-up frame 485 with adjustment screw, and a left-hand side take-up frame 487 with adjustment screw. Further embodiments of the conveyor can include a 10-foot conveyor with 1¼" cleats, a 10-foot conveyor with a mini-cleated belt, a 12-foot conveyor with 1¼" cleats, or a 12-foot conveyor with a mini-cleated belt. The conveyor may have the following belt parts and accessories in some embodiments: a dolly 152EZM, a weld-on tube receptor 152EZMT, a wheel 231 for the dolly, a set of 1¼" bolt on cleats 307 for a belt (which may be 14 inches wide), a 2-ply belting, mini-cleated belting, a set of long hammer-on lacing 325 for smooth belt (may be #35×14" lacing or #20×14" lacing), and a set of staple lacing 326 for smooth belt* (may be #RS187×14" long or #RS125×14" long).

Figure 19:
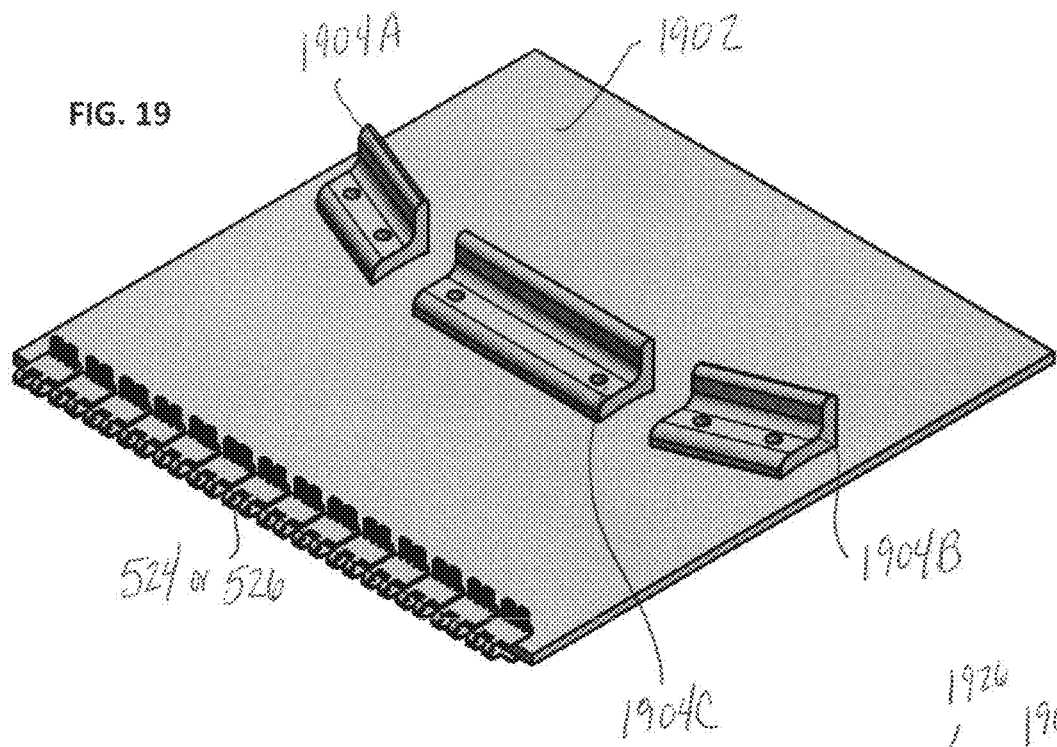
FIG. 19 shows a portion of a conveyor belt with cleats.

FIG. 19 shows a portion of the conveyor belt 1902 with cleats 1904A, 1904B, 1904C. In one embodiment, the cleats 1904A, 1904B, 1904C are about 1¼" tall and are used in threes. In other embodiments, the cleats 1904A, 1904B, 1904C are between about 2" and about 4" tall and are used in threes or as single support elements to move items along a conveyor belt. In one embodiment, the belt 1902 is between about 12" and 20" wide and between about ¹⁄₃₂" and about ⅛" thick. The belt 1902 can comprise a set of hammer-on lacing 524 or a set of staple lacing 526. Further, each cleat 1904A, 1904B, 1904C may be interconnected to the belt 1902 via a set of two bolts, a gasket, and other connecting elements.

Figure 20B:
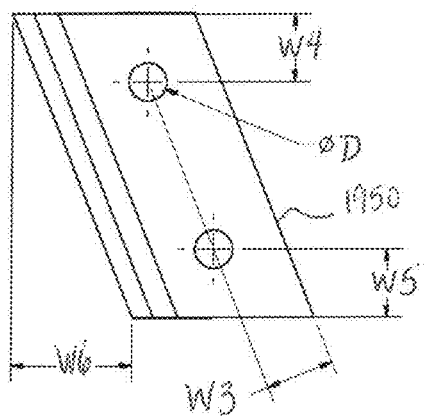
FIGS. 20A-D show various views of a fifth embodiment of a cleat
Figure 20C:
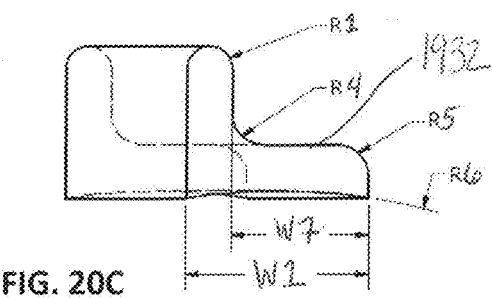
Figure 20A:
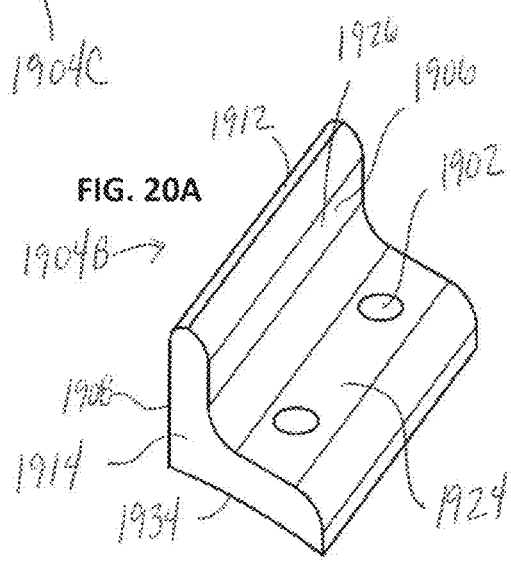
Figure 20D:
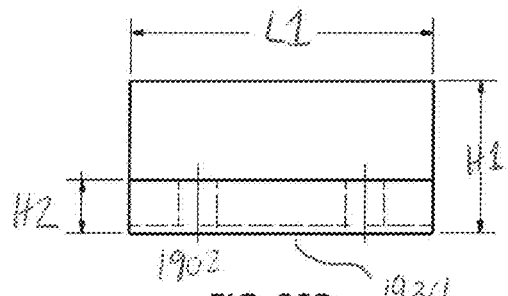

FIGS. 20A-D show various views of one embodiment of a cleat 1904B (also called a support element herein). The cleat 1904B can be configured to be the right-hand cleat 1904B out of a group of two or three cleats. FIG. 20A is a perspective view of the cleat 1904B. FIG. 20B is a top plan view of the cleat 1904B. FIG. 20C is a side elevation view of the cleat 1904B. FIG. 20D is a front elevation view of the cleat 1904B. FIGS. 22A-D show various views of one embodiment of a cleat 1904A (also called a support element herein). The cleat 1904A can be configured to be the left-hand cleat 1904A out of a group of two or three cleats. FIG. 22A is a perspective view of the cleat 1904A. FIG. 22B is a top plan view of the cleat 1904A. FIG. 22C is a side elevation view of the cleat 1904A. FIG. 22D is a front elevation view of the cleat 1904A.

Referring to FIGS. 20A-D and 22A-D, the cleats 1904A and 1904B shown are mirror images of one another in various embodiments. Therefore, when referring to either cleat, the number 1904 will be used. In some embodiments, the cleat 1904 is a 1¼" cleat. In other embodiments, the cleat 1904 is a 1.25" cleat, a 2" cleat, a 4" cleat, a 6" cleat, or an 8" cleat. The cleat 1904 may also include holes 1902 for bolts or other attachment or interconnection mechanisms. In one embodiment, the holes 1902 have a diameter between about ¼" and 1". In a preferred embodiment, the holes 1902 have a diameter of about 5/16". The cleat 1904 can have a flat lower area 1924 (also called a "block" herein) or a curved block 1924. In one embodiment, the under surface 1934 of the block 1924 has a radius of curvature R6 between about 3" and about 7" and the block 1924 has a width W1 between about 1" and about 2". In a preferred embodiment the under surface 1934 of the block 1924 has a radius of curvature R6 of about 5" and the block 1924 has a width of 1.5". In one embodiment, the width W7 of the horizontal portion of the block 1924 is between about ¾" and about 1.5". In a preferred embodiment, the width W7 of the horizontal portion of the block 1924 is about 1⅛". Further, the article supporting surface 1908 and the trailing edge 1950 are at an angle relative to the sides 1914. Thus, the distance W6 from the leading edge of one side 1914 to the leading edge of the other side 1914 is between about ½" and 2". In a preferred embodiment, the distance W6 from the leading edge of one side 1914 to the leading edge of the other side 1914 is about 1.0". Further, the leading edge or article supporting surface 1908 forms an angle with the vertical axis shown in FIGS. 20a and 20B, which would be the horizontal axis when the cleat 1904 is interconnected to the belt. In some embodiments, the angle for the left cleat 1904A is substantially the same as the angle for the right cleat 1904B and the angle is between about 10 degrees and about 75 degrees. In a preferred embodiment, the angle is between about 25 degrees and about 55 degrees. Typically, the sides 1914 are substantially parallel to the sides of the belt.

The block can have a flat or a curved upper surface 1932. In one embodiment, the height H2 of the block 1924 (i.e., from the under surface 1934 to the upper surface 1932) is between about ¼" and about 1.0". In a preferred embodiment, the height H2 of the block 1924 (i.e., from the under surface 1934 to the upper surface 1932) is about 7/16". The outer edge of the block 1924 can have a square corner or a rounded corner. In one embodiment, the radius of curvature R5 of the corner of the block 1924 is between about 1/16" and about ½". In a preferred embodiment, the radius of curvature R5 of the corner of the block 1924 is about ¼".

In some embodiments, the cleat 1904 also has an upright section 1906. The upright section 1906 has a back side 1926 (i.e., the side facing away from the article conveyed) and an article-supporting face 1908 positioned opposite the back side 1926. The back side 1926 can be interconnected to the upper surface 1932 of the block 1924 via a radius of curvature R4. The radius of curvature R4 can be between about ⅛" and about ½" in some embodiments. In a preferred embodiment, the radius of curvature R4 is about ¼". The cleat 1904 also has a top 1912 and sides 1914. In one embodiment, the height H1 from the under surface 1934 to the top of the top 1912 is between about 1" and about 2". In a preferred embodiment, the height H1 from the under surface 1934 to the top of the top 1912 is about 1¼". In one embodiment, the length L1 from one side 1914 to the other side is between about 1" and about 3". In a preferred embodiment, the length L1 from one side 1914 to the other side is about 2.5". Additionally, the top 1912 may be flat or curved. In one embodiment, the radius of curvature R1 of the top 1912 is between about 1/16" and about ½". In a preferred embodiment, the radius of curvature R1 of the top 1912 is about 3/16".

In one embodiment, the holes 1902 are positioned a distance W3 from the edge of the block 1924, where the distance W3 is between about 0.5" and about 2". In a preferred embodiment, the holes 1902 are positioned a distance W3 from the edge of the block 1924, where the distance W3 is about 1.0". Additionally, the holes 1902 are positioned a distance W4, W5 from the side 1906, where the distance W4, W5 is between about ¼" and about 1". In a preferred embodiment, the holes 1902 are positioned a distance W4, W5 from the side 1906, where the distance W4, W5 is between about 9/16".

FIGS. 21A-D show various views of one embodiment of a cleat B (also called a support element herein). The cleat 2104B can be configured to be the right-hand cleat 2104B out of a group of two or three cleats. FIG. 21A is a perspective view of the cleat 2104B. FIG. 21B is atop plan view of the cleat 2104B. FIG. 21C is a side elevation view of the cleat 2104B. FIG. 21D is a front elevation view of the cleat 2104B. FIGS. 23A-D show various views of one embodiment of a cleat 2104A (also called a support element herein). The cleat 2104A can be configured to be the left-hand cleat 2104A out of a group of two or three cleats. FIG. 23A is a perspective view of the cleat 2104A. FIG. 23B is a top plan view of the cleat 2104A. FIG. 23C is a side elevation view of the cleat 2104A. FIG. 23D is a front elevation view of the cleat 2104A.

Referring to FIGS. 21A-D and 23A-D, the cleats 2104A and 2104B shown are mirror images of one another in various embodiments. Therefore, when referring to either cleat, the number 2104 will be used. In some embodiments, the cleat 2104 is a 2" cleat. In other embodiments, the cleat 2104 is a 1.25" cleat, a 4" cleat, a 6" cleat, or an 8" cleat. The cleat 2104 may also include holes 2102 for bolts or other attachment or interconnection mechanisms. In one embodiment, the holes 2102 have a diameter between about ¼" and 1". In a preferred embodiment, the holes 2102 have a diameter of about 5/16". The cleat 2104 can have a flat lower area 2124 (also called a "block" herein) or a curved block 2124. In one embodiment, the under surface 2134 of the block 2124 has a radius of curvature R6 between about 1" and about 5" and the block 2124 has a width W1 between about 1" and about 2". In a preferred embodiment the under surface 2134 of the block 2124 has a radius of curvature R6 of about 2³⁄₁₆" and the block 2124 has a width of 1.5". In one embodiment, the width W7 of the horizontal portion of the block 2124 is between about ¾" and about 1.5". In a preferred embodiment, the width W7 of the horizontal portion of the block 2124 is about 1⅛". Additionally, the width W8 of the cleat 2104 from the trailing edge 2150 to the most forward extending portion of the article supporting surface 2108 is between about 1" and about 2.5" in one embodiment. In a preferred embodiment, the width W8 of the cleat 2104 from the trailing edge 2150 to the most forward extending portion of the article supporting surface 2108 is about 1¹³⁄₁₆". Further, the article supporting surface 2108 and the trailing edge 2150 are at an angle relative to the sides 2114. Thus, the distance W6 from the leading edge of one side 2114 to the leading edge of the other side 2114 is between about ½" and 2". In a preferred embodiment, the distance W6 from the leading edge of one side 2114 to the leading edge of the other side 2114 is about 1⅛". Further, the leading edge or article supporting surface 2108 forms an angle with the vertical axis shown in FIGS. 21A and 21B, which would be the horizontal axis when the cleat 2104 is interconnected to the belt. In some embodiments, the angle for the left cleat 2104A is substantially the same as the angle for the right cleat 2104B and the angle is between about 10 degrees and about 75 degrees. In a preferred embodiment, the angle is between about 25 degrees and about 55 degrees.

The block can have a flat or a curved upper surface 2132. In one embodiment, the height H2 of the block 2124 (i.e., from the under surface 2134 to the upper surface 2132) is between about ¼" and about 1.0". In a preferred embodiment, the height H2 of the block 2124 (i.e., from the under surface 2134 to the upper surface 2132) is about ⁷⁄₁₆". The outer edge of the block 2124 can have a square corner or a rounded corner. In one embodiment, the radius of curvature R5 of the corner of the block 2124 is between about ¹⁄₁₆" and about ½". In a preferred embodiment, the radius of curvature R5 of the corner of the block 2124 is about ¼".

In some embodiments, the cleat 2104 also has an upright section 2106, which may be curved or substantially straight. The upright section 2106 has a back side 2126 (i.e., the side facing away from the article conveyed) and an article-supporting face 2108 positioned opposite the back side 2126. In one embodiment, the article-supporting face 2108 has a smaller radius of curvature R3 than the radius of curvature R2 of the back side 2126. Thus, the radius of curvature R3 of the article-supporting face 2108 may be between about 3" and about 5" and the radius of curvature R2 of the back side 2126 may be between about 2" and about 4" in some embodiments. In a preferred embodiment, the radius of curvature R3 of the article-supporting face 2108 is about 4⅛" and the radius of curvature R2 of the back side 2126 is about 2¹¹⁄₁₆". The back side 2126 can be interconnected to the upper surface 2132 of the block 2124 via a radius of curvature R4. The radius of curvature R4 can be between about ⅛" and about ½" in some embodiments. In a preferred embodiment, the radius of curvature R4 is about ¼". The cleat 2104 also has a top 2112 and sides 2114. In one embodiment, the height H1 from the under surface 2134 to the top of the top 2112 is between about 1" and about 3". In a preferred embodiment, the height H1 from the under surface 2134 to the top of the top 2112 is about 2". In one embodiment, the length L1 from one side 2114 to the other side is between about 1" and about 3". In a preferred embodiment, the length L1 from one side 2114 to the other side is about 2⅝". Additionally, the top 2112 may be flat or curved. In one embodiment, the radius of curvature R1 of the top 2112 is between about ¹⁄₁₆" and about ½". In a preferred embodiment, the radius of curvature R1 of the top 2112 is about ⅛". Further, the width or thickness W9 of the upper portion of the upright section 2106 is between about ⅛" and about ½". In one embodiment, the width or thickness W9 of the upper portion of the upright section 2106 is about ¼".

In one embodiment, the holes 2102 are positioned a distance W3 from the edge of the block 2124, where the distance W3 is between about ¼" and about 1". In a preferred embodiment, the holes 2102 are positioned a distance W3 from the edge of the block 2124, where the distance W3 is about ⁹⁄₁₆". Additionally, the holes 2102 are positioned a distance W4, W5 from the side 2106, where the distance W4, W5 is between about ¼" and about 1". In a preferred embodiment, the holes 2102 are positioned a distance W4, W5 from the side 2106, where the distance W4, W5 is between about ⁹⁄₁₆".

FIGS. 24A-D show various views of one embodiment of a center cleat 1904C (also called a support element herein). The cleat 1904C can be configured to be the center cleat 1904C out of a group of three cleats. FIG. 24A is a perspective view of the cleat 1904C. FIG. 24B is a top plan view of the cleat 1904C. FIG. 24C is a side elevation view of the cleat 1904C. FIG. 24D is a front elevation view of the cleat 1904C. In some embodiments, the cleat 1904C is a 1¼" cleat. In other embodiments, the cleat 1904C is a 2" cleat, a 4" cleat, a 6" cleat, or an 8" cleat. The cleat 1904C may also include holes 1902 for bolts or other attachment or interconnection mechanisms. In one embodiment, the holes 1902 have a diameter between about ¼" and 1". In a preferred embodiment, the holes 1902 have a diameter of about ⁵⁄₁₆". The cleat 1904C can have a flat lower area 1924 (also called a "block" herein) or a curved block 1924. In one embodiment, the under surface 1934 of the block 1924 has a radius of curvature R6 between about 3" and about 7" and the block 1924 has a width W1 between about 1" and about 2". In a preferred embodiment the under surface 1934 of the block 1924 has a radius of curvature R6 of about 5" and the block 1924 has a width of 1.5". In one embodiment, the width W7 of the horizontal portion of the block 1924 is between about ¾" and about 1.5". In a preferred embodiment, the width W7 of the horizontal portion of the block 1924 is about 1⅛". Typically, the sides 1914 are substantially parallel to the sides of the belt.

The block can have a flat or a curved upper surface 1932. In one embodiment, the height H2 of the block 1924 (i.e., from the under surface 1934 to the upper surface 1932) is between about ¼" and about 1.0". In a preferred embodiment, the height H2 of the block 1924 (i.e., from the under surface 1934 to the upper surface 1932) is about ⁷⁄₁₆". The outer edge of the block 1924 can have a square corner or a rounded corner. In one embodiment, the radius of curvature R5 of the corner of the block 1924 is between about ¹⁄₁₆" and about ½". In a preferred embodiment, the radius of curvature R5 of the corner of the block 1924 is about ¼".

In some embodiments, the cleat 1904C also has an upright section 1906. The upright section 1906 has a back side 1926 (i.e., the side facing away from the article conveyed) and an article-supporting face 1908 positioned opposite the back side 1926. The back side 1926 can be interconnected to the upper surface 1932 of the block 1924 via a radius of curvature R4. The radius of curvature R4 can be between about ⅛" and about ½" in some embodiments. In a preferred embodiment, the radius of curvature R4 is about ¼". The cleat 1904C also has a top 1912 and sides 1914. In one embodiment, the height H1 from the under surface 1934 to the top of the top 1912 is between about 1" and about 2". In a preferred embodiment, the height H1 from the under surface 1934 to the top of the top 1912 is about 1¼". In one embodiment, the length L1 from one side 1914 to the other side is between about 3" and about 7". In a preferred embodiment, the length L1 from one side 1914 to the other side is about 5.5". Additionally, the top 1912 may be flat or curved. In one embodiment, the radius of curvature R1 of the top 1912 is between about 1/16" and about ½". In a preferred embodiment, the radius of curvature R1 of the top 1912 is about 3/16".

In one embodiment, the holes 1902 are positioned a distance W3 from the edge of the block 1924, where the distance W3 is between about 0.25" and about 1". In a preferred embodiment, the holes 1902 are positioned a distance W3 from the edge of the block 1924, where the distance W3 is about 9/16". Additionally, the holes 1902 are positioned a distance W4, W5 from the side 1906, where the distance W4, W5 is between about ¼" and about 1". In a preferred embodiment, the holes 1902 are positioned a distance W4, W5 from the side 1906, where the distance W4, W5 is between about 9/16".

Figure 25A:
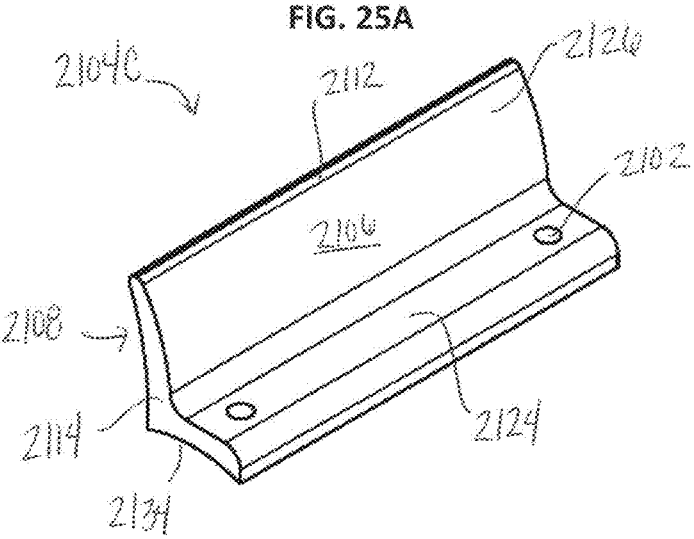
FIGS. 25A-D show various views of a tenth embodiment of a cleat
Figure 25B:
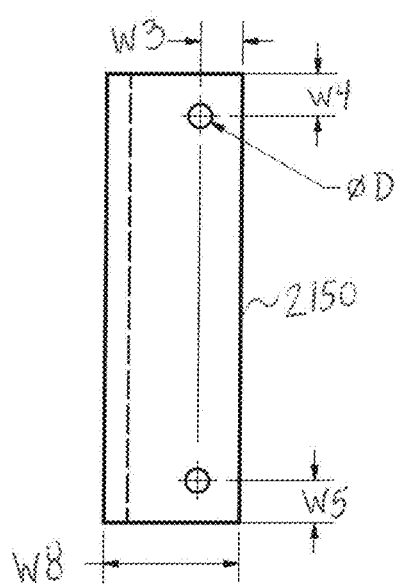
Figure 25C:
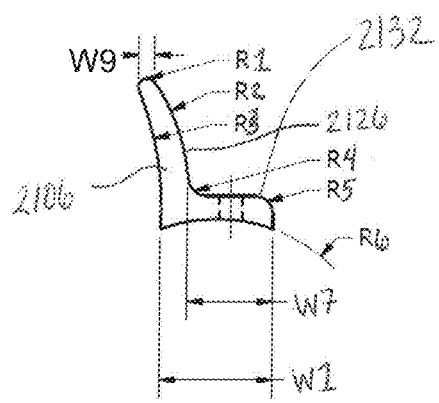
Figure 25D:
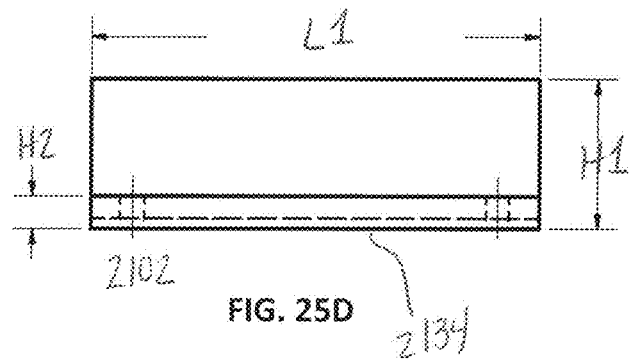

FIGS. 25A-D show various views of one embodiment of a cleat 2104C (also called a support element herein). The cleat 2104C can be configured to be the center cleat 2104C out of a group three cleats. FIG. 25A is a perspective view of the cleat 2104C. FIG. 25B is a top plan view of the cleat 2104C. FIG. 25C is a side elevation view of the cleat 2104C. FIG. 25D is a front elevation view of the cleat 2104C. In some embodiments, the cleat 2104C is a 2" cleat. In other embodiments, the cleat 2104C is a 1.25" cleat, a 4" cleat, a 6" cleat, or an 8" cleat. The cleat 2104C may also include holes 2102 for bolts or other attachment or interconnection mechanisms. In one embodiment, the holes 2102 have a diameter between about ¼" and 1". In a preferred embodiment, the holes 2102 have a diameter of about 5/16". The cleat 2104C can have a flat lower area 2124 (also called a "block" herein) or a curved block 2124. In one embodiment, the under surface 2134 of the block 2124 has a radius of curvature R6 between about 1" and about 5" and the block 2124 has a width W1 between about 1" and about 2". In a preferred embodiment the under surface 2134 of the block 2124 has a radius of curvature R6 of about 2 3/16" and the block 2124 has a width of 1.5". In one embodiment, the width W7 of the horizontal portion of the block 2124 is between about ¾" and about 1.5". In a preferred embodiment, the width W7 of the horizontal portion of the block 2124 is about 1⅛". Additionally, the width W8 of the cleat 2104C from the trailing edge 2150 to the most forward extending portion of the article supporting surface 2108 is between about 1" and about 2.5" in one embodiment. In a preferred embodiment, the width W8 of the cleat 2104C from the trailing edge 2150 to the most forward extending portion of the article supporting surface 2108 is about 1 13/16".

The block can have a flat or a curved upper surface 2132. In one embodiment, the height H2 of the block 2124 (i.e., from the under surface 2134 to the upper surface 2132) is between about ¼" and about 1.0". In a preferred embodiment, the height H2 of the block 2124 (i.e., from the under surface 2134 to the upper surface 2132) is about 7/16". The outer edge of the block 2124 can have a square corner or a rounded corner. In one embodiment, the radius of curvature R5 of the corner of the block 2124 is between about 1/16" and about ½". In a preferred embodiment, the radius of curvature R5 of the corner of the block 2124 is about ¼".

In some embodiments, the cleat 2104C also has an upright section 2106, which may be curved or substantially straight. The upright section 2106 has a back side 2126 (i.e., the side facing away from the article conveyed) and an article-supporting face 2108 positioned opposite the back side 2126. In one embodiment, the article-supporting face 2108 has a smaller radius of curvature R3 than the radius of curvature R2 of the back side 2126. Thus, the radius of curvature R3 of the article-supporting face 2108 may be between about 3" and about 5" and the radius of curvature R2 of the back side 2126 may be between about 2" and about 4" in some embodiments. In a preferred embodiment, the radius of curvature R3 of the article-supporting face 2108 is about 4⅛" and the radius of curvature R2 of the back side 2126 is about 2 11/16". The back side 2126 can be interconnected to the upper surface 2132 of the block 2124 via a radius of curvature R4. The radius of curvature R4 can be between about ⅛" and about ½" in some embodiments. In a preferred embodiment, the radius of curvature R4 is about ¼". The cleat 2104C also has a top 2112 and sides 2114. In one embodiment, the height H1 from the under surface 2134 to the top of the top 2112 is between about 1" and about 3". In a preferred embodiment, the height H1 from the under surface 2134 to the top of the top 2112 is about 2". In one embodiment, the length L1 from one side 2114 to the other side is between about 4" and about 8". In a preferred embodiment, the length L1 from one side 2114 to the other side is about 6". Additionally, the top 2112 may be flat or curved. In one embodiment, the radius of curvature R1 of the top 2112 is between about 1/16" and about ½". In a preferred embodiment, the radius of curvature R1 of the top 2112 is about ⅛". Further, the width or thickness W9 of the upper portion of the upright section 2106 is between about ⅛" and about ½". In one embodiment, the width or thickness W9 of the upper portion of the upright section 2106 is about ¼".

In one embodiment, the holes 2102 are positioned a distance W3 from the edge of the block 2124, where the distance W3 is between about ¼" and about 1". In a preferred embodiment, the holes 2102 are positioned a distance W3 from the edge of the block 2124, where the distance W3 is about 9/16". Additionally, the holes 2102 are positioned a distance W4, W5 from the side 2106, where the distance W4, W5 is between about ¼" and about 1". In a preferred embodiment, the holes 2102 are positioned a distance W4, W5 from the side 2106, where the distance W4, W5 is between about 9/16".

Figure 26:
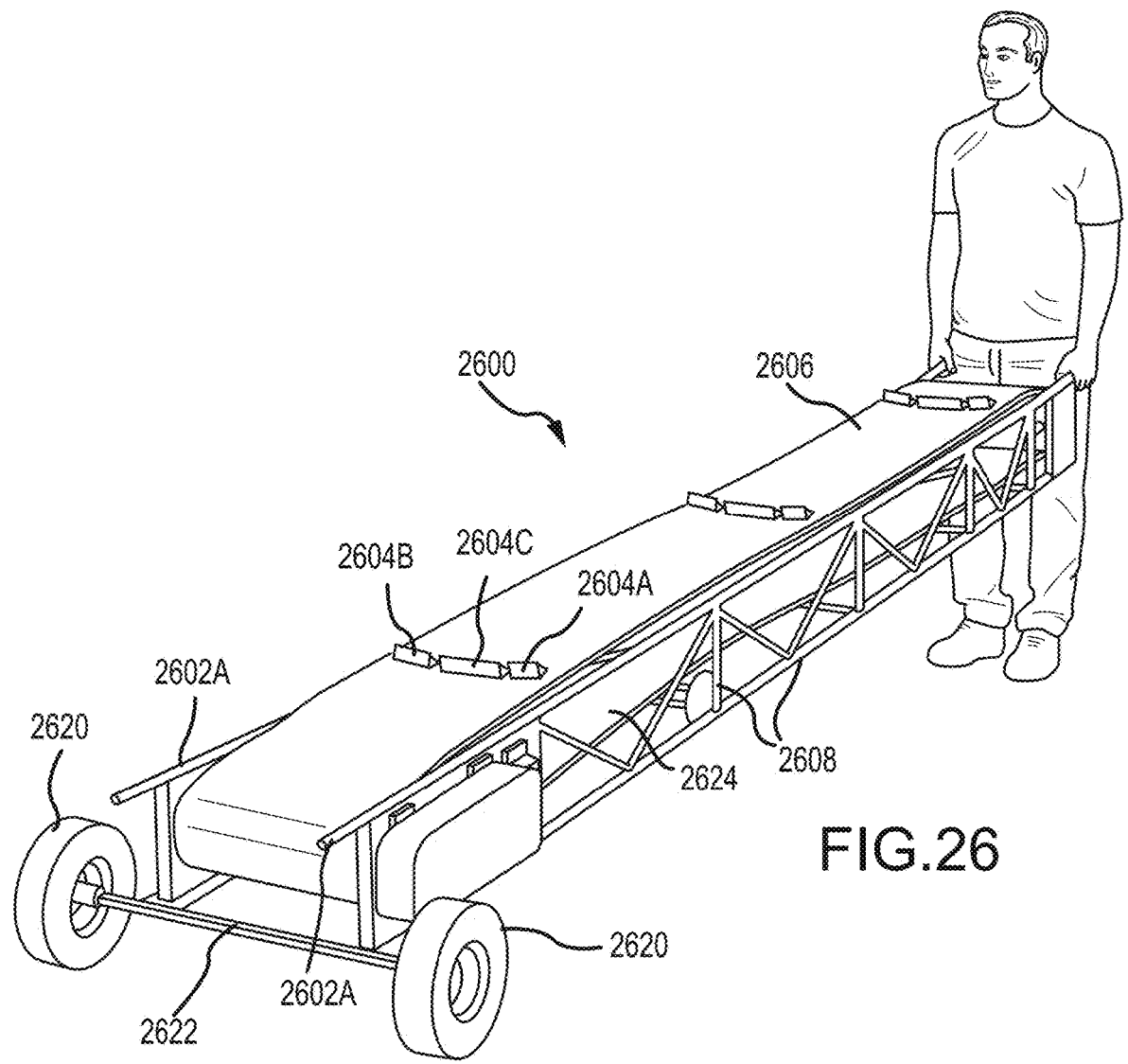
FIG. 26 shows a person moving one embodiment of the conveyor.
Figure 27:
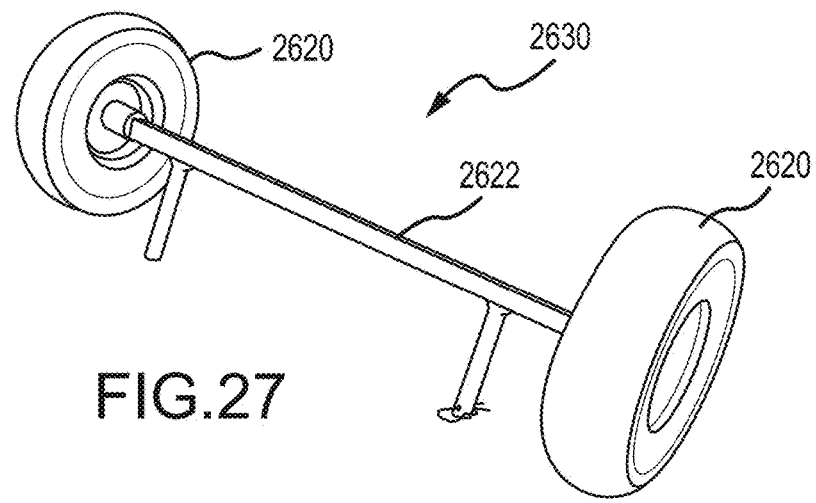
FIG. 27 shows a dolly for interconnection to and use with a conveyor system.

FIG. 26 shows a person moving the conveyor 2600. The conveyor 2600 comprises a belt 2606, a plurality of cleats 2604A, 2604B, 2604C, support bars 2608 forming a frame or structure, a dolly with an axel 2622 and wheels 2620, and handles 2602A. The conveyor 2600 can comprise upper handles (being held by the person) and lower handles 2602A. The upper end is also called an idle end herein. Further, the plurality of cleats 2604A, 2604B, 2604C can comprise multiple groups of three cleats 2604A, 2604B, 2604C spaced apart from the next group of three cleats a predetermined distance based on the articles being conveyed. The frame may be metal or any other material known in the art. The belt can comprise one or more seams. The handles 2602A and dolly allow a person to move the conveyor 2600 easily. FIG. 27 shows the dolly 2630 comprising an axel 2622 and wheels 2620.

Figure 28:
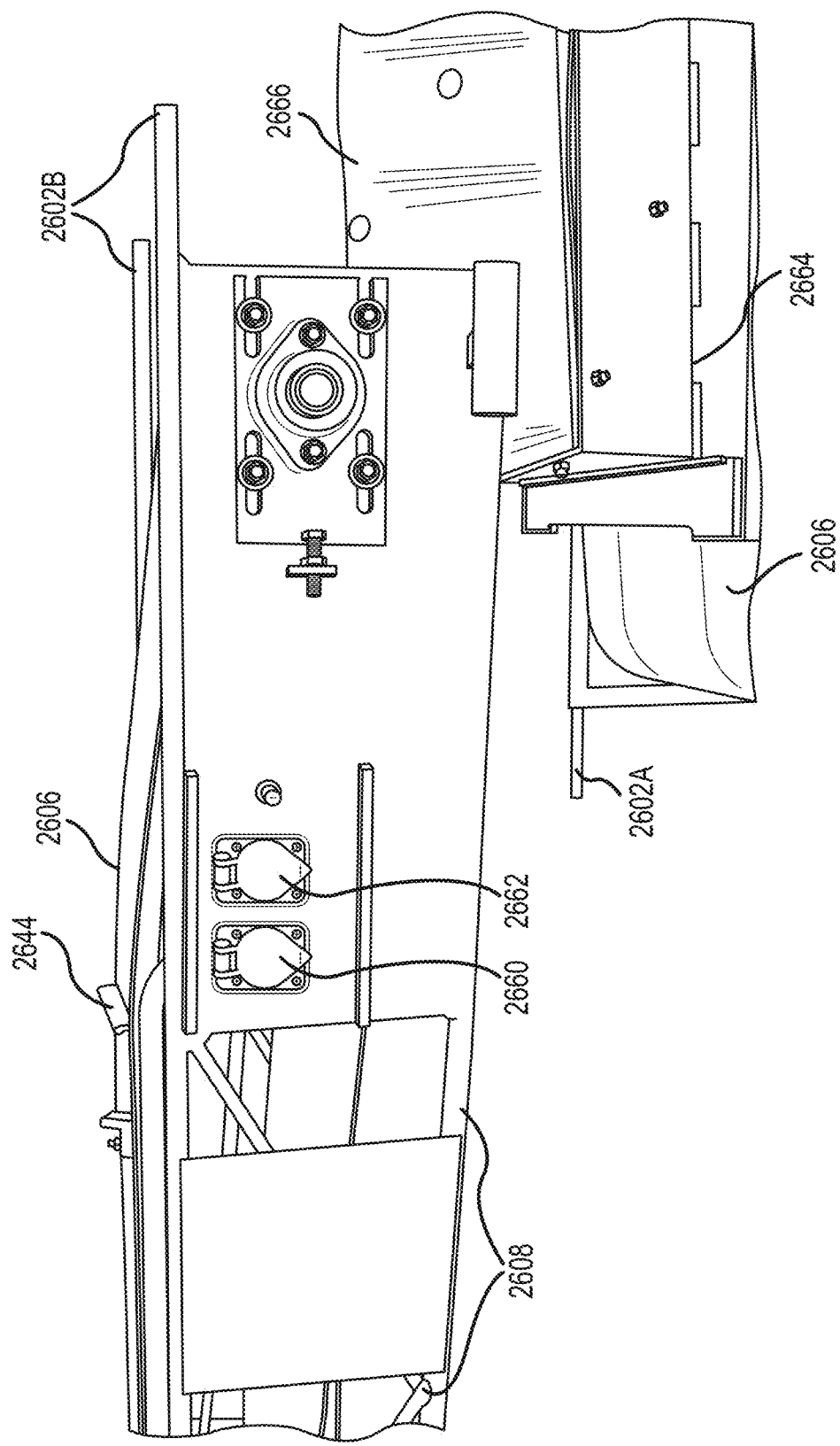
FIG. 28 is a side view of two conveyors interconnected to one another.

FIG. 28 is a side view of two conveyors interconnected to one another. The upper conveyor comprises a belt 2606 and at least one cleat 2644, a pair of cleats 2644, or a group of cleats 2644. The belt 2606 can be raised above an upper portion of the support bars 2608 and frame for at least a portion of the length of the conveyor. The conveyor also comprises upper handles 2602B and an electrical inlet 2660 and an electrical outlet 2662. The lower conveyor comprises handles 2602A, a belt 2606, and a receiving hopper 2664 with an inner surface 2666. The receiving hopper 2664 can have three sides to help funnel conveyed items and material (especially loose material like dirt or stones) onto the conveyor belt 2606.

Figure 29:
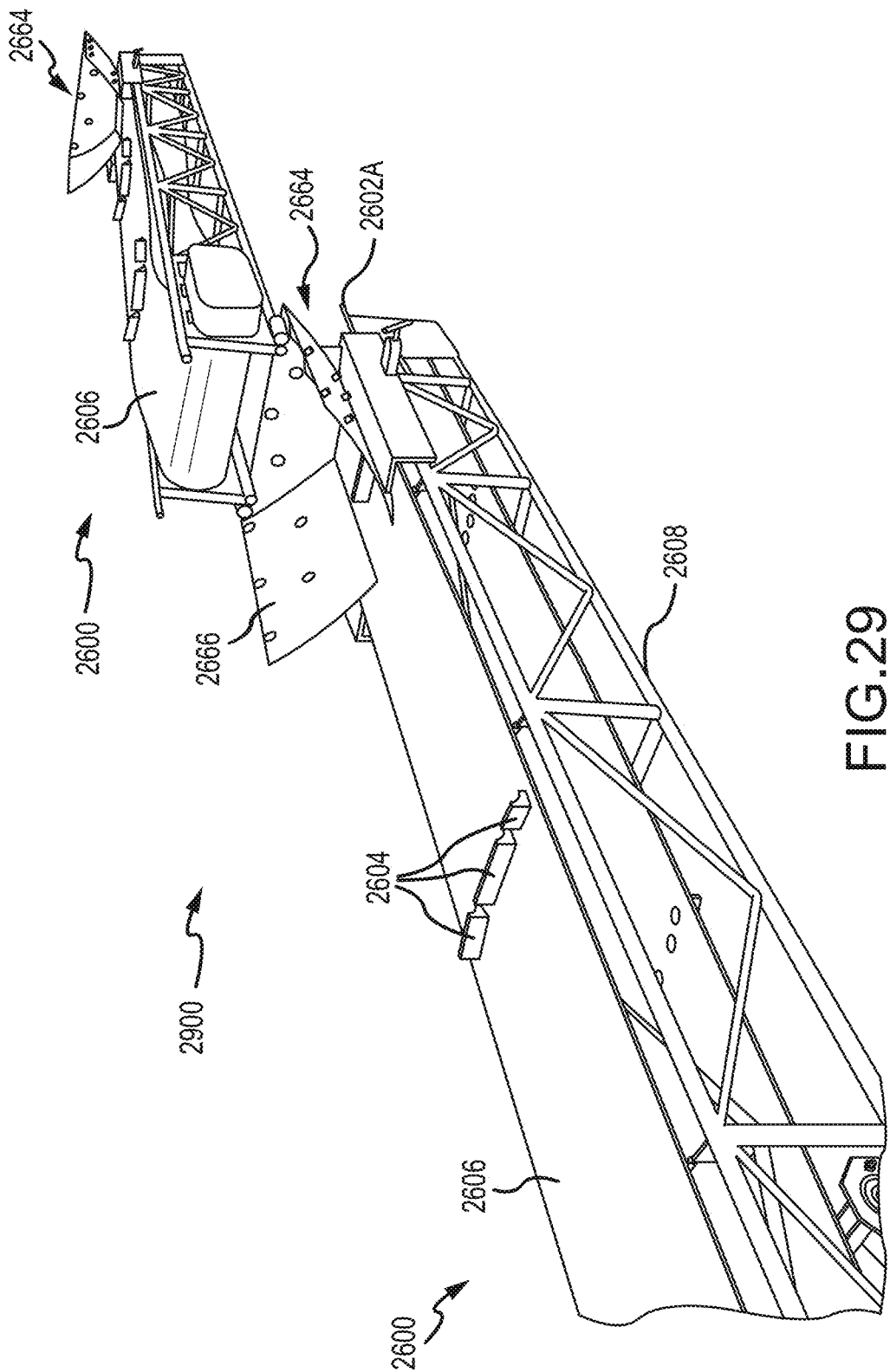
FIG. 29 is a second embodiment of a system of conveyors.

FIG. 29 is a second embodiment of a system 2900 of conveyors 2600. Each conveyor 2600 comprises a belt, a plurality of cleats 2604, support bars 2608 forming a support frame, handles 2602A, and a receiving hopper 2664 with an inner funnel-shaped portion 2666.

Figure 30:
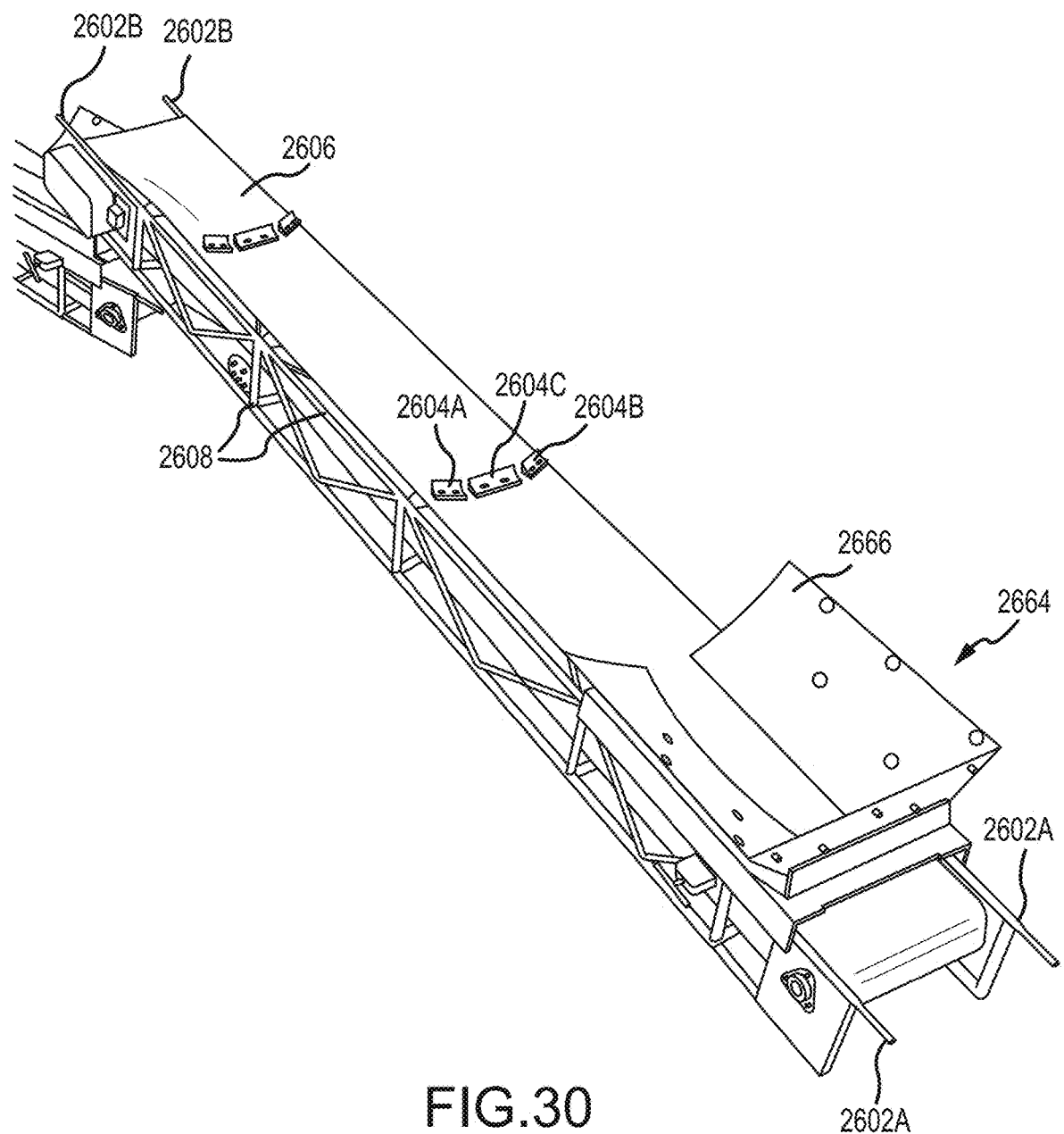
FIG. 30 shows one embodiment of a first conveyor resting on an upper end on a second conveyor.

FIG. 30 shows one embodiment of a first conveyor resting on an upper end on a second conveyor. The first conveyor comprises a belt 2606, support bars 2608 forming a support frame, a plurality of cleats 2604, a receiving hopper 2664, and handles 2602A, 2602B. The handles can include one or more upper handles 2602B and one or more lower handles 2602A. The receiving hopper 2664 has an inner surface 2666 for funneling items onto the conveyor belt 2606. The plurality of cleats 2604 may comprise multiple groups of cleats, where each group of cleats comprises a left cleat 2604A, a right cleat 2604B, and a center cleat 2604C.

Figure 31:
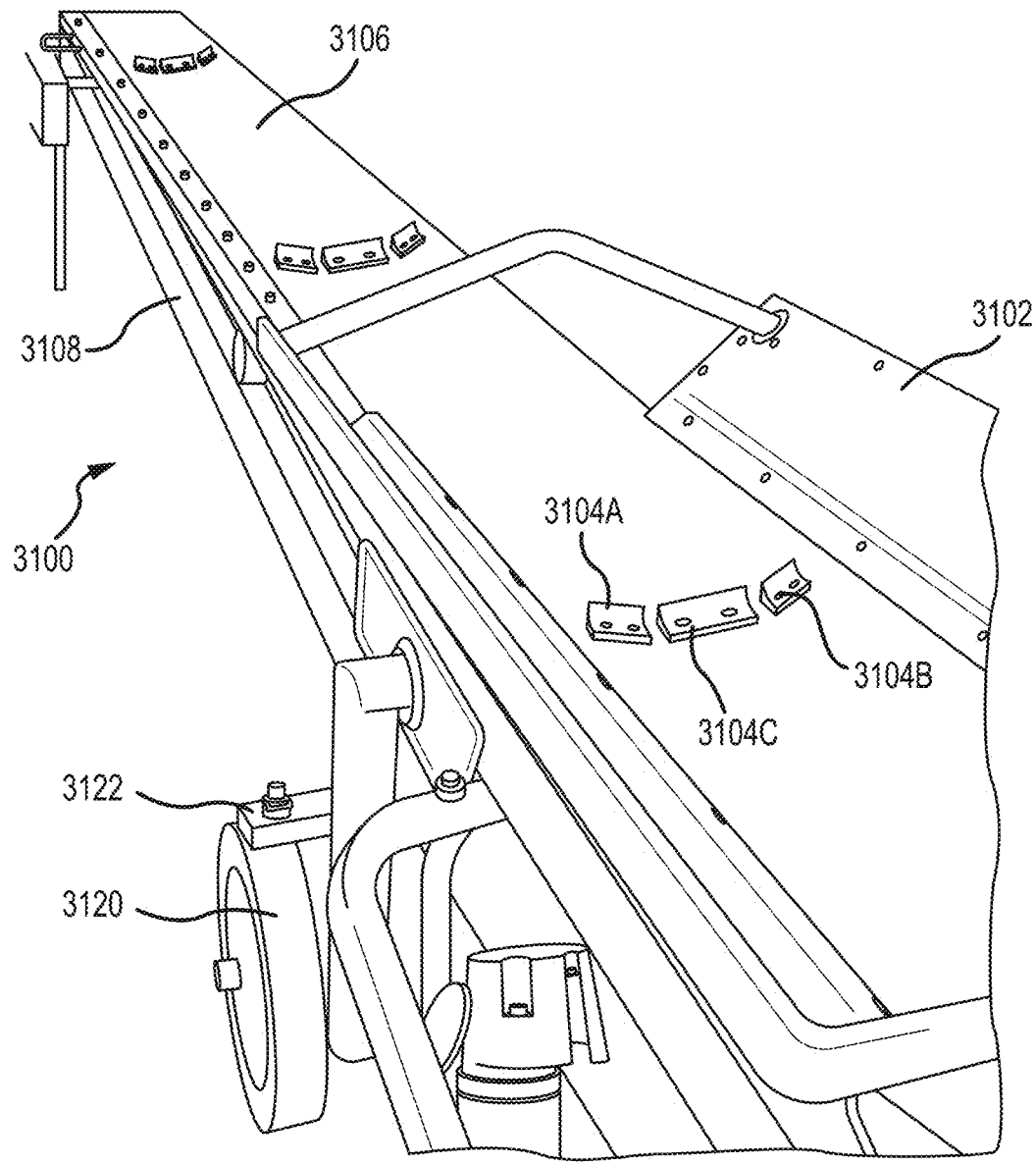
FIG. 31 shows a second embodiment of a conveyor.

FIG. 31 shows a second embodiment of a conveyor 3100. The conveyor 3100 comprises a belt 3106, a support frame 3108, a plurality of cleats 3104, a receiving hopper 3102, and a dolly with legs 3122 and wheels 3120. The receiving hopper 3102 funnels items onto the conveyor belt 3106. The plurality of cleats 3104 may comprise multiple groups of cleats, where each group of cleats comprises a left cleat 3104A, a right cleat 3104B, and a center cleat 3104C.

Figure 32:
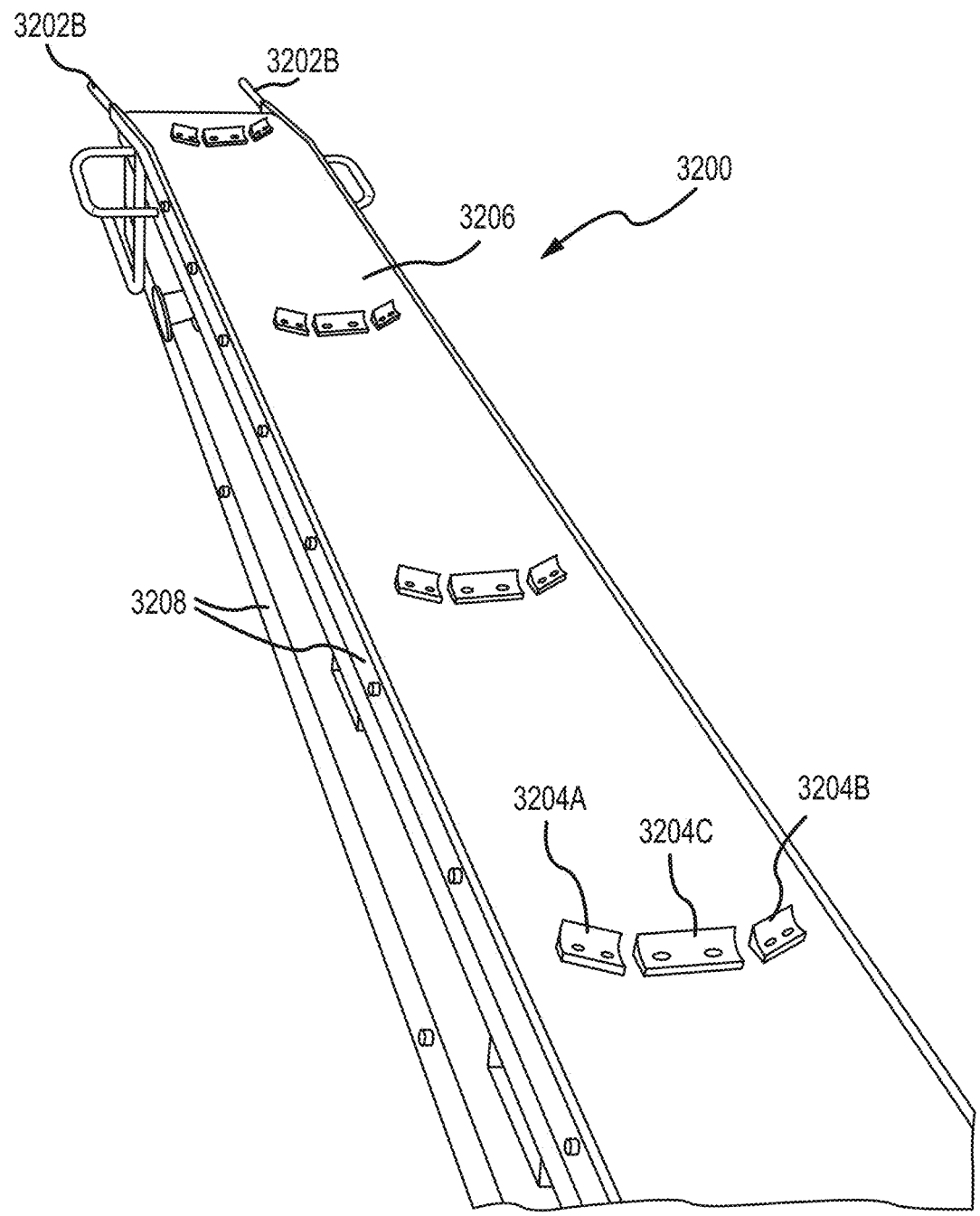
FIG. 32 shows a third embodiment of a conveyor.

FIG. 32 shows a third embodiment of a conveyor 3200. The conveyor 3200 comprises a belt 3206, a support frame 3208, a plurality of cleats 3204, and handles 3202B. The conveyor 3200 can further include one or more lower handles (not shown) that look and perform similar to the upper handles 3202. The plurality of cleats 3204 may comprise multiple groups of cleats, where each group of cleats comprises a left cleat 3204A, a right cleat 3204B, and a center cleat 3204C.

Figure 33:
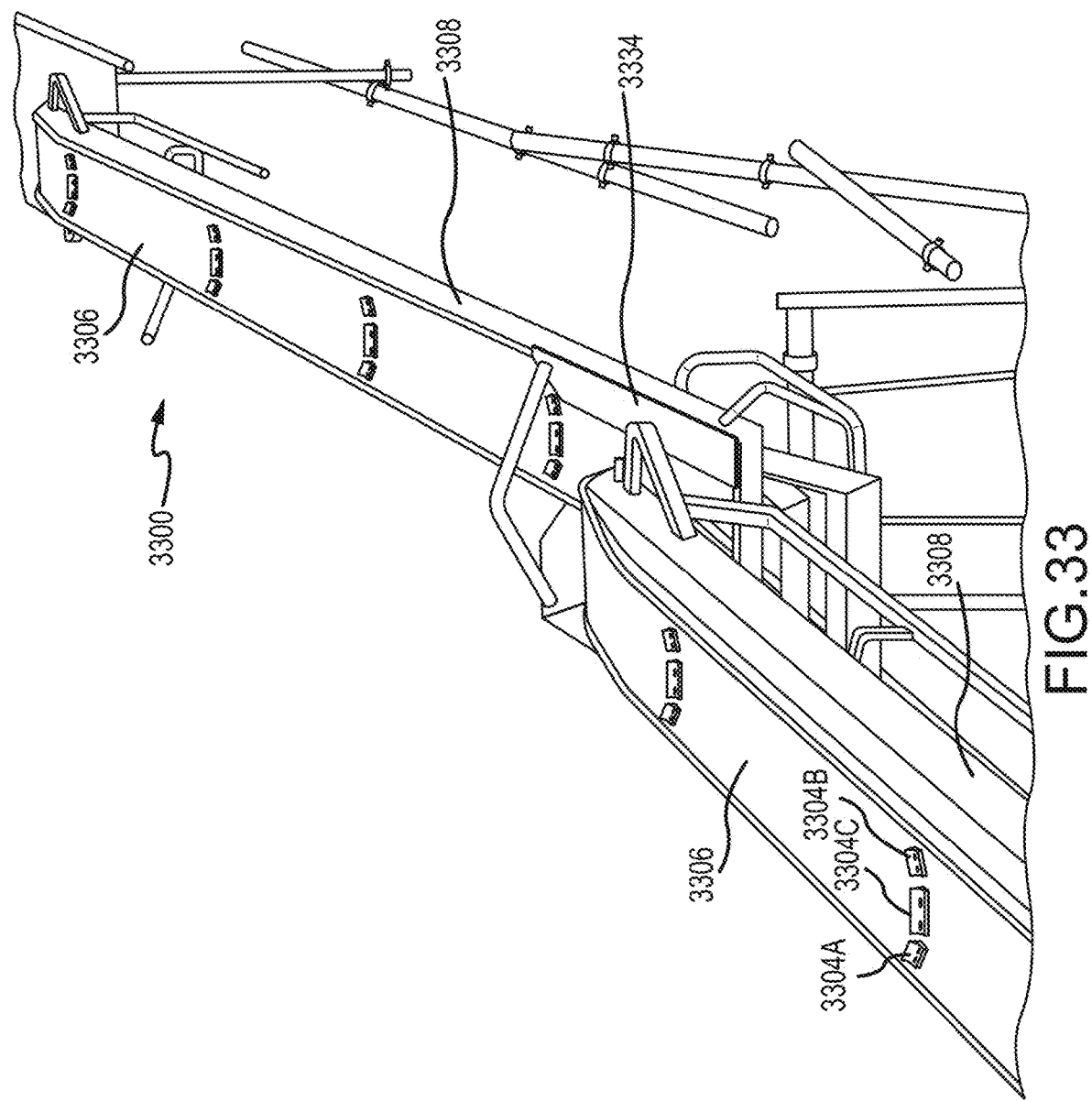
FIG. 33 shows a third embodiment of a conveyor system comprising two or more conveyors.

FIG. 33 shows a third embodiment of a conveyor system 3300 comprising two or more conveyors. Each conveyor in the system 3300 comprises at least one of a belt 3306, a support frame 3308, a plurality of cleats 3304, and a receiving hopper 3334. The conveyors can further include one or more handles. The plurality of cleats 3304 may comprise multiple groups of cleats, where each group of cleats comprises a left cleat 3304A, a right cleat 3304B, and a center cleat 3304C. The cleats 3304A, 3304B, 3304C can be shaped similar to any of the cleats disclosed herein.

Figure 34:
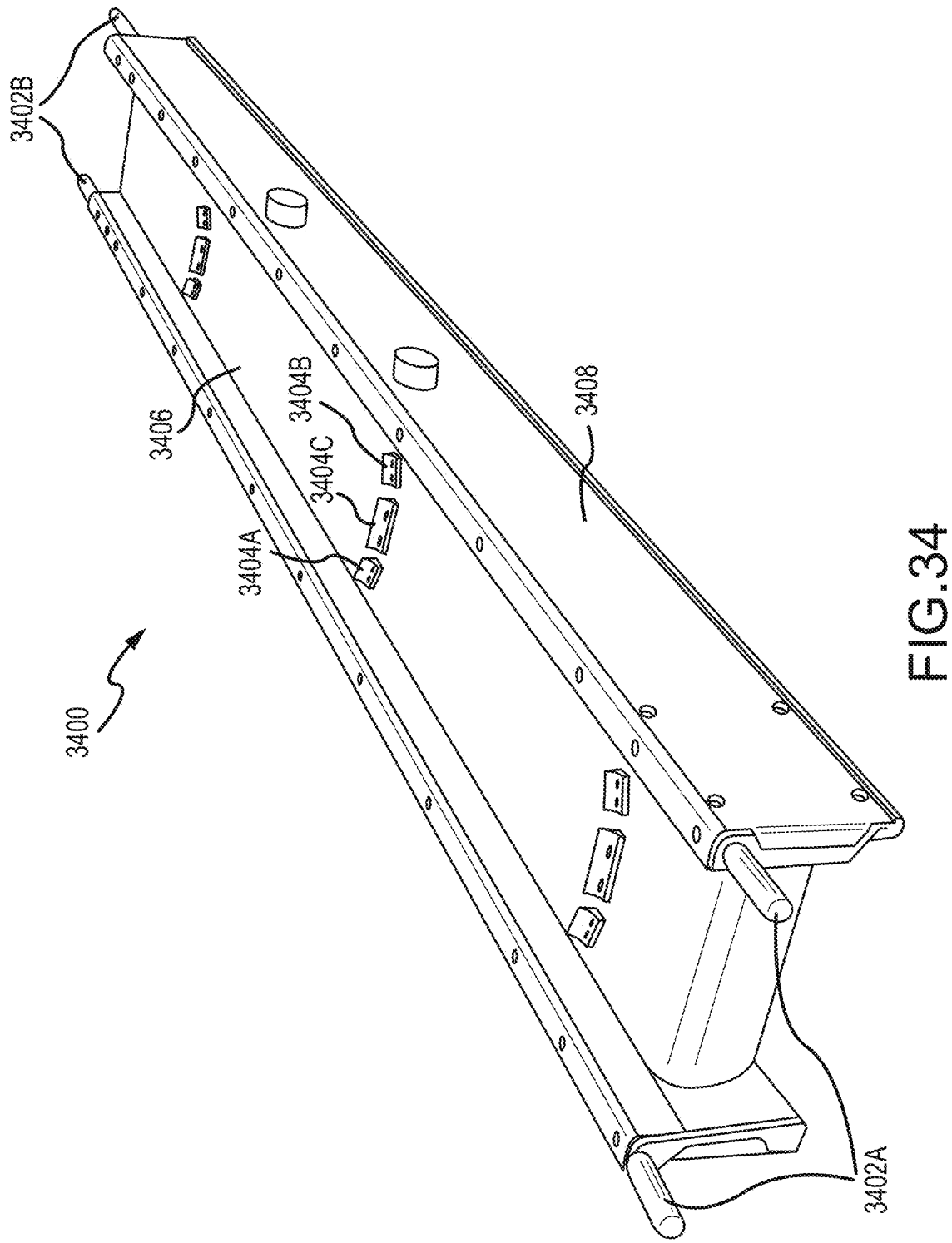
FIG. 34 shows another embodiment of a conveyor.

FIG. 34 shows another embodiment of a conveyor 3400. The conveyor 3400 comprises a belt 3406, a support frame 3408, a plurality of cleats 3404, and handles 3402. The conveyor 3400 can further include a hopper (not shown) that looks and performs similar to the hoppers disclosed herein. The plurality of cleats 3404 may comprise multiple groups of cleats, where each group of cleats comprises a left cleat 3404A, a right cleat 3404B, and a center cleat 3404C, each interconnected to the belt 3406 via bolts or other securing mechanisms. The handles 3402 may comprise lower handles 3402A and upper handles 3402B, which are similar to other handles disclosed herein.

Figure 35:
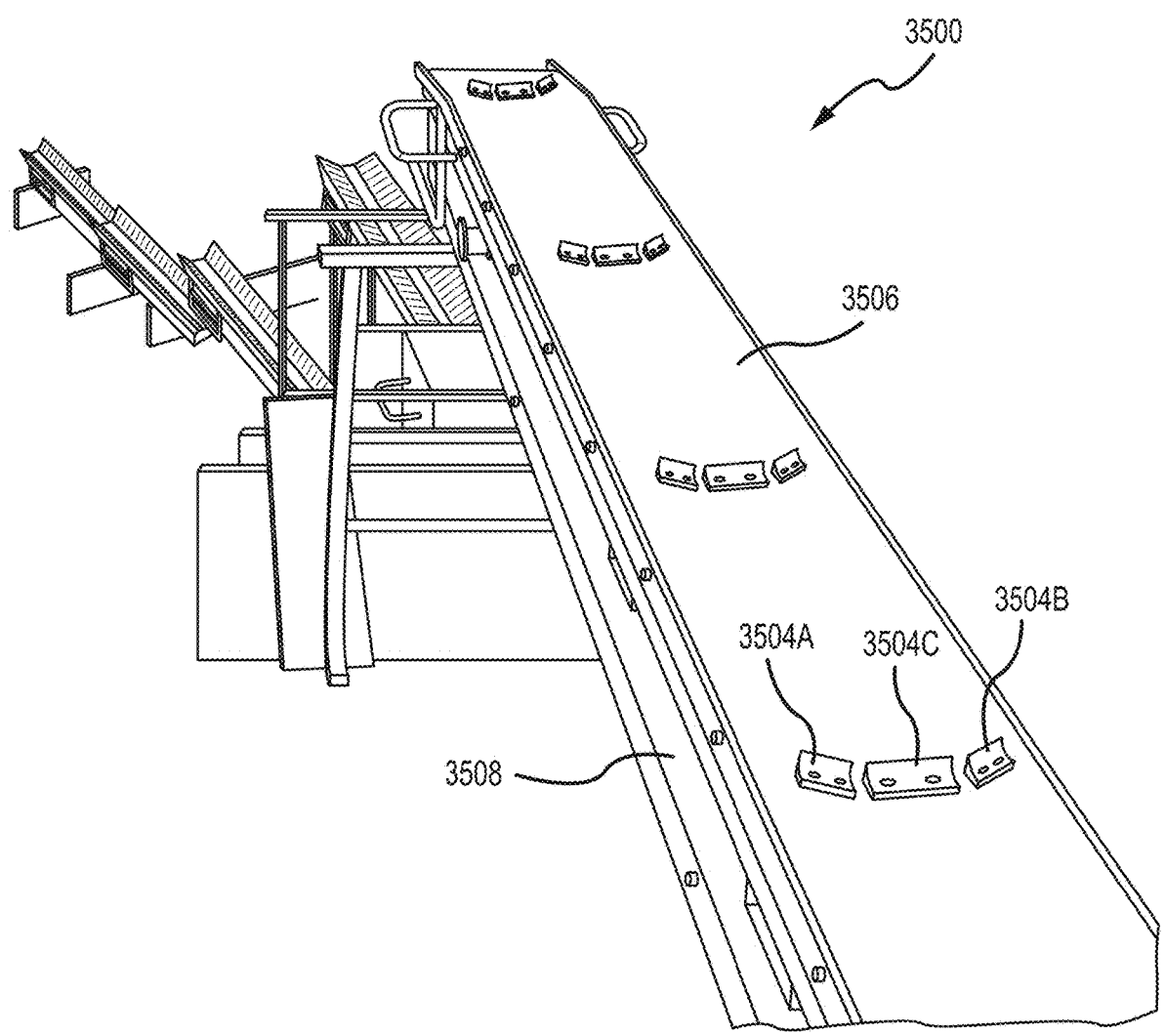
FIG. 35 shows a fourth embodiment of a conveyor system.

FIG. 35 shows a fourth embodiment of a conveyor system 3500 comprising multiple conveyors. Each conveyor in the system 3500 comprises at least one of a belt 3506, a support frame 3508, a plurality of cleats 3504, and a receiving hopper. The conveyors can further include one or more handles. The plurality of cleats 3504 may comprise multiple groups of cleats, where each group of cleats comprises a left cleat 3504A, a right cleat 3504B, and a center cleat 3504C. The cleats 3504A, 3504B, 3504C can be shaped similar to any of the cleats disclosed herein.

Figure 36:
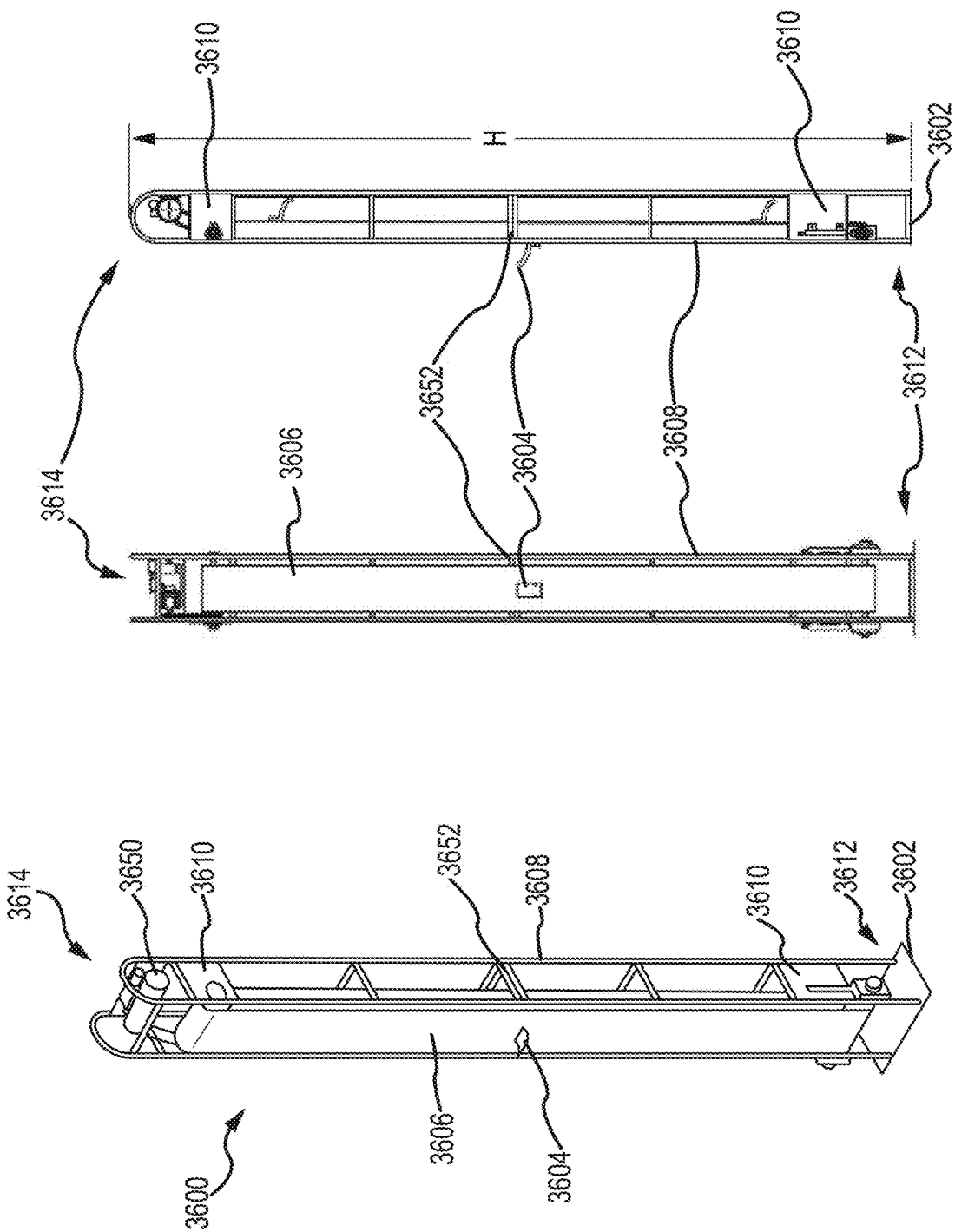
FIGS. 36A-C show an embodiment of a straight vertical tire conveyor.

FIGS. 36A-C show an embodiment of a straight vertical tire conveyor ("VTC") 3600, where FIG. 36A is a perspective view, FIG. 36B is a front view, and FIG. 36C is a side view of the straight vertical tire conveyor 3600. The VTC 3600 has a bottom end 3612, which is the idle end in some embodiments, and a top end 3614, which is the drive end in some embodiments. The drive end 3614 comprises a motor 3650 positioned within the frame 3608. The VTC 3600 comprises a frame 3608 with a stand 3602 on the bottom end 3612, side panels 3610 proximate the top and bottom ends 3614, 3612, and double bars 3652 proximate the center of the frame 3608. The conveyor 3600 has a belt 3606 and cleats 3604 interconnected to the belt 3606.

In various embodiments, the conveyor 3600 has a height H of about 14 ft. In other embodiments, the height H of the conveyor 3600 is between about 10 ft. and about 20 ft. In some embodiments, the belt 3606 is about 10" wide and the cleats are about 5" high/tall. However, in other embodiments, the belt 3606 is between about 8" and about 20" wide and the cleats are between about 4" and about 8" high/tall. If the belt 3606 is about 10" wide, then the diameter of the drive pulley is about 4.5" and the diameter of the tail pulley is about 4". However, other diameters can be used, especially with wider or narrower belts. In some embodiments, the motor 3650 is a ¼ hp Bison gearmotor.

Figure 37:
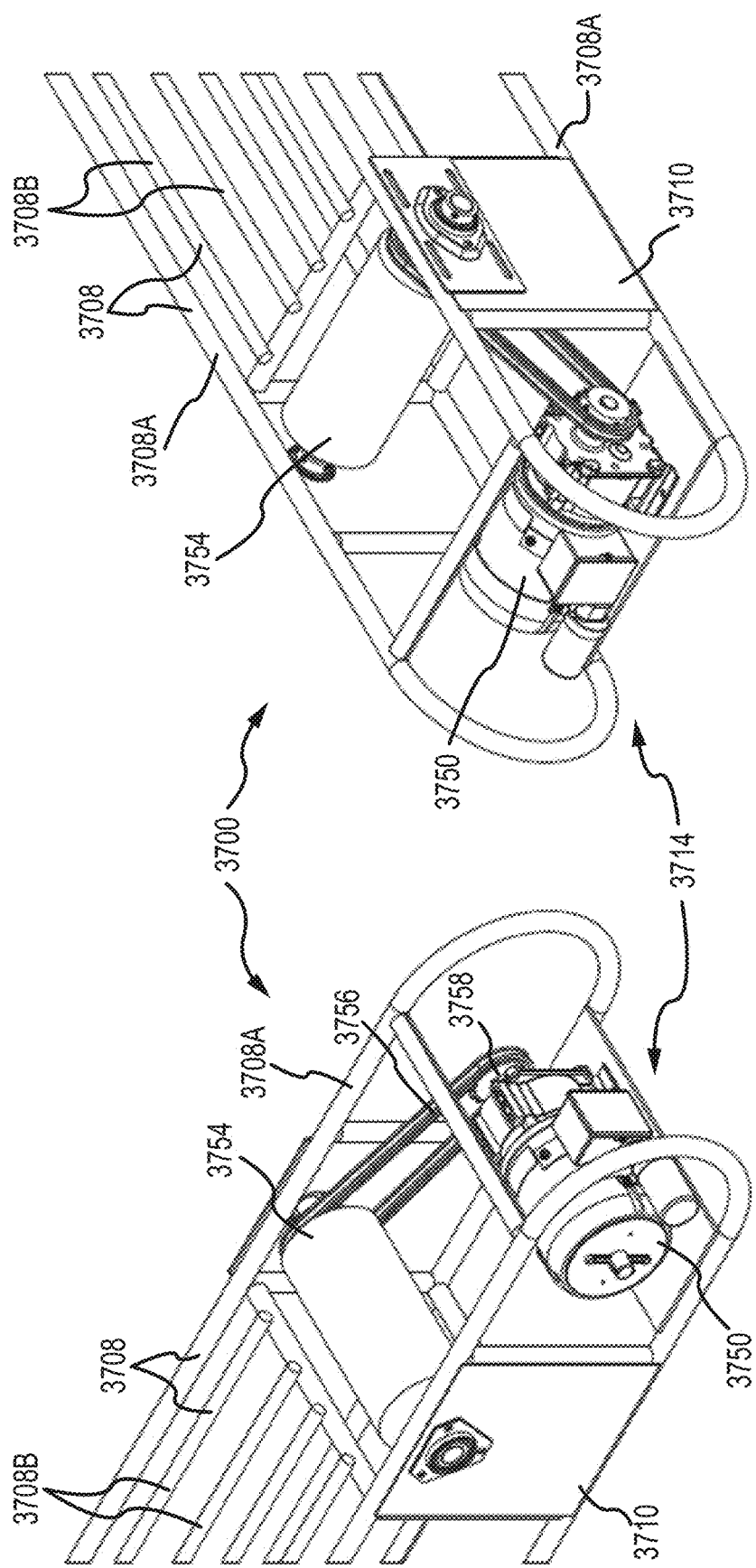
FIGS. 37A-B show the drive end of a conveyor (without the belt) according to embodiments of the present invention.
Figure 38:
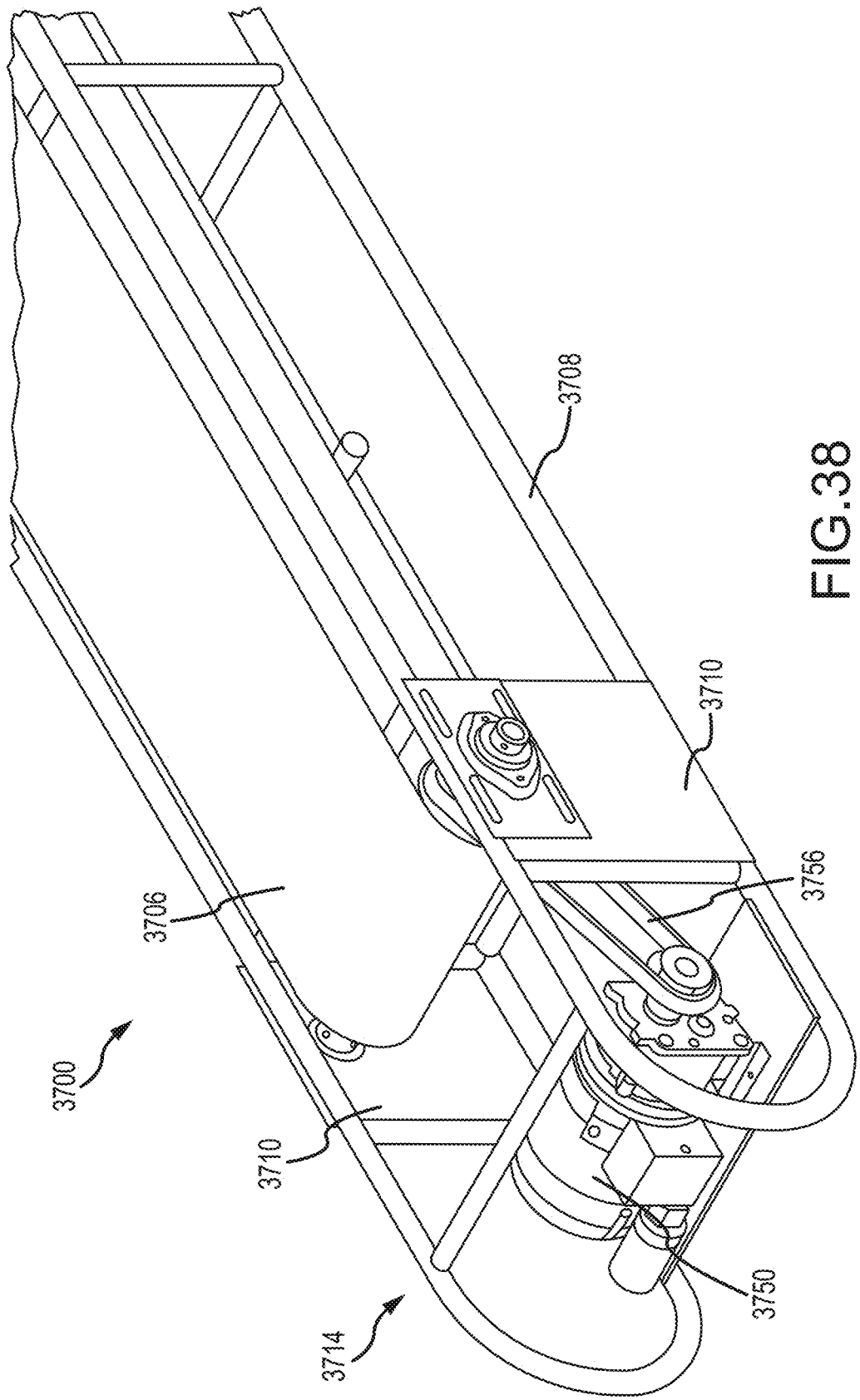
FIG. 38 shows the drive end of a conveyor (with the belt) according to embodiments of the present invention.

FIGS. 37A-B show the drive end 3714 of a conveyor 3700 (without the belt) according to embodiments of the present invention, where FIG. 37A is a right front perspective view of the drive end 3714 and FIG. 37B is a left front perspective view of the drive end 3714. In some embodiments, the drive end 3714 is the top end of the conveyor 3700. FIG. 38 shows the drive end 3714 of the conveyor 3700 with the belt 3706.

The drive end 3714 comprises the motor 3750, which is interconnected to the drive pulley 3754 via a roller chain 3756 and sprockets 3758. In some embodiments, the conveyor 3700 has a fractional horsepower Bison in-line gearmotor and speed reducer combination. A Bison in-line gearmotor is preferred when the motor 3650 and drive assembly are enclosed in the frame 3708. In some embodiments, an in-line gearmotor and speed reducer combination is used in the straight VTC 3700. However, this in-line gearmotor and speed reducer combination could be used in any conveyor described herein.

The belt 3706 is interconnected to and rotates around the drive pulley 3754. The frame 3708 includes side panels 3710 proximate the drive end 3714. Additionally, the frame 3708 has side bars 3708A, which have a larger diameter and provide much of the frame support, and top bars 3708B, which have a smaller diameter and support the conveyor belt 3706. In this embodiment, the electric gearmotor 3750, roller chain 3756, and sprockets 3758 are fully contained within the conveyor frame 3708.

Figure 40:
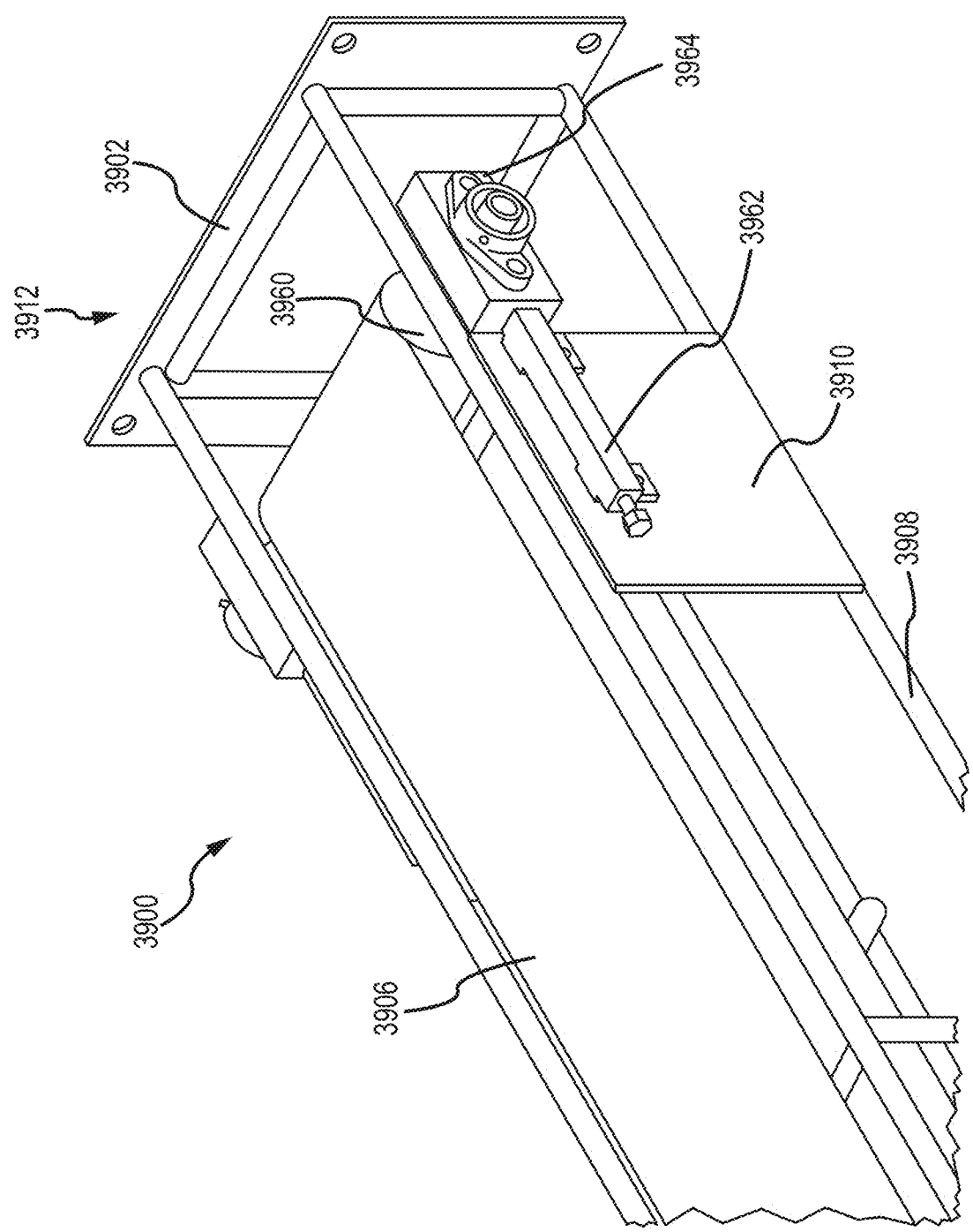
FIG. 40 shows the idle end of a conveyor (with the belt) according to embodiments of the present invention.

FIGS. 39A-B show the idle end 3912 of a conveyor 3900 (without the belt) according to embodiments of the present invention, where FIG. 39A is a left front perspective view of the idle end 3912 and FIG. 39B is a left rear perspective view of the idle end 3912. In some embodiments, the idle end 3912 is the bottom end of the conveyor 3900. FIG. 40 shows the idle end 3912 of the conveyor 3900 with the belt 3906. The idle end 3912 comprises the tail pulley 3960 and two conveyor belt take-up adjustments 3962, 3964 (one on each side and each is comprised of a first portion 3962 and a second portion 3964) interconnected to the belt and the tail pulley 3960. Thus, there is a take-up adjustment 3962, 3964 located on both sides of the conveyor belt tail pulley 3960. A hex nut 3963 is welded to the end of an all-thread adjustment screw, which is drawn-in all the way into a square tube 3962. As the screw is drawn-in or out, it moves the rectangular component 3964 to the right or left to tension or loosen the conveyor belt. The two-bolt bearing flange for the shaft is bolted to the rectangular component 3964 of the belt take-up adjustment. In some embodiments, the rectangular component 3964 of the belt take-up adjustment is closer to the end 3912 of the conveyor 3900 than shown in FIGS. 39A-B.

The idle end 3912 also includes a stand 3902 and side panels 3910 interconnected to the frame 3908. The frame 3908 has side bars 3908A, which have a larger diameter and provide much of the frame support, and top bars 3908B, which have a smaller diameter and support the conveyor belt 3906.

Figure 41:
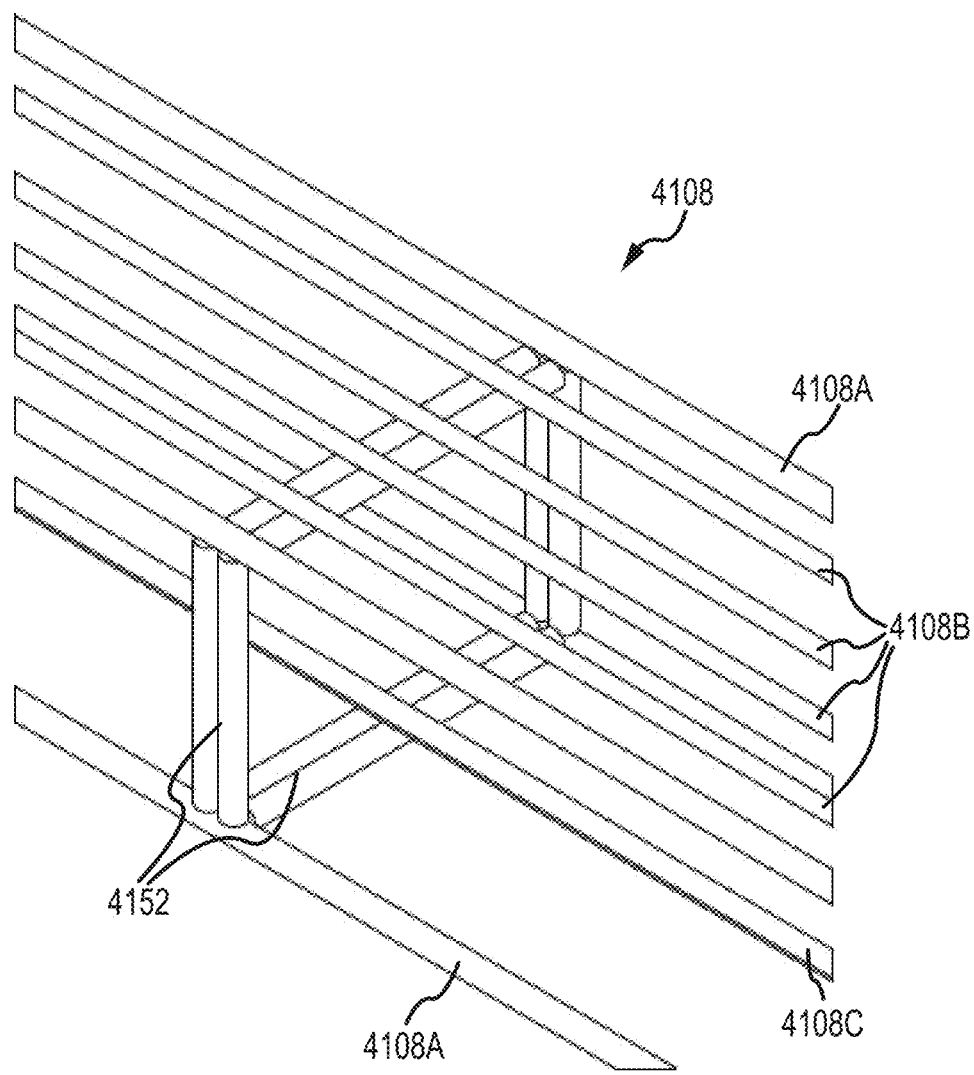
FIG. 41 is a perspective view of a center portion of a conveyor frame according to embodiments of the present invention.

FIG. 41 is a perspective view of a center portion of the conveyor frame 4108 according to embodiments of the present invention. This portion of the frame 4108 includes the double bars or double square element 4152, which allows the user to split the conveyor frame 4108 on-site if necessary due to space constraints. Thus, the user can cut the frame 4108 into two pieces by cutting the frame 4108 between the double square 4152 and each half will have one square or one piece of the tubes/bars. Then, the two frame pieces can be U-bolted back together to form one conveyor frame using U-bolts and fastening equipment. The double square bars 4152 are positioned substantially perpendicular to the frame's side bars 4108A, top bars 4108B, and lower bar 4108C. In some embodiments, the side bars 4108A have a larger diameter than the top bars 4108B and the lower bar 4108C.

Figure 42:
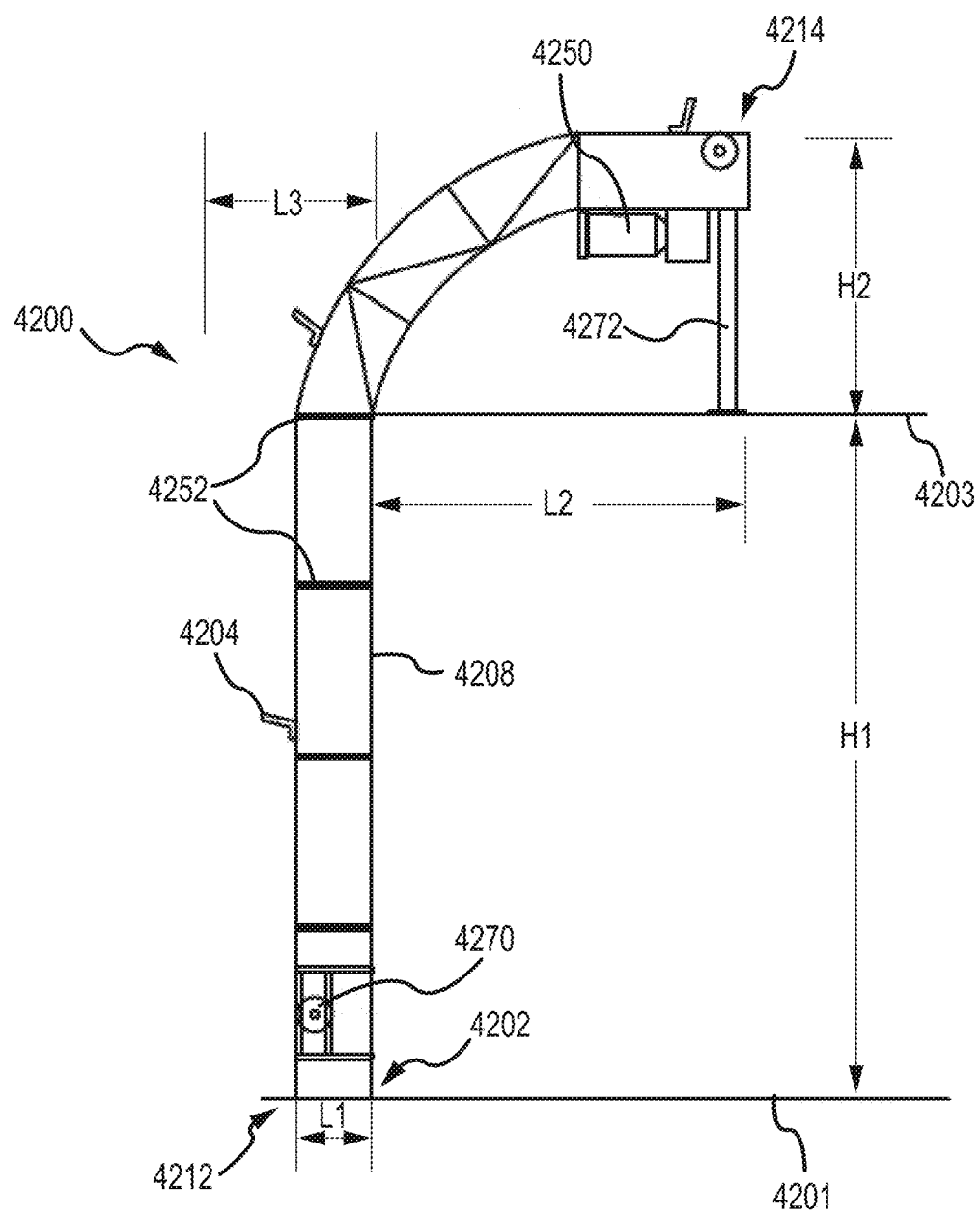
FIG. 42 shows one embodiment of a nose-over vertical tire conveyor.

FIG. 42 shows one embodiment of a nose-over vertical tire conveyor 4200. The VTC 4200 includes a frame 4208 a with a stand 4202, which may be a base plate bolted-down to the ground floor 4201, at the bottom end 4212. The frame 4208 may be comprised of high-strength steel tubing on approximately 60" centers, in some embodiments. The VTC 4200 extends from the ground floor 4201 to the mezzanine (or second) floor 4203. The height H1 between the ground floor 4201 and mezzanine floor 4203 can vary, but the embodiment shown contemplates a height H1 of about 10.0 ft, or between about 8.0 ft. and 14.0 ft.

The VTC 4200 has a belt (not visible in this view) with cleats 4204 interconnected thereto, a belt take-up adjuster, belt take-up adjustment frames 4270, a motor 4250, and an H-stand 4272. The belt can be between about 10" and about 20" wide. In a preferred embodiment, the belt is about 18" wide. The cleats 4204 can be any known cleats 4204, but are preferably between about 4" tall and 7" tall. In a preferred embodiment, the cleats are 6" high/tall urethane cleats that are bolted onto the belt.

The motor 4250 can be any known motor, but is a 15V motor in some embodiments. The motor 4250 may be interconnected to one or more roller chains, sprockets, and safety guards. The roller chains may be speed reducer roller chains in some embodiments. Thus, the roller chain transfers power between the speed reducer and the drive shaft positioned through the drive pulley, via sprockets. In some embodiments, the nose-over VTC 4200 has a right-angle speed reducer that is mounted under the conveyor frame at the top end 4214. In other embodiments, the nose-over VTC 4200 has an in-line motor and speed reducer mounted under the conveyor frame. However, either of these motors and speed reducers could be used in any conveyor described herein.

The H-stand 4272 positions the top end 4214 of the conveyor 4200 at the desired height H2 above the mezzanine floor 4203. In some embodiments, this height H2 is between about 2.0 ft. and about 5.0 ft. In a preferred embodiment, the height is about 4.0 ft. or about 4 ft. 1 in. The conveyor 4200 extends a length L2 horizontally along the mezzanine floor 4203. In some embodiments, this length L2 is between about 4 ft. and 7 ft. In a preferred embodiment, this length L2 is between about 5 ft. and about 6 ft. In a more preferred embodiment, this length L2 is about 5.5 ft.

The depth or length L1 of the conveyor can vary. In some embodiments, the length L1 is between about 10" and about 14". In a preferred embodiment, the length L1 is about 11⅛". The conveyor 4200 needs more floor space than the length L1 because it must accommodate the articles being conveyed and any hand rails added to the frame to protect and enclose the articles being conveyed. Thus, the length L3 is the amount of floor space needed by the VTC 4200. In some embodiments, the length L3 is between about 2 ft. and about 4 ft. In a preferred embodiment, the length L3 is about 30" (2.5 ft.). If an opening in the mezzanine floor 4203 is necessary for the conveyor 4200 to extend from the ground floor 4201 to the mezzanine floor 4203, then-assuming the hole has a rectangular shape—the opening should extend the length L3 in one direction and should be a few inches larger than the diameter of the largest conveyed tire or article in the other direction. The perimeter of an opening in the mezzanine floor 4203 should have a hand rail extending around the entire perimeter for safety reasons.

Similar to other conveyors described herein, the conveyor 4200 can be comprised of two sections bolted together at a double rail or double square portion 4252, which could be positioned at either location shown in FIG. 42. Having the conveyor frame 4208 be comprised of two pieces makes installation and transportation of the conveyor easier.

Figure 43A:
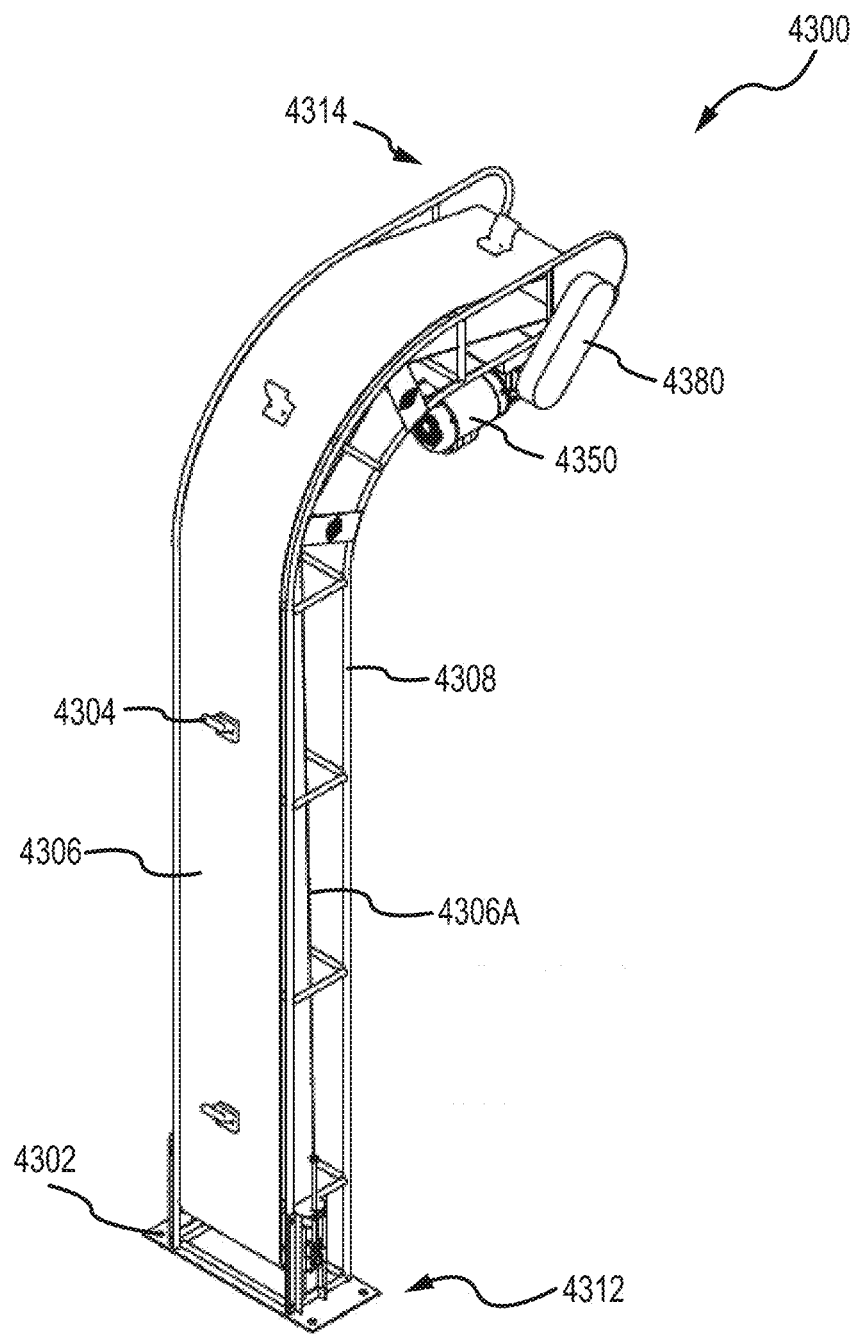
FIGS. 43A-B show another embodiment of a nose-over vertical tire conveyor.
Figure 43B:
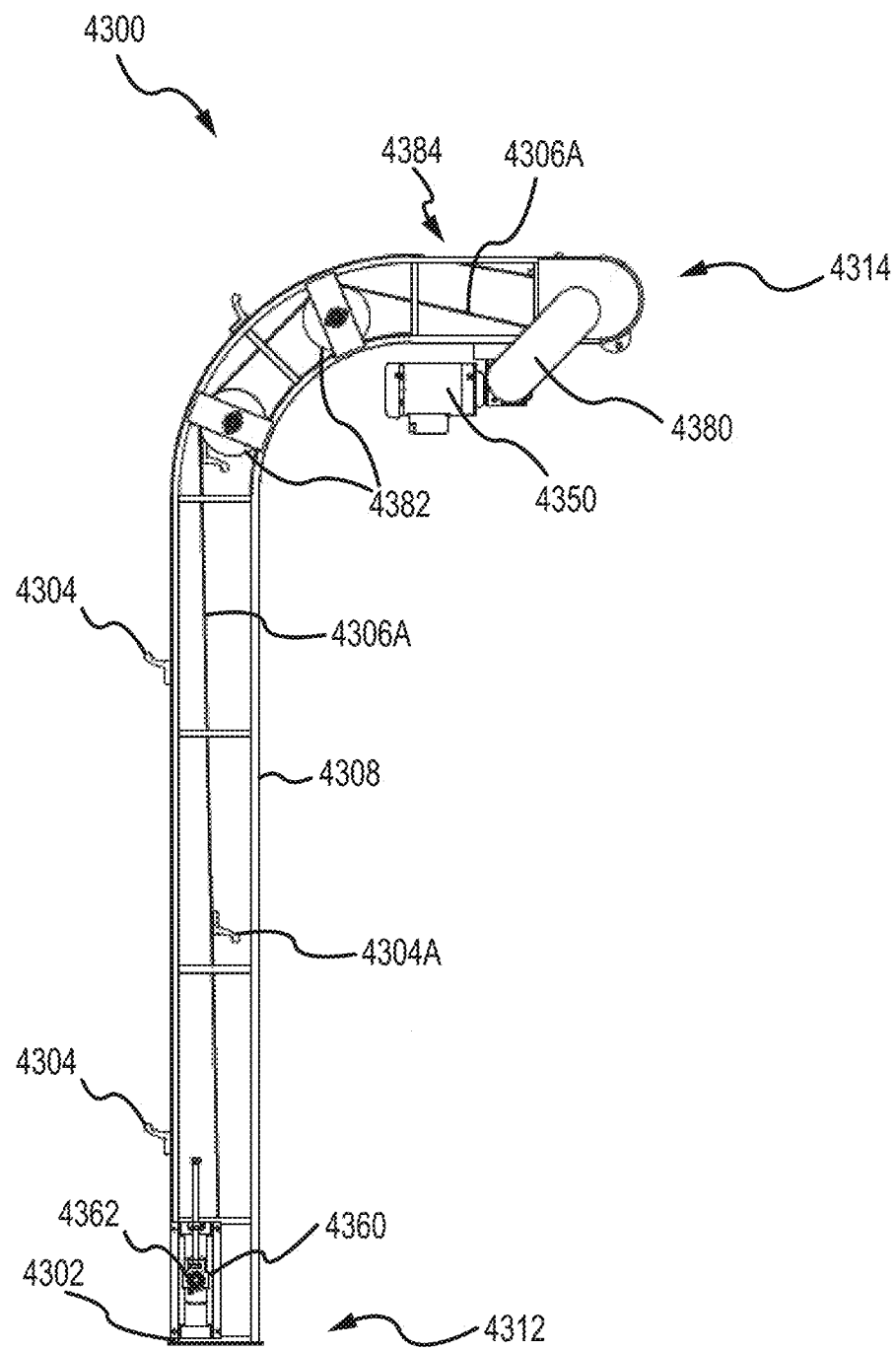

FIGS. 43A-B show another embodiment of a nose-over vertical conveyor 4300. FIG. 43A is a perspective view and FIG. 43B is a side view of the conveyor 4300. The conveyor 4300 comprises a frame 4308 and belt 4306 with cleats 4304. The bottom end 4312 is the idle end and the upper end 4314 is the drive end in this embodiment because the motor 4350 is positioned at the top drive end 4314. The motor 4350 is interconnected to the drive pulley via a roller chain or drive belt (not visible in this view) and sprockets. Thus, proximate the motor 4350 and covering the roller chain and sprockets is a guard 4380. The motor 4350 can be an electric motor and include a speed reducer in some embodiments. The motor can be positioned at the bottom end 4312 in other embodiments. The bottom end 4312 includes a stand 4302 that can be bolted to the floor. The idle pulley 4360 is positioned at the bottom idle end 4312 with the belt tension adjustment mechanism 4362.

The nose over conveyor 4300 also includes one or more belt return rollers 4382 to direct and guide the belt 4306 in the proper direction, i.e., around the 90° bend. In these views, the returning belt 4306A (i.e., the portion of the belt not conveying articles and moving from the drive end to the idle end) and the returning cleats 4304A (i.e., the cleats not conveying articles and moving from the upper end 4314 to the bottom end 4312) can be seen. Additionally, the horizontal portion 4384 of the conveyor 4300 is typically the portion positioned on the second floor or mezzanine. The horizontal portion 4384 may have the belt 4306 positioned at a downward angle relative to the horizontal plane in order to eject or drop conveyed articles (e.g., tires) off of the conveyor without a person having to take the article off of the conveyor 4300.

Figure 44:
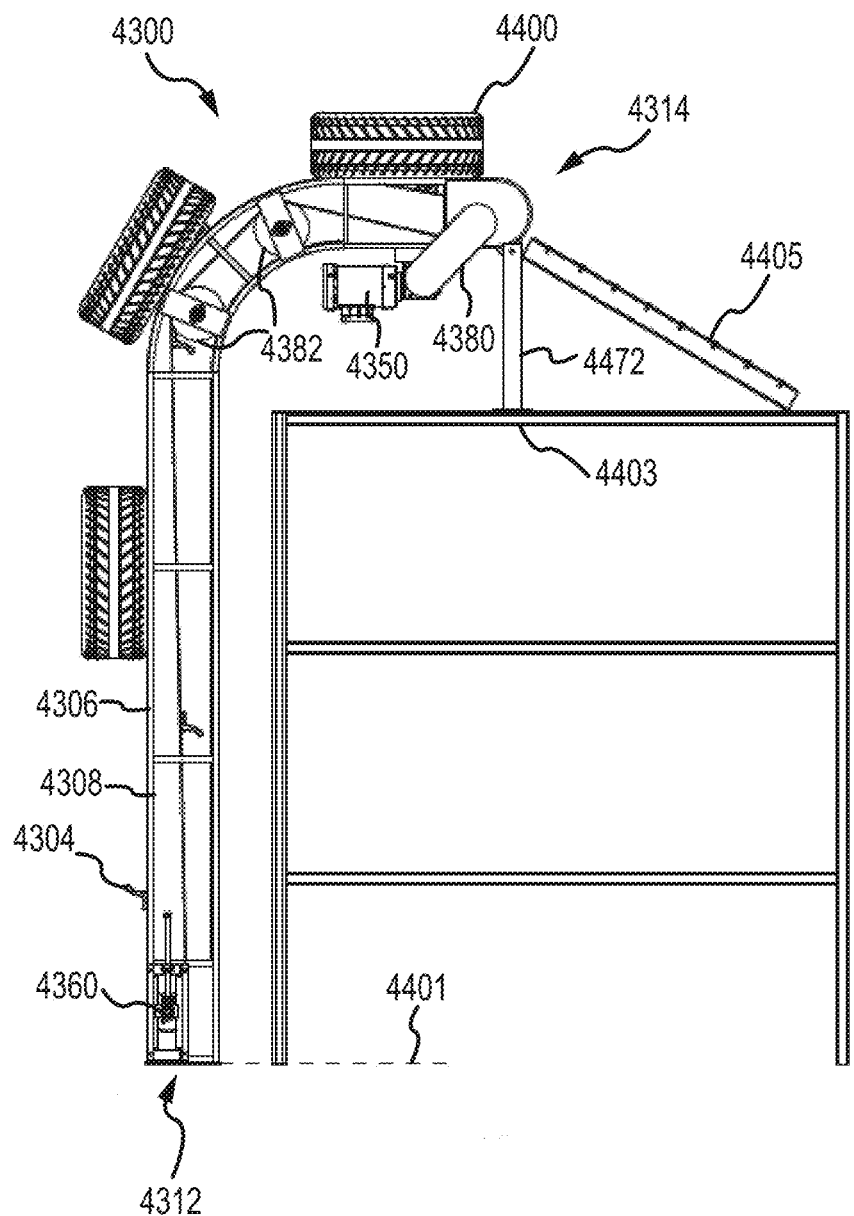
FIG. 44 shows the nose-over vertical tire conveyor of FIGS. 43A-B conveying tires and with a stand and ramp on the second floor.

FIG. 44 shows the nose-over vertical tire conveyor 4300 of FIGS. 43A-B conveying tires 4400 and with an H-stand and a ramp 4405 on the second floor 4403. The ramp 4405 may be a plurality of gravity rollers at the top discharge end 4314 to assist in removing the tires 4400 from the conveyor 4300. The bottom idle end 4312 is positioned on the ground 4401.

FIG. 45 shows the top end of the nose-over vertical tire conveyor of FIGS. 43A-44 without the belt and FIG. 46 shows the bottom end of the nose-over vertical tire conveyor of FIGS. 43A-44 without the belt. In FIGS. 45 and 46 the drive pulley 4354 and the tail pulley 4360 are visible. Additionally, the belt return rollers 4382 can be seen.

Figure 47:
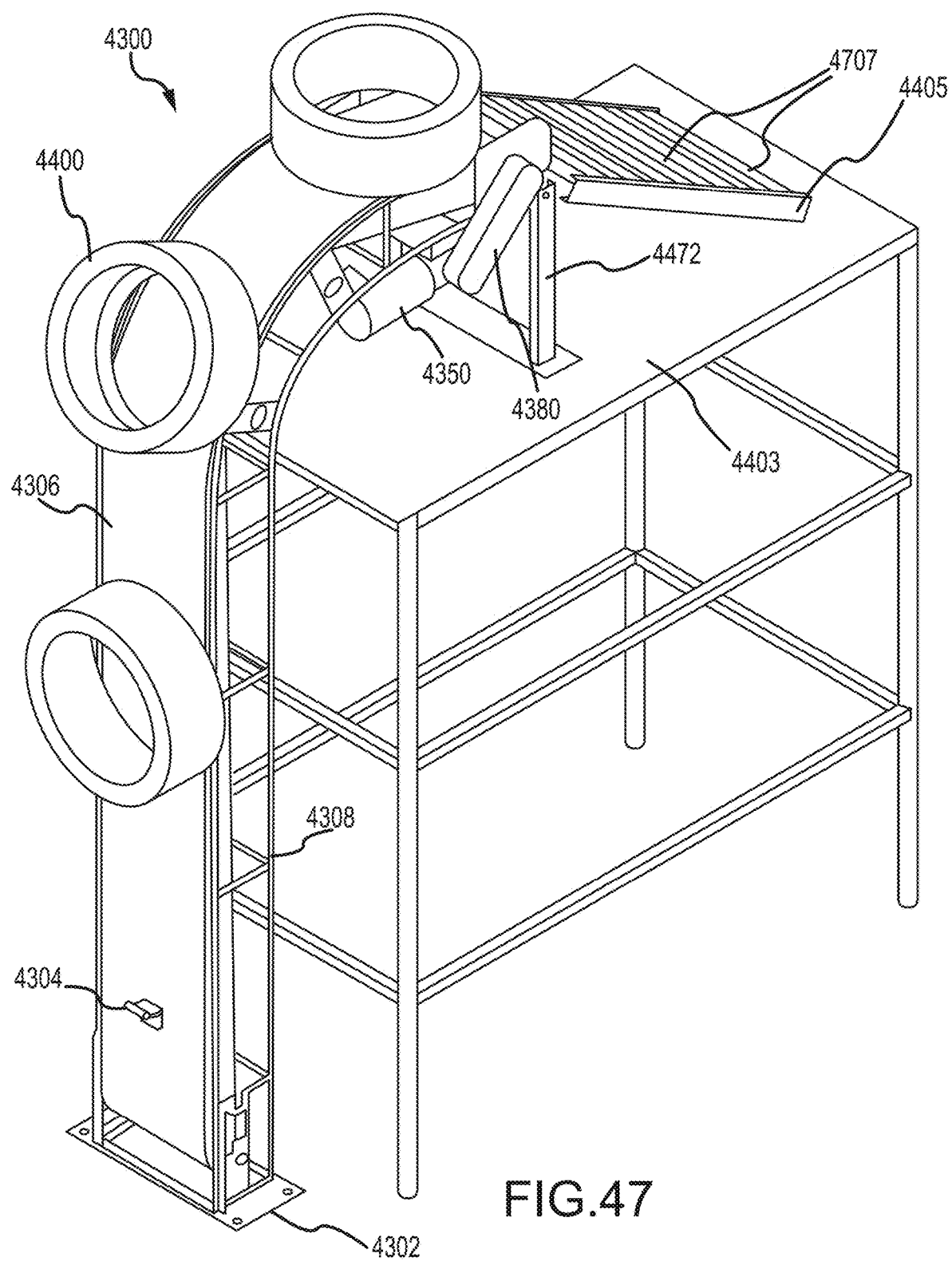
FIG. 47 shows an embodiment of a nose-over vertical tire conveyor.

FIG. 47 is a perspective view of the nose-over vertical tire conveyor of FIGS. 43A-46 with the ramp 4405 at the end of the discharge end 4314. Here the ramp 4405 is shown with gravity rollers or bars 4707 to slide the tires 4400 or articles off of the conveyor 4300 and onto the mezzanine floor 4403. One advantage of the nose-over vertical tire conveyor 4300 is that minimal ground floor clearance is required.

Figure 48:
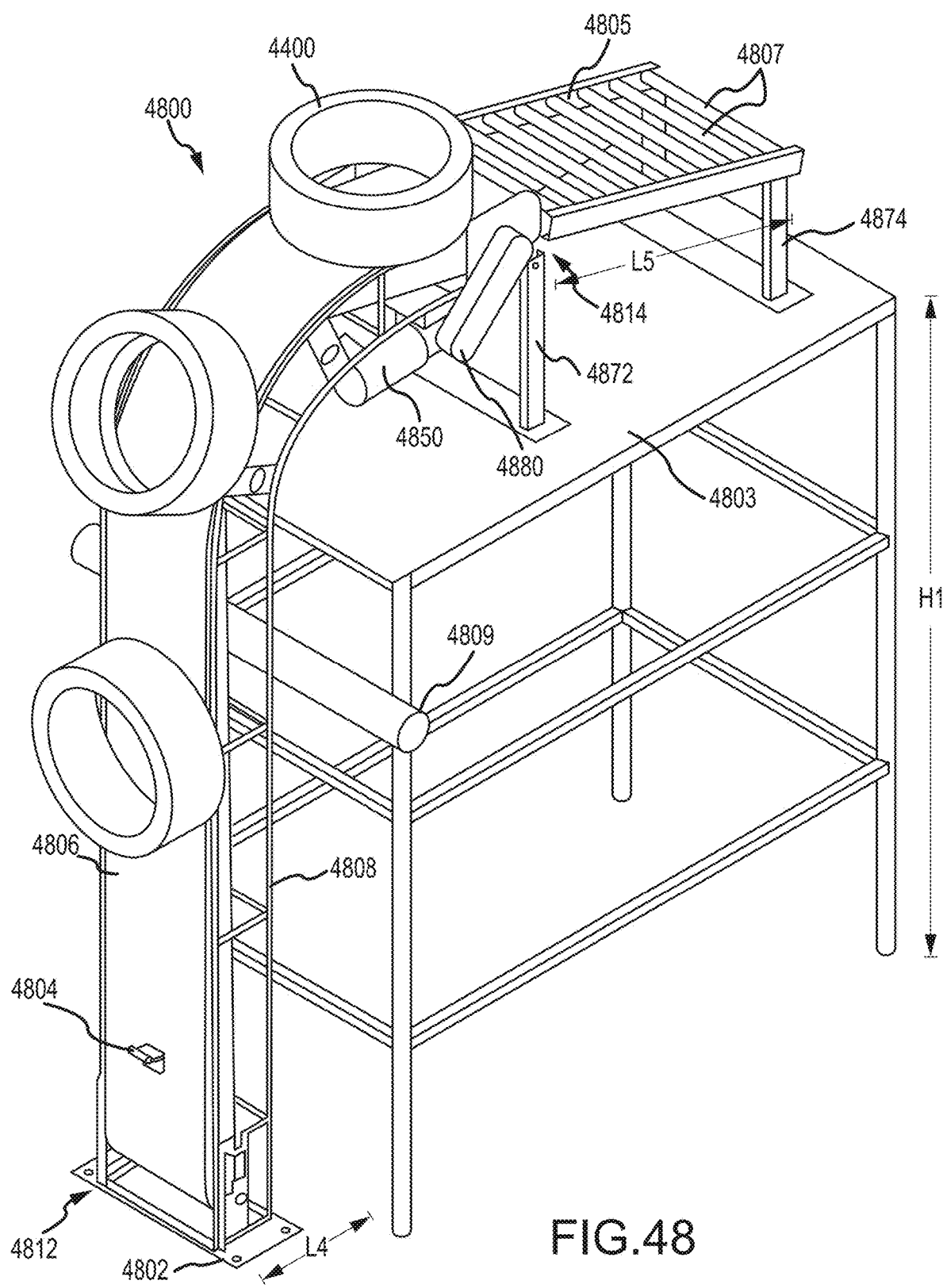
FIG. 48 shows an embodiment of a nose-over vertical tire conveyor.

FIG. 48 shows another embodiment of a nose-over vertical tire conveyor 4800. The conveyor 4800 has a frame 4808 with a stand or base 4802 on the bottom idle end 4812. The conveyor 4800 also has a conveyor belt 4806 with cleats 4804 interconnected to the belt 4806. The top drive end 4814 has a motor 4850 and a guard 4880 covering the drive belt or chain and sprocket. The embodiment shown also includes a ramp (also called a "staging platform" herein) 4805 at the end of the conveyor's top or discharge end 4814. The ramp 4805 can have gravity rollers or bars 4807 to slide the tires 4400 or articles off of the conveyor 4800 and onto the mezzanine floor 4803. The conveyor 4800 includes an H-stand at the discharge end 4814 to position the discharge end 4814 at the proper height above the mezzanine floor 4803 and to support the discharge end 4814. The staging platform 4805 may not extend all the way down to the mezzanine floor 4803 and, instead, may have a second stand 4874 on the end of the staging platform 4805 opposite the conveyor 4800. The staging platform 4805 can vary in length L5 depending on the end user's needs. For example, the length L5 of the staging platform 4805 is between about 2.0 ft and about 5.0 ft. in some embodiments. In a preferred embodiment, the length L5 of the staging platform 4805 is about 36" (3 ft.). One advantage of the staging platform 4805 is that it provides for safe unloading of articles and safe loading of articles (i.e., loading for descent). The staging platform 4805 also keeps operators clear of moving drive parts in the drive end 4814 and away from the mezzanine edge.

The height H1 of the mezzanine floor 4803 above the ground floor varies depending on the installation location and the conveyor 4800 can vary as well. However, in the embodiment shown the height H1 is between about 6.0 ft. and about 12.0 ft. In one embodiment, the height H1 of the mezzanine floor 4803 above the ground floor is about 8.0 ft.

Another advantage of the nose-over VTC 4800 is that it has a small base footprint and can be confined within a distance L4 of the mezzanine's edge, which means it is clear of bay work areas and is positioned around fire sprinkler water lines 4809 and other electrical lines. In some embodiments, the distance L4 of the edge of the base stand 4802 to the mezzanine edge is between about 12" and about 36". In a preferred embodiment, the distance L4 of the edge of the base stand 4802 to the mezzanine edge is about 24". On the ground level, the conveyor 4800 has easy and clear access to the loading face of the conveyor 4800.

In some embodiments, the conveyor 4800 has controls on both ends 4812, 4814 of the conveyor, e.g., up, down, and emergency stop. In various embodiments, the motor 4850 is a 115 VAC motor with a speed reducer and safety guards 4880. Thus, the conveyor 4800 requires minimal ground floor clearance next to the mezzanine and is also capable of clearing existing structures such as fire service lines and electrical lines. The top-end nose over allows for easy unloading (or loading for descent) of tires or other articles and keeps the operator clear of moving conveyor parts and the mezzanine edge.

Figure 49:
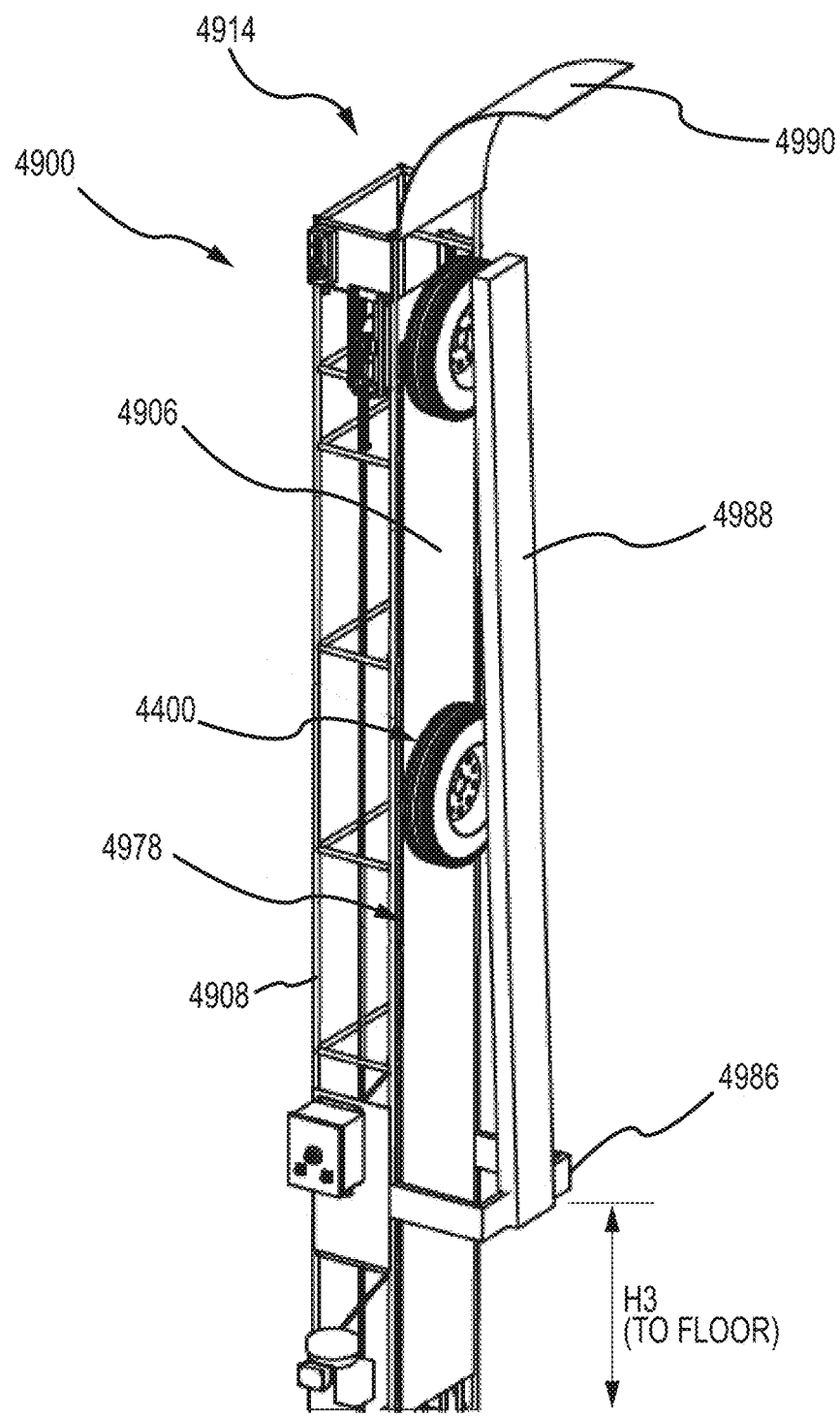
FIG. 49 shows an embodiment of a reverse nose-over vertical tire conveyor.

FIG. 49 shows a reverse nose-over vertical tire conveyor 4900. The conveyor 4900 has a belt 4906 for conveying articles (e.g., tires) and a frame 4908. Cleats are interconnected to the belt 4906 to convey the articles vertically along the conveyor 4900. In some embodiments, the cleats are 6" tall cleats. Additionally, one or two cleats 4904 may be used to convey each article. More than two cleats 4904 can also be used in some embodiments. In some embodiments, the conveyor 4900 has side guides (not shown) along each frame edge 4978. The side guides can be about 2.0" to about 6.0" tall. In a preferred embodiment, the side guides are about 4.0" tall. The distance between side guides is dictated by largest diameter tire or other article to be placed on the belt 4906. The conveyor 4900 also has a spring-loaded arm 4988 pivotally interconnected to a square bracket 4986 at a pivot point. The spring-loaded arm 4988 is tensioned to draw the arm 4988 toward the belt 4906 and keep the articles (e.g., tires) 4400 in place. In some embodiments, the spring-loaded arm 4988 is between about 8" and about 10" wide and is a fiberglass C-channel shape. The inner surface of the spring-loaded arm 4988 can be painted with an anti-friction finish to permit the articles 4400 to easily slide along the arm 4988. At the top end 4914 of the conveyor 4900, some embodiments include a shroud 4990 to guide the articles (e.g., tires) 4400 to fall back onto another conveyor (e.g., a gravity roller conveyor).

FIGS. 50A-D show an embodiment of a cleat 5004 for a vertical tire conveyor according to embodiments of the present invention. Specifically, FIG. 50A is a perspective view of the cleat 5004, FIG. 50B is a top plan view of the cleat 5004, FIG. 50C is a side view of the cleat 5004, and FIG. 50D is a rear view of the cleat 5004. In some embodiments, the cleat 5004 shown is for a straight vertical tire conveyor; however, the cleat 5004 can be used with other vertical and incline or non-vertical conveyors.

In some embodiments, the cleat 5004 is a 5.0" tall cleat. In other embodiments, the cleat 5004 is a 2.0" cleat, a 4.0" cleat, a 6.0" cleat, an 8.0" cleat, or any height between 3.0" and 8.0". The cleat 5004 may also include holes 5002 for bolts or other attachment or interconnection mechanisms. In one embodiment, the holes 5002 have a diameter between about ¼" and 1". In a preferred embodiment, the holes 5002 have a diameter of about 5/16". The cleat 5004 can have a flat lower area 5024 (also called a "block" herein) or a curved block 5024. In one embodiment, the under surface 5034 of the block 5024 has a radius of curvature R6 between about 5" and about 10" and the block 5024 has a width W1 between about 2" and about 4". In a preferred embodiment the under surface 5034 of the block 5024 has a radius of curvature R6 of about 8.5" and the block 5024 has a width of 2⅞". The block can have a flat or a curved upper surface 5032. In one embodiment, the height H2 of the block 5024 (i.e., from the under surface 5034 to the upper surface 5032) is between about ½" and about 1.0". In a preferred embodiment, the height H2 of the block 5024 (i.e., from the under surface 5034 to the upper surface 5032) is about ¾". The outer edge of the block 5024 can have a square corner or a rounded corner. In one embodiment, the radius of curvature R5 of the corner of the block 5024 is between about ⅟₁₆" and about ½". In a preferred embodiment, the radius of curvature R5 of the corner of the block 5024 is about ¼".

In some embodiments, the cleat 5004 also has a curved section 5006. The curved section 5006 has a back side 5026 (i.e., the side facing away from the article conveyed) and an article-supporting face (also called a "carrying surface") 5008 positioned opposite the back side 5026. In one embodiment, the article-supporting face 5008 has a smaller radius of curvature R3 than the radius of curvature R2 of the back side 5026. Thus, the radius of curvature R3 of the article-supporting face 5008 may be between about 4" and about 6" and the radius of curvature R2 of the back side 5026 may be between about 4.5" and about 6.5" in some embodiments. In a preferred embodiment, the radius of curvature R3 of the article-supporting face 5008 is about 5.0" and the radius of curvature R2 of the back side 5026 is about 5.5". The cleat 5004 also has a top 5012 and sides 5014. In one embodiment, the height H1 from the under surface 5034 to the top of the top 5012 is between about 4" and about 6.5". In a preferred embodiment, the height H1 from the under surface 5034 to the top of the top 5012 is about 5.0". In one embodiment, the length L1 from one side 5014 to the other side is between about 2" and about 6". In a preferred embodiment, the length L1 from one side 5014 to the other side is about 3.25". Additionally, the top 5012 may be flat or curved. In one embodiment, the radius of curvature R1 of the top 5012 is between about ³⁄₁₆" and about ¾". In a preferred embodiment, the radius of curvature R1 of the top 5012 is about 0.5". This portion of the cleat 5004 may be called the extended radius 5040.

In one embodiment, the entire width W2 of the cleat 5004 is between about 4.0" and about 6.0". In a preferred embodiment, the width W2 of the cleat 5004 is about 5.0". Further, the holes 5002 are positioned a distance W3 from the edge of the block 5024, where the distance W3 is between about 0.5" and about 2". In a preferred embodiment, the holes 5002 are positioned a distance W3 from the edge of the block 5024, where the distance W3 is about 1.375". Additionally, the holes 5002 are positioned a distance W4, W5 from the side 5006, where the distance W4, W5 is between about ¼" and about 1". In a preferred embodiment, the holes 5002 are positioned a distance W4, W5 from the side 5006, where the distance W4, W5 is about 0.469".

The cleat 5004 can be urethane or any known material in the art. The cleat 5004 can have an extended radius 5040 at the cleat's tip that is counter to the radius R3 of the carrying surface 5008 to deter tires from falling off of the cleat 5004. The cleat 5004 may have a narrow width L1 and radius edges 5050 to prevent damage to the conveyed tires' inner beads.

Figure 51A:
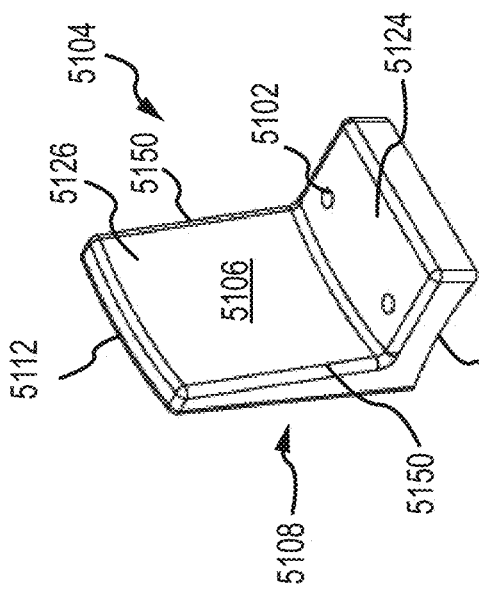
FIGS. 51A-D show an embodiment of a cleat for a vertical tire conveyor according to embodiments of the present invention.
Figure 51D:
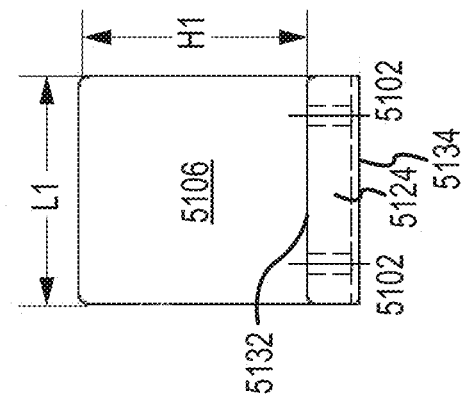
Figure 51B:
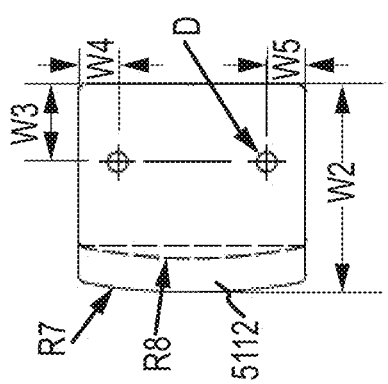
Figure 51C:
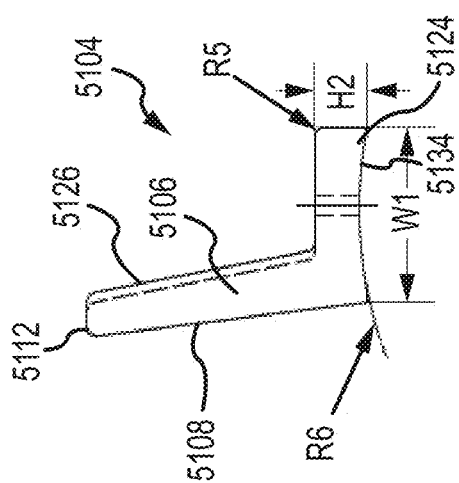

FIGS. 51A-D show an embodiment of a cleat 5104 for a vertical tire conveyor according to embodiments of the present invention. Specifically, FIG. 51A is a perspective view of the cleat 5104, FIG. 51B is a top plan view of the cleat 5104, FIG. 51C is a side view of the cleat 5104, and FIG. 51D is a rear view of the cleat 5104. In some embodiments, the cleat shown is for a nose-over vertical tire conveyor; however, the cleat can be used with other vertical and incline or non-vertical conveyors.

In some embodiments, the cleat 5104 is a 4.0" tall cleat. In other embodiments, the cleat 5104 is a 2.0" cleat, a 5.0" cleat, a 6.0" cleat, an 8.0" cleat, or any height between 3.0" and 8.0". The cleat 5104 may also include holes 5102 for bolts or other attachment or interconnection mechanisms. In one embodiment, the holes 5102 have a diameter between about ⅛" and 1". In a preferred embodiment, the holes 5102 have a diameter of about 0.28". The cleat 5104 can have a flat lower area 5124 (also called a "block" herein) or a curved block 5124. In one embodiment, the under surface 5134 of the block 5124 has a radius of curvature R6 between about 4" and about 8" and the block 5124 has a width W1 between about 1.5" and about 3.5". In a preferred embodiment the under surface 5134 of the block 5124 has a radius of curvature R6 of about 6.0" and the block 5124 has a width of 2.5". The block can have a flat or a curved upper surface 5132. In one embodiment, the height H2 of the block 5124 (i.e., from the under surface 5134 to the upper surface 5132) is between about ½" and about 1.0". In a preferred embodiment, the height H2 of the block 5124 (i.e., from the under surface 5134 to the upper surface 5132) is about ¾". The outer edge of the block 5124 can have a square corner or a rounded corner. In one embodiment, the radius of curvature R5 of the corner of the block 5124 is between about ⅟₁₆" and about ½". In a preferred embodiment, the radius of curvature R5 of the corner of the block 5124 is about ¼".

In some embodiments, the cleat 5104 also has a curved section 5106. The curved section 5106 has a back side 5126 (i.e., the side facing away from the article conveyed) and an article-supporting face (also called a "carrying surface") 5108 positioned opposite the back side 5126. In one embodiment, the article-supporting face 5108 has a larger radius of curvature R7 than the radius of curvature R8 of the back side 5126. Thus, the radius of curvature R7 of the article-supporting face 5108 may be between about 5.0" and about 12.0" and the radius of curvature R8 of the back side 5126 may be between about 4.0" and about 12.0" in some embodiments. In a preferred embodiment, the radius of curvature R7 of the article-supporting face 5108 is about 9.0" and the radius of curvature R8 of the back side 5126 is about 8.0".

The cleat 5104 also has a top 5112 and sides 5114. In one embodiment, the height H1 from the under surface 5134 to the top of the top 5112 is between about 3.0" and about 6.0". In a preferred embodiment, the height H1 from the under surface 5134 to the top of the top 5112 is about 4.0". In one embodiment, the length L1 from one side 5114 to the other side is between about 2" and about 5". In a preferred embodiment, the length L1 from one side 5114 to the other side is about 3.25". Additionally, the top 5112 may be flat or curved.

In one embodiment, the entire width W2 of the cleat 5104 is between about 1.0" and about 5.0". In a preferred embodiment, the width W2 of the cleat 5104 is about 2.98". Further, the holes 5102 are positioned a distance W3 from the edge of the block 5124, where the distance W3 is between about 0.5" and about 2". In a preferred embodiment, the holes 5102 are positioned a distance W3 from the edge of the block 5124, where the distance W3 is about 1.13". Additionally, the holes 5102 are positioned a distance W4, W5 from the side 5106, where the distance W4, W5 is between about ¼" and about 1". In a preferred embodiment, the holes 5102 are positioned a distance W4, W5 from the side 5106, where the distance W4, W5 is about 0.56". The cleat 5104 can be urethane or any known material in the art. The cleat 5104 may have a narrow width L1 and radius edges 5150 to prevent damage to the conveyed tires' inner beads.

Figures 52, 53, 54:
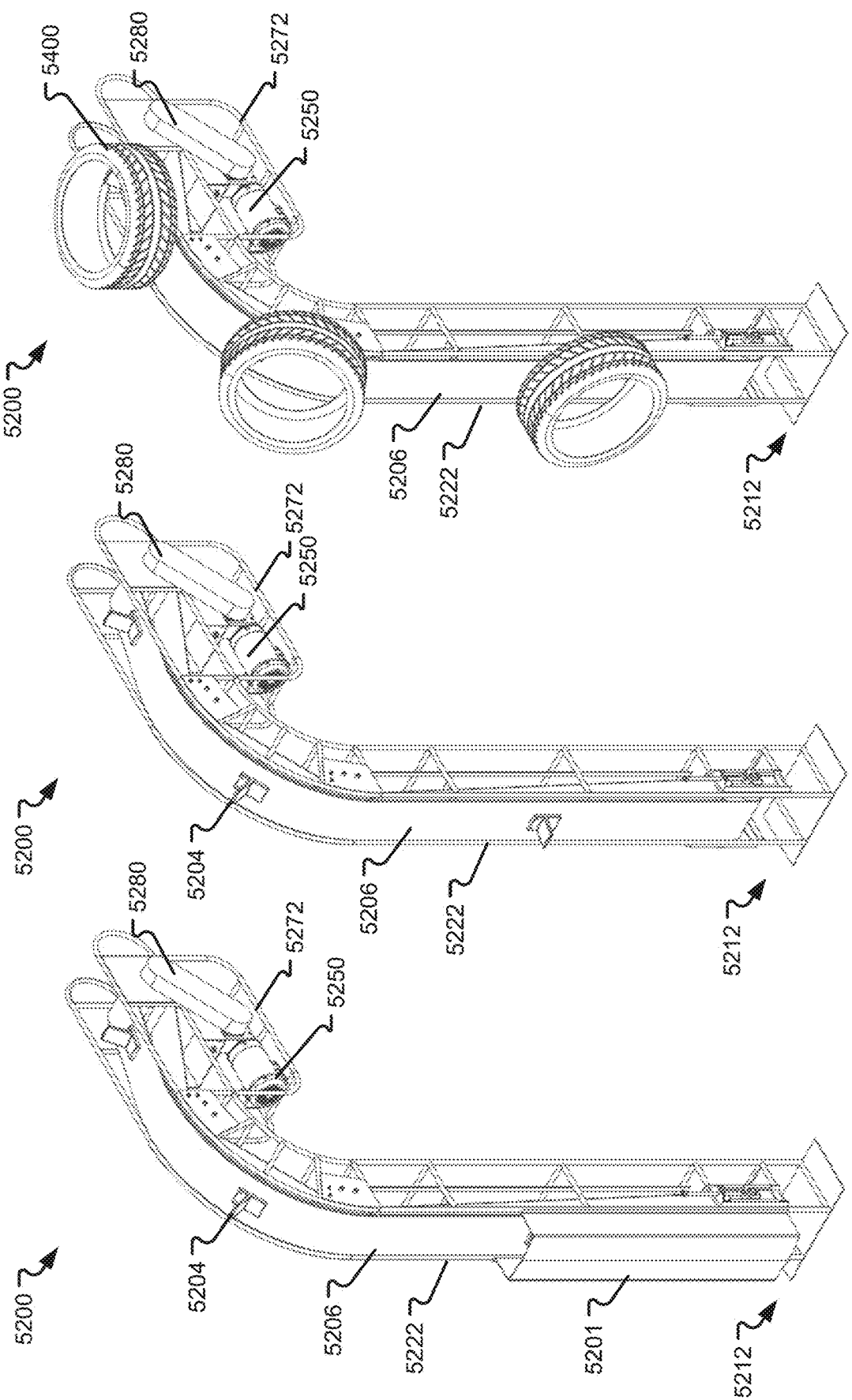
FIG. 52 is a front perspective view of a vertical tire conveyor according to embodiments of the present invention.
FIG. 53 is a front perspective view of the conveyor of FIG. 52 shown without the belt guard.
FIG. 54 is a front perspective view of the conveyor of FIG. 53 shown conveying tires.
Figure 60A:
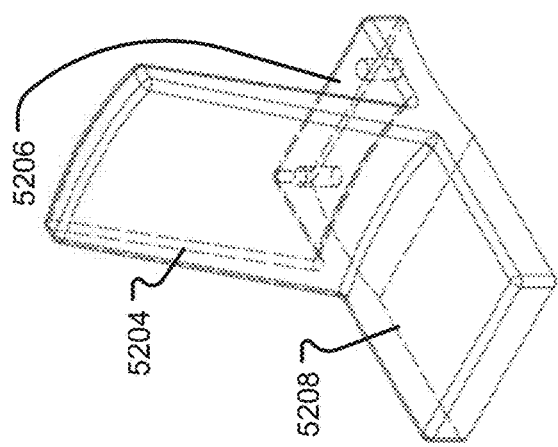
FIGS. 60A-D show a cleat for a vertical tire conveyor according to embodiments of the present invention.
Figure 60D:
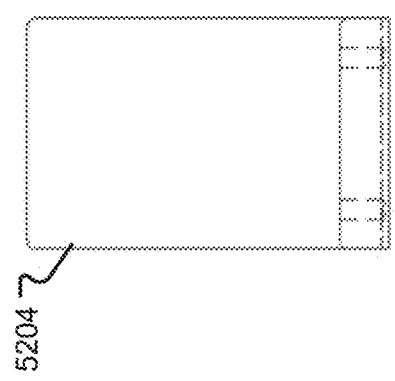
Figure 60B:
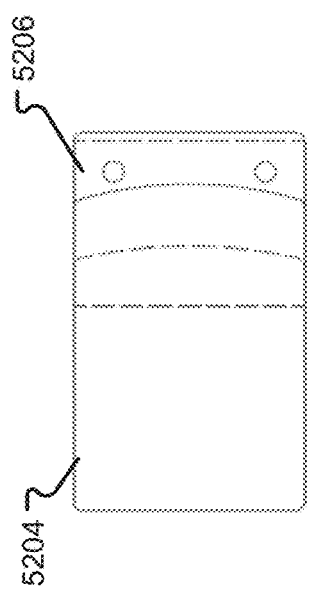
Figure 60C:
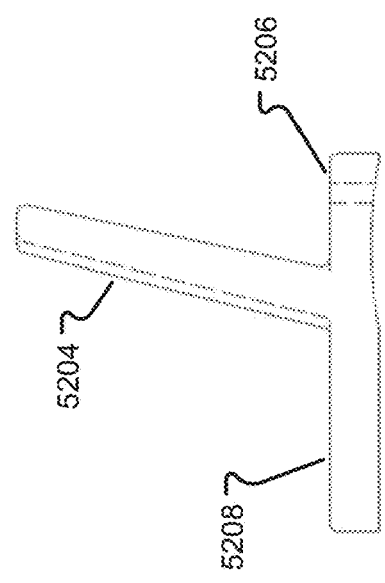

FIG. 52 is a perspective front view of a vertical nose over conveyor 5200 according to embodiments of the present invention. The conveyor 5200 comprises a conveyor belt 5206 that revolves around two pulleys 5220 (visible in FIG. 55A), one each at the top and bottom ends. Cleats 5204 are secured to the conveyor belt 5206 at intervals and are used to carry tires 5400 up and down along the conveyor frame 5222. FIG. 52 is a "non-use" form with a belt guard 5201 placed on the conveyor 5200 at the bottom end to prevent personnel from getting entangled with the belt cleats 5204. The conveyor belt 5206 and conveyor frame 5222 are narrower than in previous nose-over designs in order to minimize the conveyor 5200 footprint.

The conveyor 5200 also includes a motor 5250 interconnected to the one of the pulleys 5220 pulley via a roller chain or drive belt 5224 (visible in FIG. 56) and sprockets 5230. Thus, proximate the motor 5250 and covering the roller chain and sprockets is a guard 5280. The motor 5250 can be an electric motor and include a speed reducer in some embodiments. The motor 5250 is positioned near the top end. The motor 5250 can be positioned at the bottom end in other embodiments. The bottom end includes a stand 5212 that can be bolted to the floor. The conveyor 5200 also includes a stand 5272 on which the motor 5250 may be positioned on.

FIG. 53 is similar to the conveyor of FIG. 52 but without the belt guard 5201.

FIG. 54 shows the conveyor of FIG. 53 conveying tires 5400.

FIG. 55A is a perspective front view of the conveyor of FIGS. 53 and 54 shown without the conveyor belt 5206. FIG. 55B is a zoomed in view of the top end of the conveyor 5200 of FIG. 55A. In this embodiment, the upper rounded part of the conveyor frame 5222 has a different belt-carrying surface 5226 than other embodiments. Specifically, the conveyor frame 5222 has a solid sheet or plate 5226 at the curved upper end of the frame 5222, whereas the belt-carrying surface on the vertical portion of the conveyor frame is tubular rails 5228. In other embodiments, for example the conveyor frame 4308 shown in FIG. 45, the top carrying surface is a continuation of the vertical tubular rails around the curve of the frame 4308. The solid belt-carrying surface 5226 at the upper curved portion of the frame 5222 in FIGS. 55A-B is an anti-friction surface that supports the belt 5206 around the curve. The reduced friction at the curve reduces wear on the belt 5206 as well as reduces wear on the drive components of the conveyor 5200 (e.g., motor, gearbox, roller chain, sprockets, etc.). In one embodiment, the anti-friction surface is UHMW (ultra-high-molecular-weight) polyethylene. In other embodiments, the anti-friction surface may include other engineered plastics that have a favorable low coefficient of friction and abrasion-resistant properties.

FIG. 56 shows the conveyor frame 5222 of FIG. 55A with the solid belt-carrying anti-friction surface 5226 removed to show the belt return carrying surface that is contained within the conveyor frame 5222.

FIG. 57A is a rear perspective view of the conveyor 5200 of FIGS. 52-56 shown without the conveyor belt 5206 such that the mechanism by which the belt returns inside the conveyor frame 5222 can be seen. In other embodiments, the belt 5206 was carried by a series of rollers, where each roller had a shaft that was mounted in plates on both sides of the conveyor frame. In the small footprint, vertical, nose-over conveyor of FIGS. 52-57B, the conveyor 5200 has four separate return wheels 5232 (an additional return wheel is adjacent to the visible return wheels 5232) to carry the belt over the conveyor curve and back to the bottom of the conveyor frame. In other embodiments, the conveyor 5200 may have less or greater than four wheels. Each return wheel 5232 has its own shaft 5234, bearing, and base 5236, as well as a mounting bracket 5238 designed with an important belt tracking feature.

FIG. 57B is an enlarged view of the top of the conveyor of FIG. 57A and shows how the return wheel assembly 5232 is mounted inside the conveyor frame 5222. When the return wheel assembly 5232 is installed, it rests on a shelf 5240 that is a part of the conveyor frame 5222 and uses two fasteners (in the embodiment shown, socket head cap screws) to fix the return wheel assembly 5232 to the conveyor frame 5222. When tightened, the two fasteners oppose each other about a fulcrum 5242 (i.e., the bar-shaped feature seen in FIG. 58A), allowing the return wheel assembly 5232 to pivot in order to influence the belt motion with the goal of centering the belt 5206 within the frame 5222. FIG. 57B also shows added nose loops, which help protect personnel from the belt cleat at the top end of the conveyor.

FIGS. 58A and 58B show the standalone return wheel assembly 5232. FIG. 58A is a perspective front view and FIG. 58B is a perspective rear view of the standalone return wheel assembly 5232.

FIG. 59 shows an additional belt tracking aid-sometimes called a belt liner 5244. The belt liner 5244 has three components: a roller 5246, a shaft 5248, and bracket 5251. The three components are shown assembled. The belt liner 5444 places hard limits on the belt's ability to track away from center and is a secondary measure to aid in ideal belt tracking.

FIGS. 60A-D show another embodiment of a cleat 5204 (also called a support element herein) and an improved version of the cleat shown in FIGS. 51A-D. The cleat 5204 of FIGS. 60A-D fastens to the conveyor belt at the leading edge 5206 of the cleat 5204. With the cleat 5204 fastened in this way, along with its long base 5208, the cleat 5206 can better support a heavy tire being conveyed vertically without causing the belt 5206 to fold back on itself. This design supports the goal of having a minimally tensioned belt, which increases the life of conveyor components. The cleat 5204 is also designed to aid in tire disengagement at the top end of the conveyor 5200 by minimizing the tire contact area as the cleat 5204 approaches the top belt pulley 5220.

FIGS. 61A-61B show a first and second perspective view, respectively, of a conveyor 6100 on a portable stand 6102 in a first position. The stand 6102 may aid in conveyor transportation and assembly (of which, in some embodiments, assembly may be aided by the use of a forklift). The conveyor 6100 may be a floor-to-floor incline conveyor for conveying objects such as, for example, tires. The conveyor 6100 may be the same as or similar to the conveyor 100, 200, 300, 1000, 2600, 3400 or any other conveyor described herein. The conveyor 6100 comprises a conveyor belt 6106 that revolves around two pulleys (not visible), one each at the top and bottom ends. Cleats 6104 (which may be the same as or similar to any cleats described herein) are secured to the conveyor belt 6106 at intervals along the belt 6106.

The conveyor 6100 also includes a motor 6150 interconnected to the one of the pulley via a roller chain or drive belt and sprockets (not visible). Thus, proximate the motor 6150 and covering the roller chain and sprockets is a guard 6180. The motor 6150 can be an electric motor and include a speed reducer in some embodiments. The motor 6150 can be positioned at the bottom end in some embodiments, as illustrated. The conveyor 6100 may also have a motor cage 6108 which houses the motor 6150, a speed reducer gearbox (not visible), and control switches (not visible). A footprint of the motor cage 6108 (and the assembly or configuration of the components housed within the motor cage 6108) may be sized to minimize a footprint of the motor cage 6108 so as to achieve a shipping configuration, shown in FIGS. 62A-62B. more specifically, the footprint or volume of the motor cage is sized so as to allow the conveyor 6100 to rest substantially or near parallel to the base 6110 when in the shipping configuration.

The conveyor 6100, as shown in FIGS. 61A-61B, is mounted to the portable stand 6102. The stand 6102 includes hollow fork tubes or pockets and casters or wheels, which provide mobility in two configurations: a first, upright, or assembled position—shown in FIGS. 61A-61B—and a second, horizontal, or shipping position—shown in FIGS. 62A-62B.

Turning to FIGS. 63A-63B, the stand 6102 is shown in a front perspective view and a side view, respectively. The stand 6102 comprises a base 6110 and a support arm 6112. In the illustrated embodiment, the base 6110 includes a frame 6114 shaped as a rectangle, though it will be appreciated that the frame 6114 may be shaped as, for example, a square. The frame 6114 includes a pair of hollow fork tubes 6116 opposite each other. The fork tubes 6116 are configured to receive forks of a forklift, which provides for easy handling and movement of the conveyor 6100 by a forklift. The base 6110 also includes four casters or wheels 6118 that can each rotate 360 degrees so that the base 6110 (and thus, the conveyor 6100) may be moved in any direction. The casters or wheels 6118 may also be locked so as to prevent movement of the base 6110, whether during shipping, use, or otherwise. The casters or wheels 6118 are securely mounted to the frame 6114, whether by nuts and bolts, screws, welding, adhesion, or the like.

As shown, the base 6110 also includes a first pair of brackets 6120 and a second pair of brackets 6122 disposed on opposite sides of the frame 6114. The first pair of brackets 6120 are configured to receive a first pin 6124 of the conveyor 6100 such that the conveyor 6100 is configured to pivot about the first pin 6124 at the base 6110. The first pin 6124 is located near a bottom of the conveyor 6100. The second pair of brackets 6122 is configured to receive a second pin 6126 of the support arm 6112 to secure the support arm 6112 to the base 6110 during installation and use. A third pin 6128 is located near a mid-section of the conveyor 6100 and pivotably connects the support arm 6112 to the conveyor 6100.

Though the support arm 6112 is shown in FIGS. 63A-63B as separate from the conveyor 6100 and coupled to the base 6110, it will be appreciated that during shipping—or when the conveyor 6100 is in the second position—the support arm 6112 is coupled to the conveyor frame 6121 and is separated from the base 6110, as visible in FIGS. 62A-62B. The support arm 6112 is shown and described with the base 6110 in FIGS. 63A-63B for clarity. In the illustrated embodiment, the support arm 6112 includes two frame members 6130 opposite each other. The frame members 6130 may have a pair of brackets 6134 at each end to receive the second pin 6126 and the third pin 6128. The support arm 6112, as shown, is in the shape of a rectangle, though in other embodiments the support arm 6112 may be in the shape of a square or triangle. As previously described, the second pin 6126 pivotably couples the support arm 6112 to the base 6110 and the third pin 6128 pivotably couples the support arm 6112 to the conveyor 6100. The support arm 6112 also includes a cross bar 6132 extending across the two frame members 6130, though in some embodiments the support arm 6112 may not include the cross bar 6132.

The conveyor 6100 may be shipped in the second position, shown in FIGS. 62A-62B. In the second position, the support arm 6112 is substantially parallel to the conveyor frame 6121 and the conveyor 6100 is also substantially or near parallel to the base 6110. As shown in FIG. 62B, the conveyor 6100 has a low profile when in the second position, and is easy to ship in such configuration. Further, the conveyor 6100 can be unloaded directly from a trailer in the second position. To move the conveyor 6100 from the second position to the first position, the conveyor 6100 is lifted by, for example, a forklift, such that the conveyor 6100 lifts and pivots away from the base 6110. When the conveyor 6100 is lifted, the support arm 6112 pivots downward and away from the conveyor 6100. While the conveyor 6100 is raised, the second pin 6126 is removed and the brackets 6134 of the two frame members 6130 are aligned with the second pair of brackets 6122 on the base 6110. When the brackets 6134 of the two frame members 6130 and the second pair of brackets 6122 are aligned, the second pin 6126 is reinserted through the second pair of brackets 6122 and the brackets 6134 of the two frame members 6130. The second pin 6126 is then secured to the base 6110, whether by cotter pins or otherwise.

The conveyor 6100 and portable stand 6102 as described above with respect to FIGS. 61A-63B provides for a mobile conveyor that self-contained, simple to transport, and to install with minimal personnel.

The VTC (straight or nose over) can be positioned on a movable stand to facilitate usage and storage, similar to the conveyor shown in FIG. 2.

While various embodiment of the present invention have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included descriptions of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Further, the invention(s) described herein is capable of other embodiments and of being practiced or of being carried out in various ways. It is to be understood that the phraseology and terminology used herein is for the purpose of description and should not be regarded as limiting.

What is claimed is:

1. A portable conveyor system for conveying articles up inclines, the system comprising:
   a conveyor comprising:
      a conveyor frame;
      a first pin disposed at an end of the conveyor frame;
      a pair of pulleys disposed at opposite ends of the conveyor frame;
      a belt configured to revolve around the pair of pulleys; and
      at least one cleat disposed on an outer surface of the belt and configured to receive and move an object along the conveyor frame;
   a support arm having two frame members disposed opposite each other and a pair of arm brackets at an end of each of the two frame members, the support arm including a second pin and a third pin, the second pin received by a first arm bracket in the pair of arm brackets and the third pin received by a second arm bracket in the pair of arm brackets, wherein the third pin pivotably connects the support arm to the conveyor frame; and
   a portable base comprising a base frame, at least one wheel secured to the base frame, a first pair of brackets secured to the base frame, and a second pair of brackets secured to the base frame and opposite the first pair of brackets, the first pair of brackets configured to receive the first pin thereby pivotably coupling the conveyor to the portable base and the second pair of brackets configured to receive the second pin thereby pivotably connecting the support arm to the portable base, wherein the base frame comprises at least one hollow tube configured to receive a fork of a forklift.

2. The system of claim 1, wherein the at least one wheel is rotatable 360 degrees.

3. The system of claim 1, wherein the conveyor and the support arm are each configured to move between a first position and a second position.

4. The system of claim 3, wherein the support arm is substantially parallel to the conveyor frame and the conveyor frame is substantially parallel to the portable base when in the second position.

5. The system of claim 3, wherein the second pin is unconnected from the portable base when the support arm is in the second position.

6. The system of claim 1, wherein the third pin pivotably couples the support arm to the conveyor frame near a mid-section of the conveyor frame.

7. A method for moving a portable conveyor system comprising:
   removing a portable conveyor system from a shipping container, the portable conveyor system in a second position, the portable conveyor system comprising a conveyor; a support arm; and a portable base; the conveyor comprising a conveyor frame; a first pin disposed at a first end of the conveyor frame; a pair of pulleys disposed at the first end and a second end opposite the first end of the conveyor frame; a belt configured to revolve around the pair of pulleys; and at least one cleat disposed on an outer surface of the belt and configured to receive and move an object along the conveyor frame; the support arm comprising two frame members disposed opposite each other and a pair of arm brackets at the end of each of the two frame members; the support arm including a second pin and a third pin; the second pin received by a first arm bracket in the pair of arm brackets and the third pin received by a second arm bracket in the pair of arm brackets, wherein the third pin pivotably connects the support arm to the conveyor frame, and the portable base comprising a base frame; at least one wheel secured to the base frame; a first pair of brackets secured to the base frame; and a second pair of brackets secured to the frame and opposite the first pair of brackets; the first pair of brackets configured to receive the first pin thereby pivotably coupling the conveyor to the portable base and the second pair of brackets;
   locking the at least one wheel to prevent movement of the portable base;
   lifting the conveyor, thereby pivoting the conveyor upwards from the portable base at the first pin and causing the support arm to pivot downwards from the conveyor at the third pin;
   removing the second pin;
   aligning the second pair of brackets and one of the pair of arm brackets of the two frame members;
   inserting the second pin through the second pair of brackets and the first bracket in the pair of arm brackets of the frame members; and
   securing the second pin to secure the portable conveyor system in a first position.

8. The method of claim 7, wherein the first pin, the second pin, and the third pin are each secured using one or more cotter pins.

9. The method of claim 7, wherein the at least one wheel is rotatable 360 degrees.

10. The method of claim 7, wherein the base frame comprises at least one hollow tube configured to receive a fork of a forklift.

11. The method of claim 7, wherein the support arm is substantially parallel to the conveyor frame and the conveyor frame is substantially parallel to the portable base when in the second position.

12. The method of claim 7, wherein the second pin is unconnected from the portable base when the support arm is in the second position.

13. The method of claim 7, wherein the third pin pivotably couples the support arm to the conveyor frame near a mid-section of the conveyor frame.

14. A portable stand comprising:
   a support arm having two frame members disposed opposite each other and a pair of arm brackets at an end of each of the two frame members, the support arm including a second pin and a third pin, the second pin received by a first arm bracket in the pair of arm brackets and the third pin received by a second bracket in the pair of arm brackets, wherein the third pin pivotably connects the support arm to a conveyor frame of a conveyor, wherein the support arm is configured to move between a first position and a second position, and wherein the support arm is substantially parallel to the conveyor frame when in the second position; and
   a portable base having a base frame, at least one wheel secured to the base frame, a first pair of brackets secured to the base frame and a second pair of brackets secured to the base frame and opposite the first pair of brackets, the first pair of brackets configured to receive a first pin thereby pivotably coupling the conveyor to the portable base and the second pair of brackets configured to receive the second pin thereby pivotably connecting the support arm to the portable base.

15. The stand of claim 14, wherein the at least one wheel is rotatable 360 degrees.

16. The stand of claim 14, wherein the second pin is unconnected from the portable base when the support arm is in the second position.

17. The stand of claim 14, wherein the third pin pivotably couples the support arm to a conveyor frame near a midsection of a conveyor frame.

\* \* \* \* \*